US008548840B2

(12) United States Patent
Anthony et al.

(10) Patent No.: US 8,548,840 B2
(45) Date of Patent: Oct. 1, 2013

(54) METHOD AND SYSTEM FOR MANAGING A STRATEGIC PLAN VIA DEFINING AND ALIGNING STRATEGIC PLAN ELEMENTS

(75) Inventors: Brennan Clive Lincoln Anthony, Lindfield (AU); Elissa Glass, Erskineville (AU)

(73) Assignee: International Business Machines Corporation, Armonk, NY (US)

( * ) Notice: Subject to any disclaimer, the term of this patent is extended or adjusted under 35 U.S.C. 154(b) by 1577 days.

(21) Appl. No.: 11/746,690

(22) Filed: May 10, 2007

(65) Prior Publication Data
US 2008/0281651 A1    Nov. 13, 2008

(51) Int. Cl.
*G06Q 10/00*    (2012.01)

(52) U.S. Cl.
USPC ........................................................ 705/7.36

(58) Field of Classification Search
USPC ....................................................... 705/7.36
See application file for complete search history.

(56) References Cited

U.S. PATENT DOCUMENTS

| | | | |
|---|---|---|---|
| 5,875,431 A | 2/1999 | Heckman et al. | |
| 6,138,139 A | 10/2000 | Beck et al. | |
| 6,785,805 B1 | 8/2004 | House et al. | |
| 6,895,403 B2 * | 5/2005 | Cardwell et al. | 707/758 |
| 2002/0035483 A1 | 3/2002 | Patel | |
| 2002/0069083 A1 | 6/2002 | Harter et al. | |
| 2002/0099563 A1 | 7/2002 | Adendorff et al. | |
| 2002/0133368 A1 | 9/2002 | Strutt et al. | |
| 2003/0069869 A1 | 4/2003 | Gronau et al. | |
| 2003/0122875 A1 | 7/2003 | Linder | |
| 2003/0126050 A1 | 7/2003 | Theiss et al. | |
| 2003/0130884 A1 | 7/2003 | Michaluk | |
| 2003/0187707 A1 | 10/2003 | Hack et al. | |
| 2003/0187763 A1 | 10/2003 | Jordan et al. | |
| 2004/0098292 A1 | 5/2004 | Miller et al. | |
| 2004/0220843 A1 | 11/2004 | Walter | |
| 2005/0065904 A1 | 3/2005 | DeAngelis et al. | |
| 2005/0203757 A1 | 9/2005 | Lei et al. | |

(Continued)

FOREIGN PATENT DOCUMENTS

WO    WO0248935 A1    6/2002

OTHER PUBLICATIONS (WO2000042553) Method and Apparatus for Processing Business Information From Multiple Enterprises ; Gardepe, Carla, E.; Jul. 20, 2000.*

(Continued)

*Primary Examiner* — Johnna Loftis
(74) *Attorney, Agent, or Firm* — Schmeiser, Olsen & Watts; John Pivnichny

(57) ABSTRACT

A method and system for managing a strategic plan via developing and aligning strategy elements that include required business outcomes (RBOs), strategic business objectives (SBOs), and desired business outcomes (DBOs). RBOs are developed and assigned to key result areas (KRAs). RBOs are operational goals required by a higher-level organization, and deliverable via an execution of operational activities of a subordinate organization. KRAs are performance measurement categories included on the subordinate organization's scorecard and the higher-level organization's scorecard. SBOs are developed and assigned to KRAs, resulting in a first alignment of RBOs with SBOs. SBOs are strategic objectives of the subordinate organization. DBOs are developed and assigned to KRAs, resulting in a second alignment of DBOs with SBOs. DBOs are desired results of the subordinate organization. Strategic goals of the higher-level organization are monitored using RBO and DBO statuses and the first and second alignments.

13 Claims, 27 Drawing Sheets

(56) References Cited

U.S. PATENT DOCUMENTS

| | | | |
|---|---|---|---|
| 2005/0222883 A1* | 10/2005 | Goldberg et al. | 705/8 |
| 2006/0085255 A1* | 4/2006 | Hastings et al. | 705/14 |
| 2006/0100945 A1 | 5/2006 | Macy et al. | |
| 2006/0106825 A1 | 5/2006 | Cozzi | |
| 2009/0112663 A1 | 4/2009 | Benayon et al. | |

OTHER PUBLICATIONS

Notice of Allowance (Mail Date Mar. 3, 2011) for U.S. Appl. No. 11/741,815, filed Apr. 30, 2007.

Giaglis, George M.; International Journal of Flexible Manufacturing Systems, vol. 13, No. 2 (2001). "A Taxonomy of Business Process Modeling and Information Systems Modeling Techniques". pp. 209-228.

Business Excellence Architects; 2006. [online]. 6 pages. [retrieved on Oct. 11, 2006]. Retrieved from the Internet: < URL: http://www.busxarchitects.com/WebPages/Bustools.htm >.

LegaSuite Business Process Management (BPM): Legacy-Aware BPM and Workflow for the SOA Enterprise; 2003-2006 Seagull Software Systems, Inc. [online]. 2 pages. [retrieved on Oct. 5, 2006]. Retrieved from the Internet: < URL: http://www.seagullsw.com/products/bpm.html >.

Office Action (Mail Date Sep. 2, 2009) for U.S. Appl. No. 11/741,815—filed Apr. 30, 2007.

Sep. 28, 2009 Response filed to Office Action (Mail Date Sep. 2, 2009) for U.S. Appl. No. 11/741,815, filed Apr. 30, 2007.

Restriction Requirement (Mail Date Jan. 5, 2010) for U.S. Appl. No. 11/741,815, filed Apr. 30, 2007.

Jan. 11, 2011 Response filed to Restriction Requirement (Mail Date Jan. 5, 2010) for U.S. Appl. No. 11/741,815, filed Apr. 30, 2007.

Final Office Action (Mail Date Mar. 30, 2010) for U.S. Appl. No. 11/741,815, filed Apr. 30, 2007.

Jun. 17, 2010 filed Request for Continued Examination (RCE) and Preliminary Amendment for U.S. Appl. No. 11/741,815, filed Apr. 30, 2007.

Sep. 28, 2010 filed Supplemental Preliminary Amendment for U.S. Appl. No. 11/741,815, filed Apr. 30, 2007.

Office Action (Mail Date Sep. 30, 2010) for U.S. Appl. No. 11/741,815, filed Apr. 30, 2007.

Dec. 28, 2010 Response filed to Office Action (Mail Date Sep. 30, 2010) for U.S. Appl. No. 11/741,815, filed Apr. 30, 2007.

U.S. Appl. No. 13/081,577, filed Apr. 7, 2011.

Apr. 21, 2011 filed Request for Continued Examination (RCE) and Information Disclosure Statement for for U.S. Appl. No. 11/741,815, filed Apr. 30, 2007.

Notice of Allowance (Mail Date May 3, 2011) for U.S. Appl. No. 11/741,815, filed Apr. 30, 2007.

Notice of Allowance (Mail Date May 27, 2011) for U.S. Appl. No. 13/081,577, filed Apr. 7, 2011.

* cited by examiner

US 8,548,840 B2

METHOD AND SYSTEM FOR MANAGING A STRATEGIC PLAN VIA DEFINING AND ALIGNING STRATEGIC PLAN ELEMENTS

FIELD OF THE INVENTION

The present invention relates to a method and system for managing a strategic plan via defining and aligning strategic plan elements, and more particularly to a technique for strategic management that incorporates defining and aligning an integrated set of strategic plan elements that includes strategic business objectives, required business outcomes, desired business outcomes, tactical programs and tactical projects.

BACKGROUND OF THE INVENTION

Known strategic planning techniques provides multi-year strategic plans, each of which includes statements of an organization's mission, vision, and objectives that describe the core strategies and success factors of the organization for a stated period of time. Activities associated with the strategic plan are quickly de-prioritized to focus on more immediate short-term activities, area-centric issues and the achievement of specific performance measures (e.g., financial) such as profit, utilization or sales. Conventionally, an organization lacks visibility as to what activities are being actioned, their status and how they align and contribute to the organization achieving its overall goals and objectives. Conventional strategic management systems make it difficult for staff members and managers to directly align and prioritize what they are doing to achieve an organization's strategic plan. These conventional strategic management systems hinder the ability of an organization to mobilize and utilize all of its resources to achieve a common objective and have visibility as to the contributions of that achievement. Further, conventional strategic planning produces broad statements of objectives that do not provide a clear direction to the organization. The response of the organization to such planning efforts is to attempt to interpret the strategy for local or operational execution; executing elements of the strategy without consultation across the organization, resulting in duplication of effort and lack of focus on the more difficult elements of the strategy; or even ignoring the strategy entirely. Still further, where an organization's direction is not described in a single strategic plan, but rather in a variety of formats (e.g., business plans, planning reports, annual or quarterly reports, progress reports, financial reports, internal and external service level agreements, value statements, etc.), it becomes more difficult for all members of the organization to understand the goals of the organization and to work towards the same goals as a unified force. Thus, there exists a need to overcome at least one of the preceding deficiencies and limitations of the related art.

SUMMARY OF THE INVENTION

The present invention provides a method of defining a strategic plan via developing a plurality of strategy elements of the strategic plan, the method comprising:

developing a plurality of required business outcomes (RBOs), the plurality of RBOs being a plurality of operational goals required by a first organization or a second organization and deliverable via an execution of one or more operational activities of a plurality of operational activities of the first organization, wherein the second organization is authorized to direct the plurality of operational activities via a plurality of strategic goals provided by the second organization;

assigning, in a many-to-one correspondence, the plurality of RBOs to a first set of key result areas (KRAs) of a plurality of KRAs that are performance measurement categories included on a performance scorecard, the performance scorecard being a measurement of performance of the first organization;

developing a plurality of strategic business objectives (SBOs) based on the plurality of strategic goals, each SBO being a multi-year strategic objective of the first organization;

assigning each SBO to one or more KRAs of the plurality of KRAs, wherein an effect of the assigning the plurality of RBOs and the assigning each SBO includes a first alignment of the plurality of RBOs with the plurality of SBOs;

developing a plurality of desired business outcomes (DBOs) based on the plurality of RBOs and the plurality of SBOs, each DBO being a description of an expected or desired result of the first organization;

assigning, in a many-to-one correspondence, the plurality of DBOs to a second set of KRAs of the plurality of KRAs, wherein an effect of the assigning the plurality of DBOs and the assigning each SBO includes a second alignment of the plurality of DBOs with the plurality of SBOs;

tracking a first status of the plurality of RBOs, the tracking the first status including tracking a status of the one or more operational activities;

tracking a second status of the plurality of DBOs, the tracking the second status including tracking a status of a plurality of tactical programs and a plurality of tactical projects associated with an achievement of the plurality of DBOs; and monitoring, in response to the tracking the first status and tracking the second status, a status of the plurality of strategic goals, the monitoring including utilizing the first status, the second status, the first alignment and the second alignment, the monitoring performed via a computer-implemented strategic management system that stores a strategic plan in a data repository coupled to the strategic management system, the strategic plan including the plurality of SBOs, the plurality of RBOs, the plurality of DBOs, the plurality of tactical programs and the plurality of tactical projects.

A system, computer program product, and a process for supporting computing infrastructure that provides at least one support service corresponding to the above-summarized method are also described and claimed herein.

Advantageously, the present invention provides a technique that facilitates: (1) the alignment of an organization's strategic plan with the strategy of higher-level regional, geographic and business line organizations, and/or shareholders and other stakeholders; (2) the alignment of an organization's own strategy elements with its performance measurement criteria; (3) the alignment of an organization's own strategy elements with its business management system and business-as-usual management processes; and (4) continual review and improvement of the execution of an organization's strategic plan. Further, the technique disclosed herein provides: (1) workflow for the management and monitoring of the performance of an organization's execution of its strategic plan; (2) workflow for the management and monitoring of funding invested into the execution of an organization's strategic plan; and (3) real-time status that demonstrates the relative performance and success of each strategy element, as the strategy element is being executed. Still further, the disclosed technique provides: (1) a mandated alignment that prioritizes activities that directly support the achievement of strategic plans and objectives; (2) establishment of cross area/organization objectives that facilitate teaming and outcome driven decision making above area-specific measures; (3) real-time visibility to management of all of the organization's activities; (4) a direct alignment of projects and programs through a balanced scorecard to enable independent outcome-based performance management; and (5) employee visibility as to how their work directly contributes to the achievement of an organization's objectives and goals.

DETAILED DESCRIPTION OF THE INVENTION

1 Overview

Figure 1:
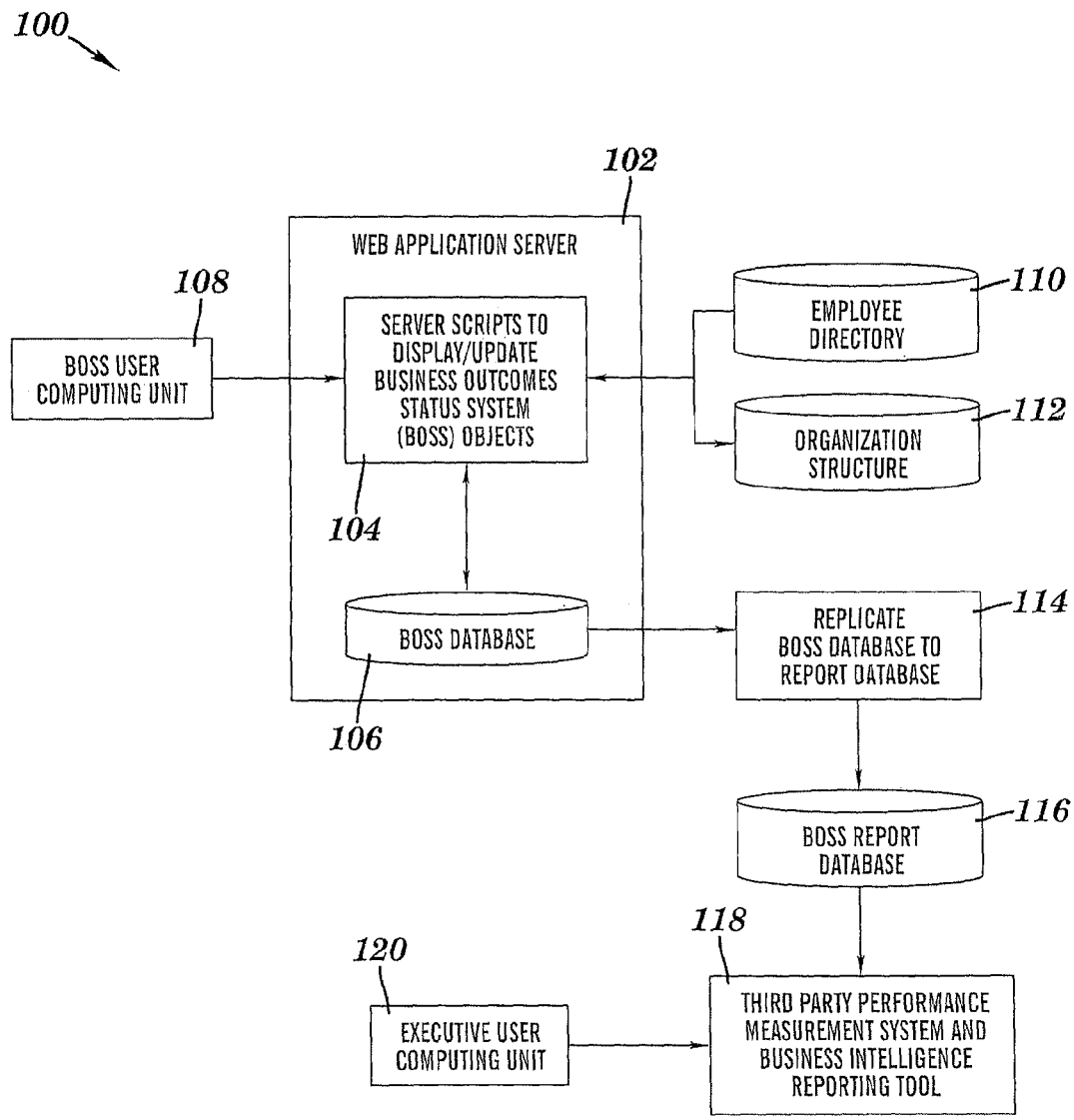
FIG. 1 is a block diagram of a strategic management system managing a strategic plan via defining and aligning strategy elements, in accordance with embodiments of the present invention.

The present invention provides a computer-implemented strategic management system (SMS) for the management of an organization's strategic plan. Hereinafter, the SMS is also referred to as the Business Outcomes Status System or BOSS. Further, the present invention provides a method of translating organizational strategy into clearly defined executable elements that are used as input into the SMS. Hereinafter, the method of translating organizational strategy is also referred to as the Strategic Enablement Method or SEM.

2 Definitions

The terms listed in this section are referred to herein and are defined as follows:

Strategic plan or strategy: A multi-year plan that includes statements of an organization's vision, mission and strategic priorities. A strategic plan or strategy may be used to communicate the plans and targets prescribed by a higher-level organization and/or shareholders and other stakeholders to a subordinate organization. The strategic themes, objectives and/or the general business approach of the higher-level organization are translated by subordinate organizations into business priorities known as strategic business objectives. As used herein, a higher-level organization is an organization that is authorized to direct operational activities of a subordinate organization via strategic goals (i.e., strategic directives, objectives, plans and targets) provided by the said higher-level organization.

Strategic business objectives (SBOs): Multi-year strategic goals that articulate an organization's mission and strategy. SBOs clearly and succinctly describe the strategic business priorities upon which the organization's executives and managers must focus their decision-making activities. In order to achieve the multi-year SBOs, short-term objectives are defined—typically for annual execution and measurement. These short-term objectives become the organization's required business outcomes and desired business outcomes. An SBO is achieved through the success of the desired business outcomes and the fulfillment of the required business outcomes that have been categorized and aligned to the SBO via the organization's performance measurement categories.

Required business outcomes (RBOs): The operational and financial plans and targets that an organization must achieve, as required by the higher-level organization and/or shareholders and other stakeholders, or by the organization itself to ensure the continued or improved sustainability and viability of the organization. RBOs are aligned to the organization's multi-year SBOs by an assignment of performance measurement categories (a.k.a. key result areas or KRAs) that map each prescribed RBO to a related SBO. RBOs are delivered through the execution of "business as usual" (BAU) operational tasks. Each organization conducts planning and prioritizes and allocates resources to achieve the organization's RBOs. Typically, the achievement of each RBO is measured by performance indicators that are defined by the higher-level organization and reported using, for example, balanced scorecard or other business management, performance management and/or reporting techniques.

Desired business outcomes (DBOs): An organization's short-term (e.g., yearly) objectives established to close identified performance gaps and to transform the organization into a desired or expected future state. As used herein, short-term is defined as a time period shorter than the multi-year time period associated with an organization's SBOs. DBOs align directly to SBOs and are established to achieve the short-term successes required to ensure the viability and sustainability of the organization as the organization works toward the achievement of the longer-term SBOs. Together, RBOs and DBOs are year-to-year building blocks of measurement and achievement for the longer-term goals of an organization. To deliver each DBO, the organization specifically defines tactical programs and tactical projects associated with the tactical programs. An owner or owners are assigned to each DBO. Owners assigned to DBOs are responsible for not only achieving, but also tracking and reporting the progress and status of the DBOs.

Tactical programs: A tactical program is a portfolio of one or more tactical projects of any size. One or more tactical programs are established to achieve each DBO. A successful completion of the tactical project(s) included in a tactical program delivers desired outcomes of the tactical program. An organization's program management method deploys tactical programs. One or more owners are assigned to each tactical program. An owner or owners assigned to a tactical program are responsible for not only achieving, but also tracking and reporting the progress and status of the tactical programs. Each tactical program is also aligned to a business area or sub-business area responsible for the tactical program and is integrated into BAU management processes.

Tactical projects: Tactical projects are the translation of a strategic plan into operational terms that can be actioned by members of an organization. Tactical projects are the end-goal of the SEM and are established to execute the tasks (i.e., activities) required to deliver an associated tactical program, which in turn supports the delivery of an organization's DBO. An organization's project management method deploys tactical projects. One or more owners are assigned to each tactical project. An owner or owners assigned to a tactical project are responsible for not only achieving, but also tracking and reporting the progress and status of the tactical project. Each tactical project is also aligned to a business area or sub-business area responsible for the tactical program and is integrated into BAU management processes.

Scorecard: A report that provides a standardized measurement of performance across multiple strategic and operational perspectives of an organization. In a balanced scorecard, the measures presented on the scorecard are balanced between external measures (i.e., measures associated with clients, marketplace, shareholders and other stakeholders) and internal measures; between financial measures and non-financial measures; and between actual (i.e., past) outcomes and future plans.

3 Strategic Management System

SMS (i.e., BOSS) is an intranet-based tool that supports the execution of an Organization's business strategy. SMS provides a business management process that is embedded in the workflow of a software tool and that facilitates the delivery of required and desired business outcomes of an organization's business strategy.

SMS is used in conjunction with SEM, which identifies and defines executable elements of an organization's business strategy within three key objective types:

Strategic business objectives (SBOs);
Required business outcomes (RBOs); and
Desired business outcomes (DBOs).

For a detailed description of the three objective types listed above, refer to the description of the Strategic Enablement Method in Section 4.

SMS supports and facilitates the alignment, monitoring, measurement, execution and evaluation (i.e., the overall management) of each executable element of an organization's strategy within the three above-listed objective types. Subsections 3.1-3.8 describe the process and procedural steps required in a strategic management process implemented by SMS.

In addition to the strategic management functions of SMS (i.e., alignment, monitoring, measurement, execution and evaluation), SMS also incorporates an "Investment" module. The Investment module enables an organization's investments and contingency tracking; spending and benefits tracking; roadmap benefit reporting; and the alignment of all RBO, DBO, tactical program and tactical project data to any other reporting system or process used by an organization through the use of report inclusion flags.

SMS also provides the ability to integrate its strategic management process with an organization's business intelligence system in order to provide the real-time status of each RBO and DBO, as well as the tactical programs and tactical projects associated with each DBO, to any type of scorecarding, dashboarding or other reporting system utilized by the organization.

FIG. 1 is a block diagram of a strategic management system 100 for managing a strategic plan via defining and aligning strategic plan elements, in accordance with embodiments of the present invention. System 100 includes a web application server 102 that includes server scripts 104 to display and/or update BOSS objects and a BOSS database 106 that includes BOSS data such as the strategic plan elements defined by the SEM. As used herein, strategic plan elements (a.k.a. strategy elements) include SBOs, RBOs, DBOs, tactical programs and tactical projects. System 100 further includes a user computing unit 108 that communicates with web application server 102 via an intranet (not shown). Also coupled to web application server 102 and included in system 100 are data repositories 110 and 112 that include employee directory data and an organization structure, respectively. Employee directory data in repository 110 is used by server scripts 104 to allocate employee names to Owner, Delegate or Viewer fields related to BOSS functions described in more detail below. Data in organization structure repository 112 is used by scripts 104 to enter information related to strategy elements for different parts (e.g., business units) of an organization. A replication process 114 replicates BOSS database 106 to a BOSS report database 116. A third party performance measurement system and business intelligence (BI) reporting tool 118 receives input data from database 116. Executive users utilize an executive user computing unit 120 to communicate with performance measurement system and BI reporting tool 118 to generate reports that monitor the status of a strategic plan and the strategic plan's related strategy elements.

Figure 2:
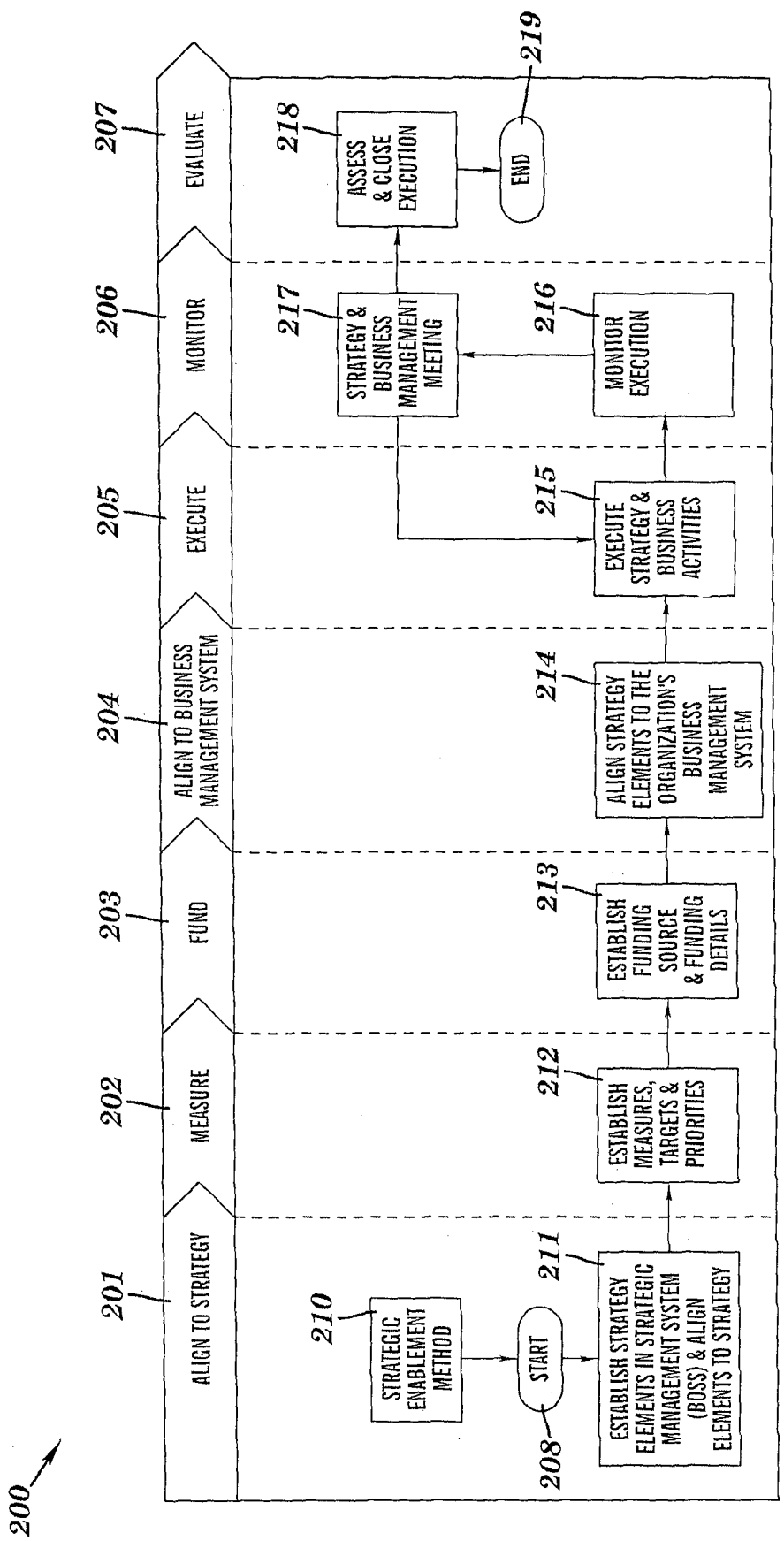
FIG. 2 is a flow diagram of a strategic management process implemented by the system of FIG. 1, in accordance with embodiments of the present invention.

FIG. 2 is a flow diagram of a strategic management process 200 implemented by the system of FIG. 1, in accordance with embodiments of the present invention. Strategic management process 200 includes seven process phases:

1. Align to Strategy 201
2. Apply Measures 202
3. Fund 203
4. Align to Business Management System 204
5. Execute 205
6. Monitor 206
7. Evaluate 207

Strategic management process 200 begins at step 208. Input to process 200 includes a strategic planning process, as executed by an organization, and a strategic plan as output by SEM 210 (see Section 4), and which includes strategy elements (i.e., SBOs, RBOs, DBOs, tactical programs and tactical projects) and performance measurement criteria, including targets, for each strategy element. In Align to Strategy phase 201, strategy elements associated with the organization are established in the SMS and the strategy elements are aligned to strategy in step 211. In step 212 in Measure phase 202, measures, targets and priorities are established in the SMS. In step 213 in Fund phase 203, funding source and funding details are established in the SMS. In step 214 in the Align to Business Management System phase 204, strategy elements are aligned to the organization's business management system. In step 215 in Execute phase 205, strategy activities and business (i.e., operational) activities are executed. In step 216 in Monitor phase 206, the execution of step 215 is monitored. In step 217 in Monitor phase 206, a strategy and business management meeting is conducted. Step 218 in Evaluate phase 207 assesses the final status and outcomes of strategy elements and the success of execution of an organization's strategy and BAU activities. The strategic management process of FIG. 2 ends at step 219 with an output of an executed strategic plan with all activities, including learning outcomes, documented in a format that is ready for review or rollover into the organization's subsequent strategic planning process.

3.1 Align to Strategy Phase

Figure 3:
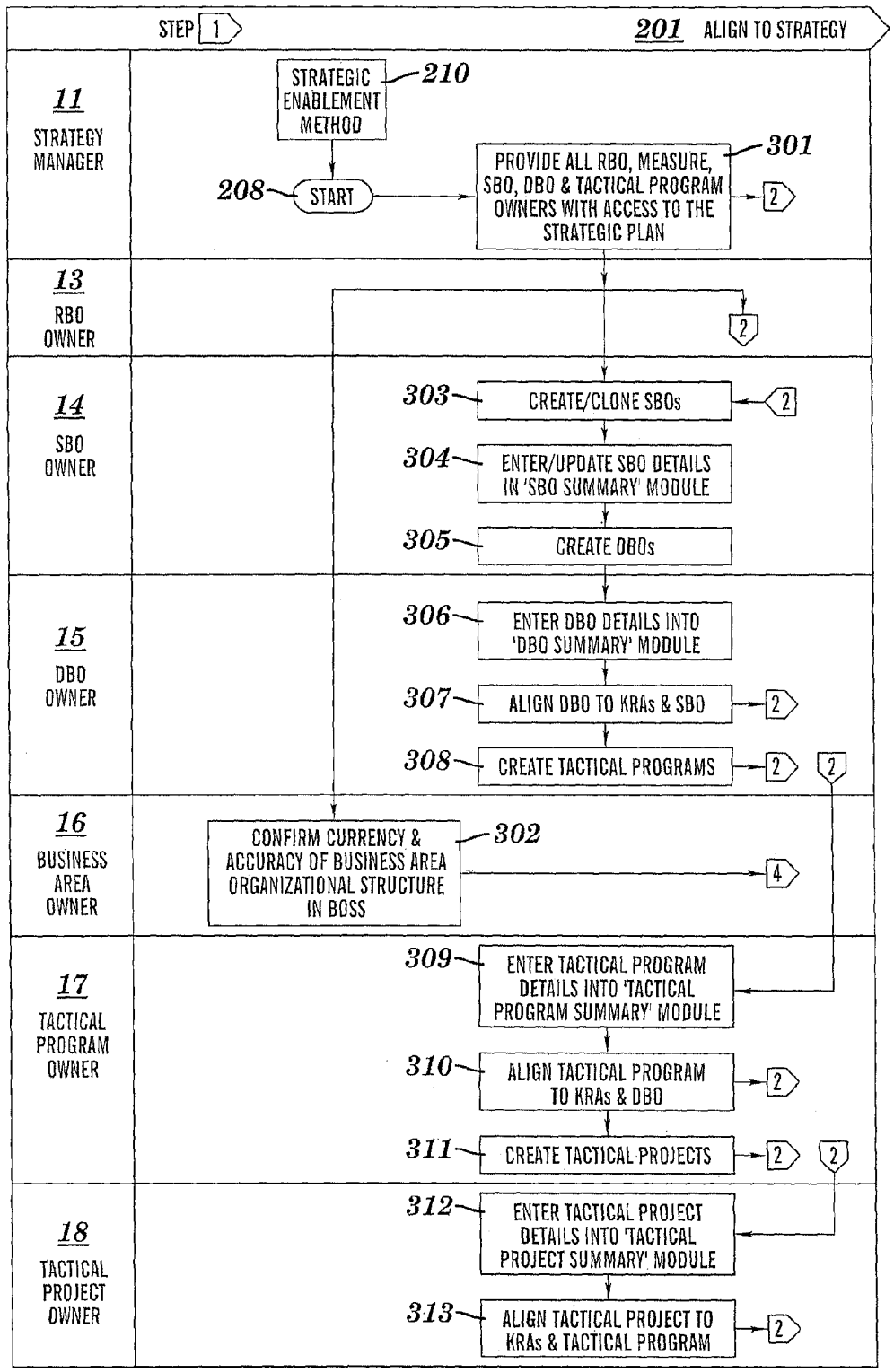
FIG. 3 is a flow diagram of an Align to Strategy phase of the process of FIG. 2, in accordance with embodiments of the present invention.

Before discussing the details of the Align to Strategy Phase depicted in FIG. 3, general comments about the usage of off-page connectors (i.e., the five-sided icons that include a single-digit number) in FIGS. 3-10 are necessary. Each single-digit number included in an off-page connector indicates a single-digit step number. Each of these single-digit step numbers corresponds to an action in one of the phases depicted in FIG. 2. Each of these actions is also illustrated by one of the figures of FIGS. 3-10. The correspondence between the single-digit step numbers and the phases and figures is shown in Table 1. Each off-page connector also corresponds to a particular manager, owner or committee that is indicated in the leftmost column of each row of FIGS. 3-10, and that performs the one or more actions depicted on that row.

TABLE 1

Figure 4:
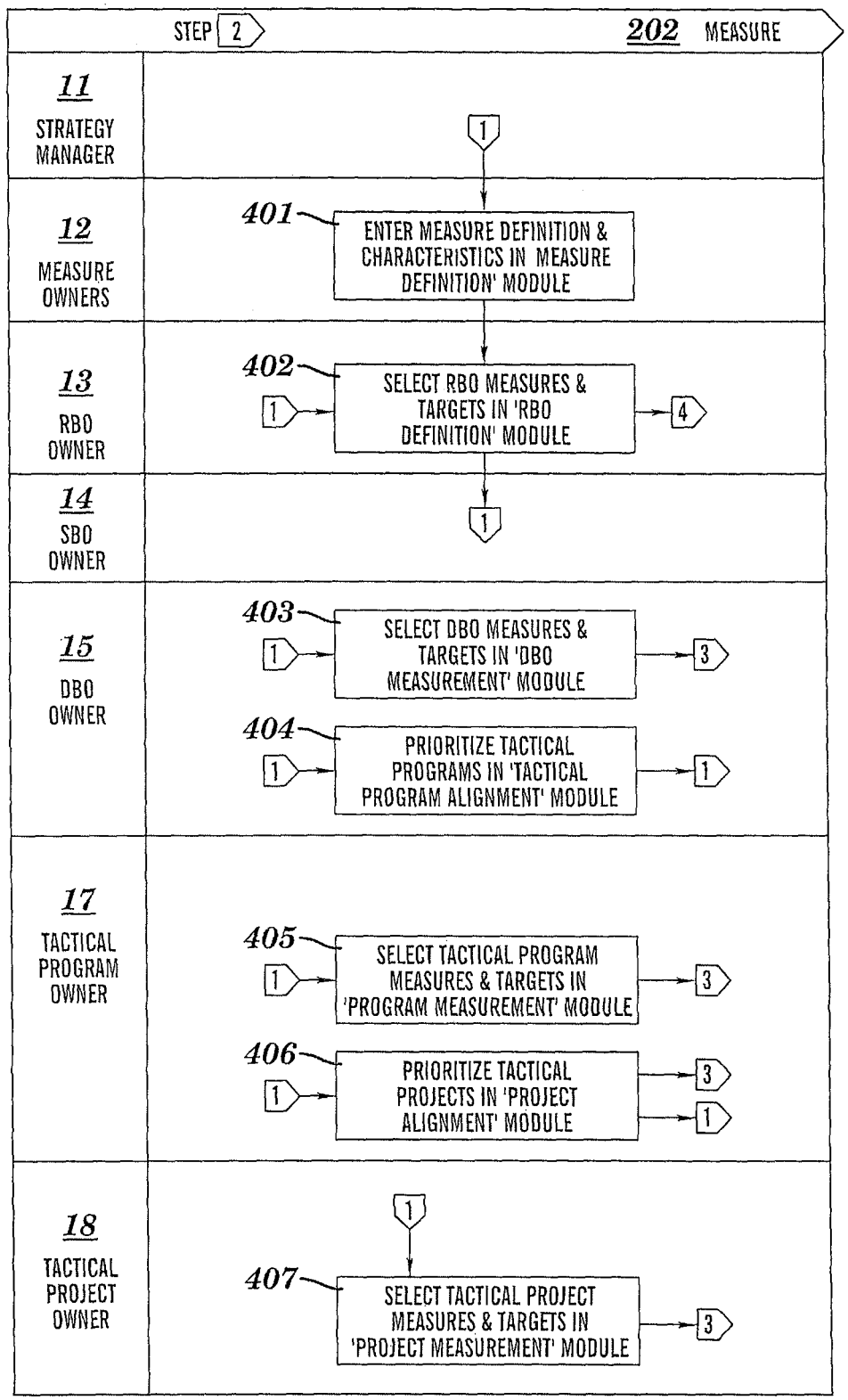
FIG. 4 is a flow diagram of a Measure phase of the process of FIG. 2, in accordance with embodiments of the present invention.
Figure 5:
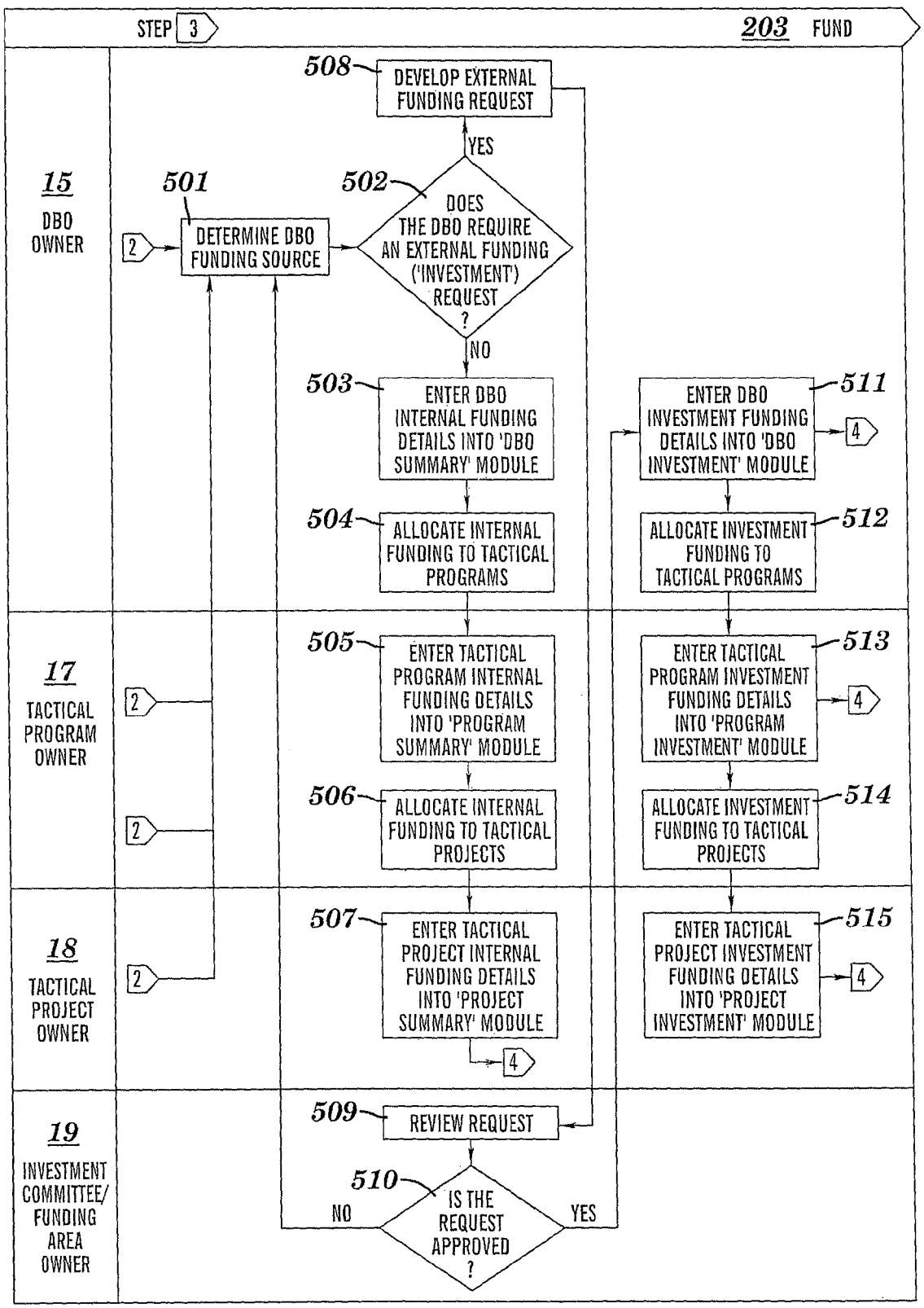
FIG. 5 is a flow diagram of a Fund phase of the process of FIG. 2, in accordance with embodiments of the present invention.
Figure 6:
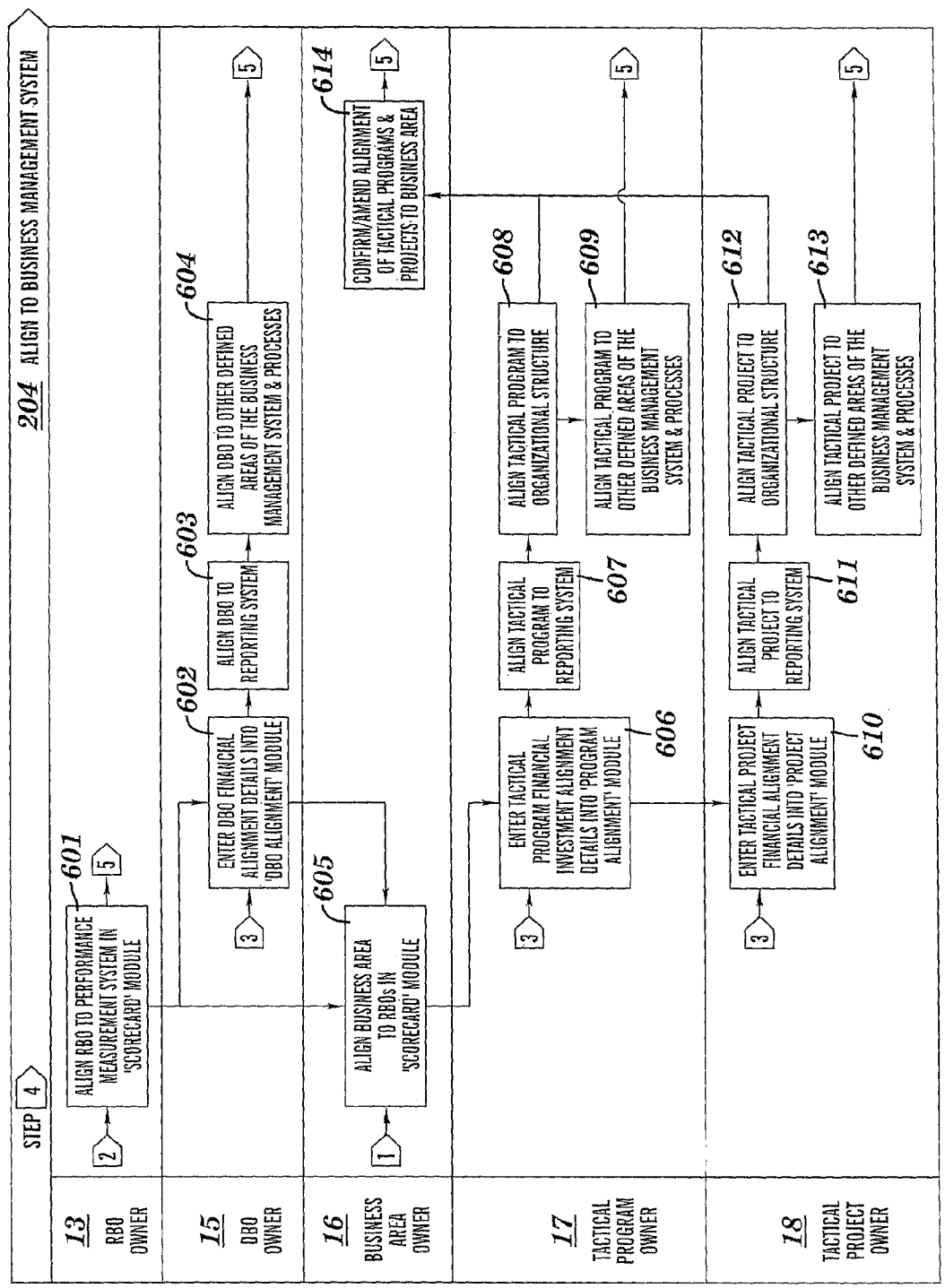
FIG. 6 is a flow diagram of an Align to Business Management System phase of the process of FIG. 2, in accordance with embodiments of the present invention.
Figure 7:
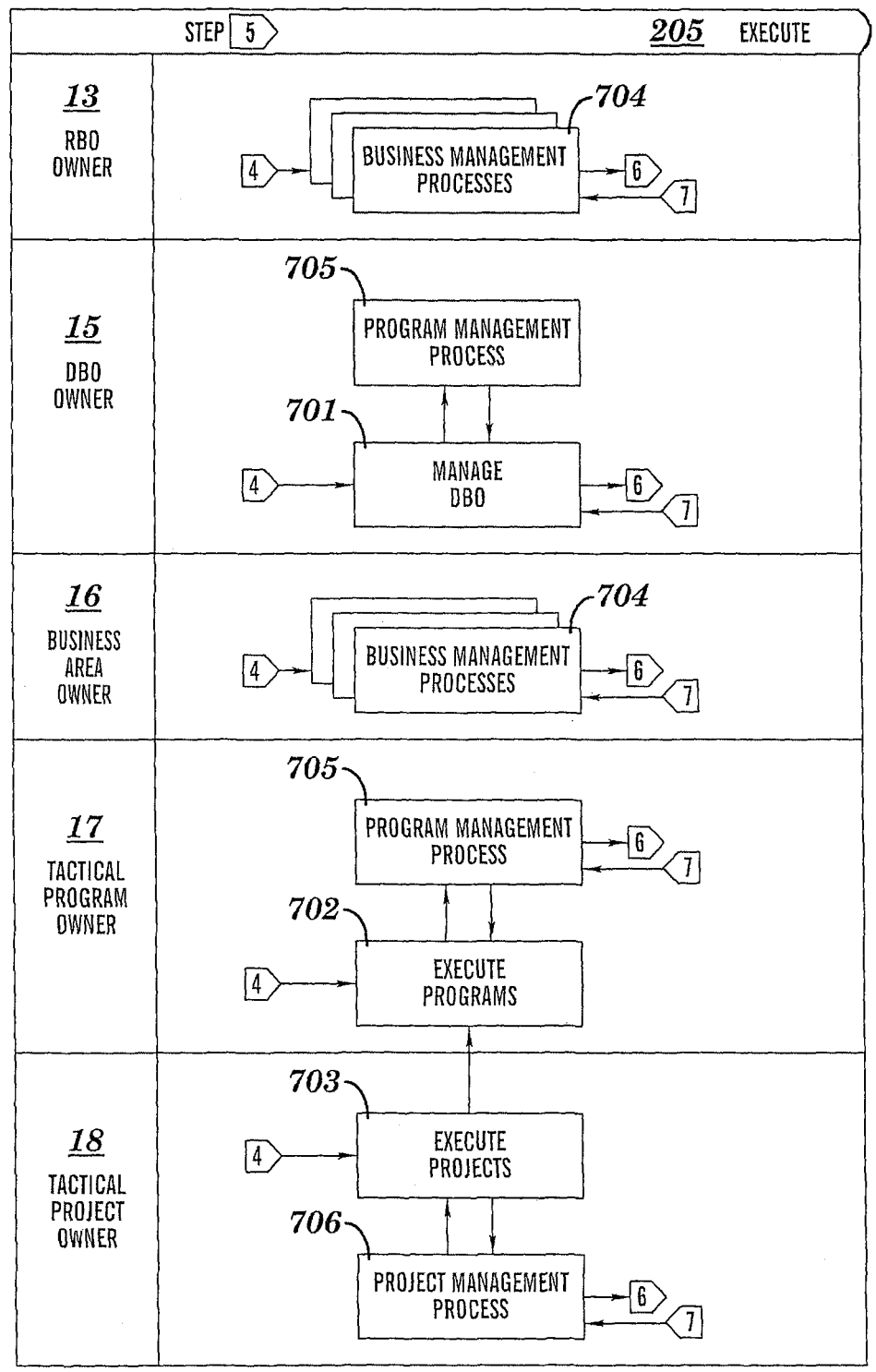
FIG. 7 is a flow diagram of an Execute phase of the process of FIG. 2, in accordance with embodiments of the present invention.
Figure 8:
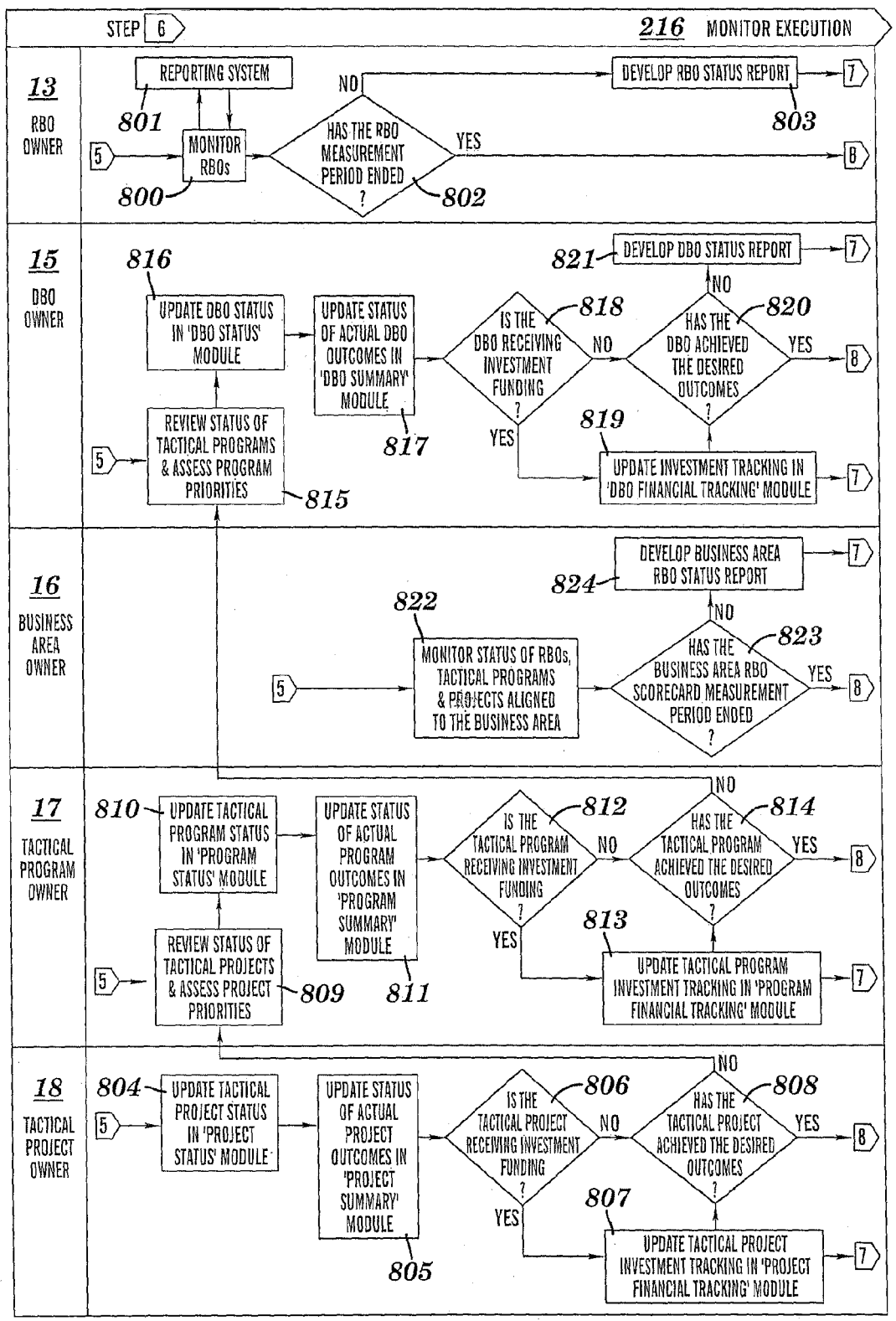
FIG. 8 is a flow diagram of a Monitor Execution step of the Monitor phase of the process of FIG. 2, in accordance with embodiments of the present invention.
Figure 9:
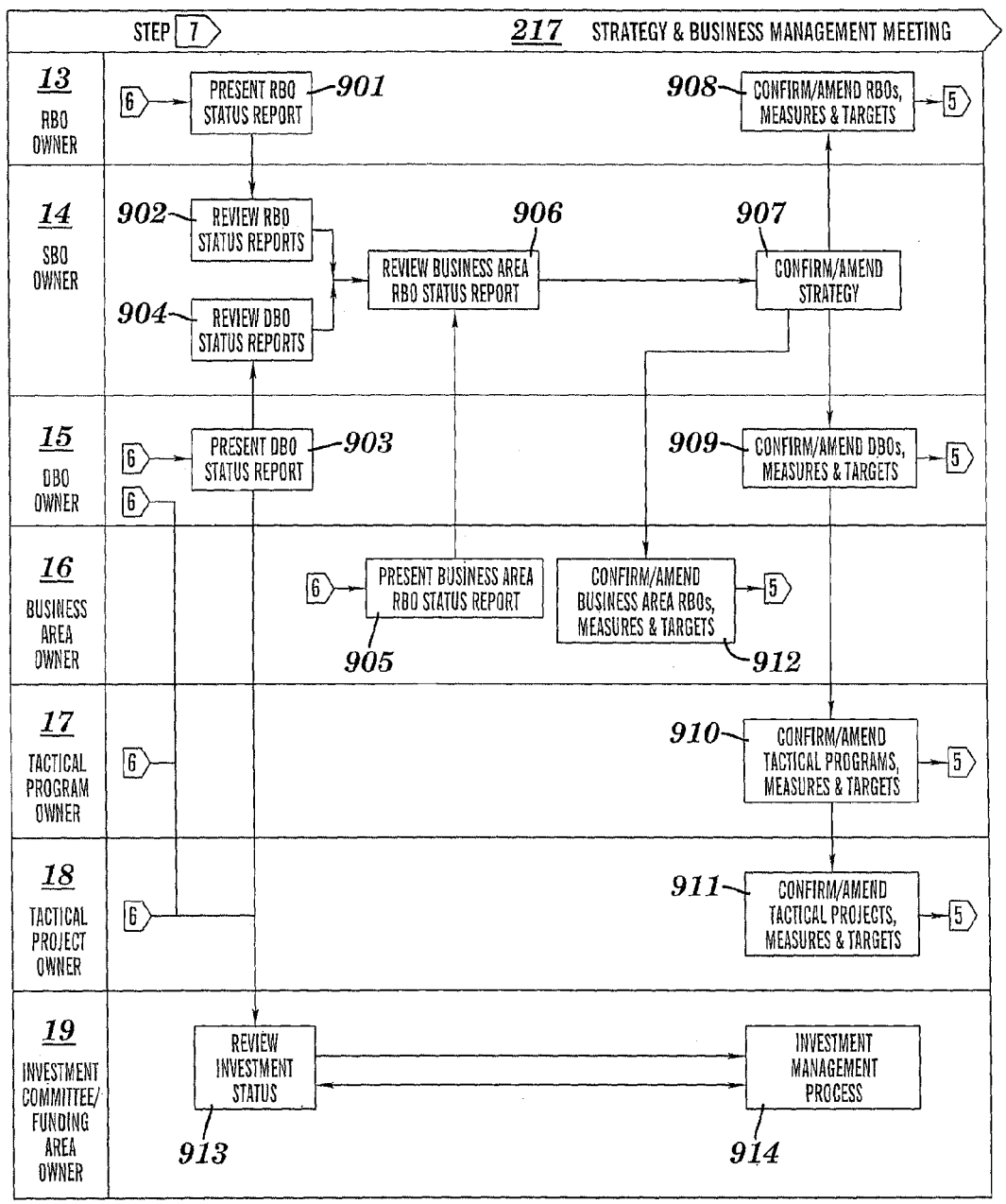
FIG. 9 is a flow diagram of a Strategy & Business Management Meeting step of the Monitor phase of the process of FIG. 2, in accordance with embodiments of the present invention.
Figure 10:
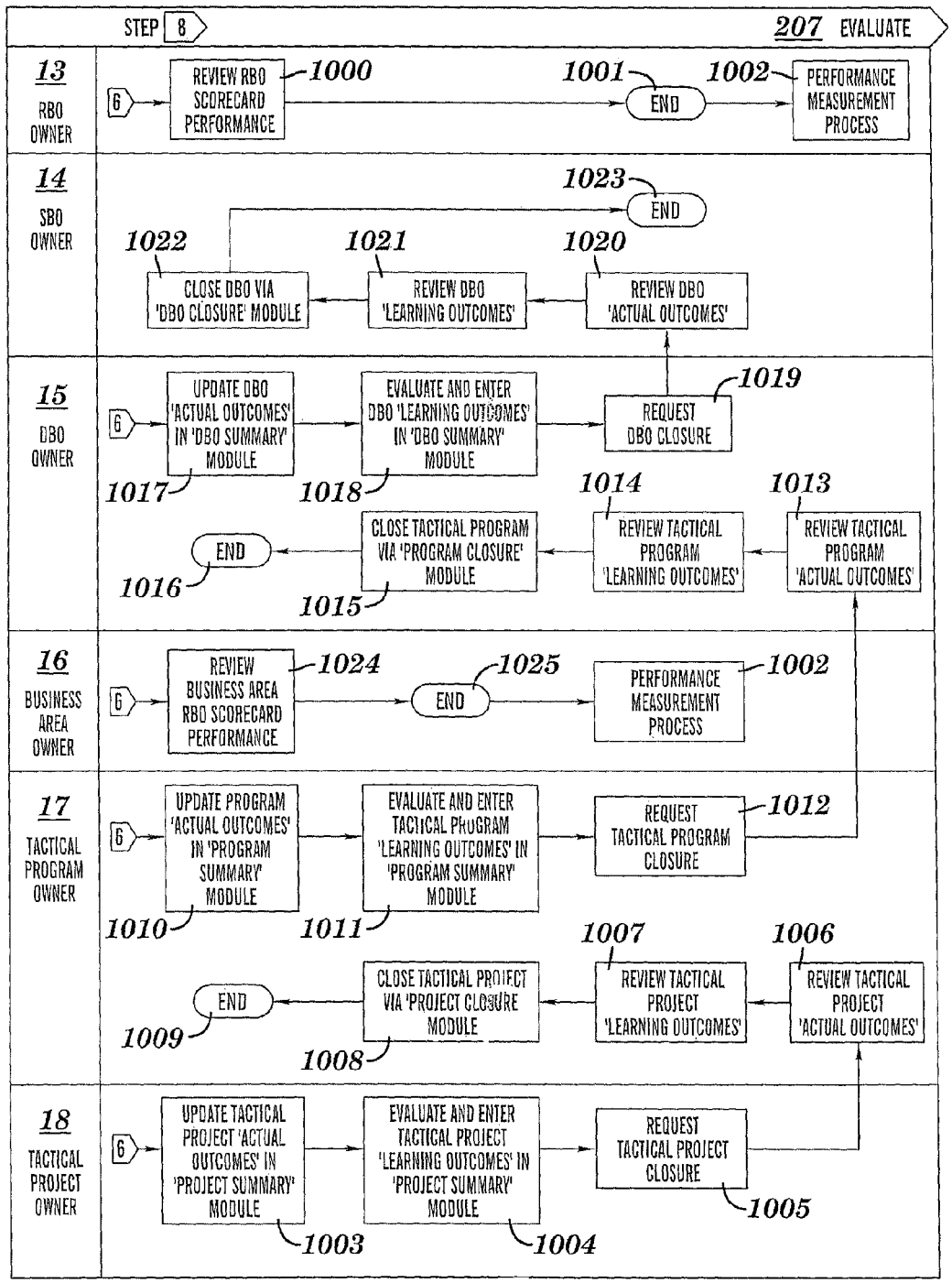
FIG. 10 is a flow diagram of an Evaluate phase of the process of FIG. 2, in accordance with embodiments of the present invention.

| Off-page connector number | FIG. | Phase or step within phase |
| --- | --- | --- |
| 1 | FIG. 3 | Align to Strategy 201 |
| 2 | FIG. 4 | Measure 202 |
| 3 | FIG. 5 | Fund 203 |
| 4 | FIG. 6 | Align to Business Management System 204 |
| 5 | FIG. 7 | Execute 205 |
| 6 | FIG. 8 | Monitor Execution 216 |
| 7 | FIG. 9 | Strategy & Business Management Meeting 217 |
| 8 | FIG. 10 | Evaluate 207 |

For example, a first off-page connector of a first figure (i.e., FIG. 3) on the row corresponding to the business area owner 16 includes the single-digit number of "4". The "4" in the first off-page connector indicates that a first action immediately preceding the first off-page connector (i.e., step 302 of FIG. 3) is followed by a second action on a second figure that corresponds to the "4" in the first off-page connector. According to Table 1, an off-page connector number of "4" corresponds to FIG. 6.

In this example, the second action is located on the second figure (i.e., FIG. 6) by first finding a second off-page connector on the second figure (i.e., FIG. 6) that indicates the first figure (i.e., includes the number "1" which corresponds to FIG. 3 according to Table 1) and is located on a row that includes the same manager/owner/committee (i.e., business area owner 16) that corresponds to the first off-page connector. That is, the second off-page connector is the connector that contains "1" on the row of FIG. 6 that has business area owner 16 in its leftmost column. The second action is then identified as the action that immediately follows the second off-page connector (i.e., step 605 of FIG. 6).

If a first set of identical off-page connectors appears in the same row of a first figure and the first set corresponds to a second set of identical off-page connectors in a corresponding row of a second figure, then each of the identical off-page connectors in the first set corresponds to a similarly aligned off-page connector in the second set. As used herein, off-page connectors are defined as being identical if the connectors include the same single-digit number and if the connectors each have an arrow pointing to the connector or each have an arrow emanating from the connector. For example, identical off-page connectors containing the number "2" follow steps 307 and 308 in the DBO owner row of FIG. 3. Of the two identical off-page connectors in this example, the off-page connector that is aligned as the topmost of the identical off-page connectors in the DBO owner row (i.e., the off-page connector that follows step 307 of FIG. 3) corresponds to the topmost of the identical off-page connectors in the DBO owner row of FIG. 4 (i.e., the off-page connector that precedes step 403 of FIG. 4). Similarly, the off-page connector that is aligned as the lowermost of the identical off-page connectors in the DBO owner row of FIG. 3 (i.e., the off-page connector that follows step 308 of FIG. 3) corresponds to the lowermost of the identical off-page connectors in the DBO owner row of FIG. 4 (i.e., the off-page connector that precedes step 404 of FIG. 4).

If identical off-page connectors appear in a first figure, but only a single off-page connector appears in the corresponding row of the corresponding figure, then all of the identical off-page connectors are associated with the single off-page connector in the corresponding row and figure. See, for example, the two identical off-page connectors having the number "4" in the tactical project owner row of FIG. 5, which correspond to the single off-page connector having the number "3" in the tactical project owner row of FIG. 6.

Returning to the discussion of the Align to Strategy phase, FIG. 3 is a flow diagram of the Align to Strategy phase 201 of the process of FIG. 2, in accordance with embodiments of the present invention. Align to Strategy phase 201 includes:

Defining and documenting the planned activities an organization will perform to achieve its strategy.

Ensuring alignment of all planned activities to the strategic objectives of an organization.

Ensuring alignment of each planned activity to the key result areas of an organization.

Ensuring alignment of each planned tactical program and tactical project to the business area or sub-business area responsible for execution of the program or project.

Centrally managing all planned activities.

The Align to Strategy phase 201 starts at step 208, A strategy manager 11 receives input to step 208 which includes organizational structure 112 (see FIG. 1) and a strategic plan output by SEM 210 (see Section 4), which includes strategy elements and performance measurement criteria, including targets, for each strategy element. In step 301, strategy manager 11 provides all RBO, measure, SBO, DBO and tactical program owners with access to the organization's finalized strategic plan provided by SEM 210. Step 301 is followed by step 302, step 303 and steps 401 and 402 of FIG. 4. In step 302, business area owner 16 confirms the currency and accuracy of business area organization structure 112 (see FIG. 1) in SMS. Step 302 is followed by step 605 of FIG. 6.

In step 303, an SBO owner 14 creates or clones SBOs in SMS (i.e., enters into SMS the SBOs that were previously developed in the SEM; see Section 4). In step 304, SBO owner 14 enters or updates SBO details in an SBO Summary module of SMS. The details entered or updated in step 304 include a name and description of each SBO, and the owner(s) of each SBO. In step 305, SBO owner 14 creates DBOs in SMS (i.e., enters into SMS the DBOs that were previously developed in the SEM; see Section 4).

In step 306, a DBO owner 15 enters DBO details into a DBO Summary module of SMS. For each DBO created in step 305, the details entered in step 306 include the DBO's name, description, owner(s), and desired outcomes, and an alignment of the DBO to KRAs and KRA elements. In step 307, DBO owner 15 aligns each DBO created in step 305 to KRAs and to an SBO created in step 303. Step 307 is followed by step 308 and by step 403 of FIG. 4. In step 308, DBO owner 15 creates tactical programs (i.e., enters into SMS the tactical programs that were previously developed in the SEM; see Section 4). Step 308 is followed by step 404 of FIG. 4.

In step 309, which follows step 404 of FIG. 4, a tactical program owner 17 enters tactical program details into a Tactical Program Summary module of SMS. For each tactical program created in step 308, the details entered in step 309 include the tactical program's name, description, owner(s), start and end dates, dependencies, and expected outcomes, an alignment of the tactical program to KRAs and KRA elements, and an alignment of the tactical program to the business area or sub-business area responsible for execution of the planned activities. In step 310, tactical program owner 17 aligns each tactical program entered in step 309 to KRAs and to a DBO created in step 305. Step 310 is followed by step 311 and by step 405 of FIG. 4. In step 311, tactical program owner 17 creates tactical projects (i.e., enters into SMS the tactical projects that were previously developed in the SEM; see Section 4). Step 311 is followed by step 406 of FIG. 4.

In step 312, which follows step 406 of FIG. 4, a tactical project owner 18 enters tactical project details into a Tactical Project Summary module of SMS. For each tactical project created in step 311, the details entered in step 312 include the tactical project's name, description, owner(s), start and end dates, dependencies, and expected outcomes, an alignment of the tactical project to KRAs and KRA elements, and an alignment of the tactical project to the business area or sub-business area responsible for execution of the planned activities. In step 313, tactical project owner 18 aligns each tactical project created in step 311 to KRAs and to a tactical program created in step 308. Step 313 is followed by step 407 of FIG. 4.

The output of the Align to Strategy phase 201 includes:
1. Current SBO Summary modules in SMS.
2. Current DBO Summary modules in SMS.
3. Current tactical program Summary modules in SMS.
4. Current tactical project Summary modules in SMS.
5. Current and accurate organizational structure 112 (see FIG. 1) in SMS.

3.2 Measure Phase

FIG. 4 is a flow diagram of the Measure phase 202 of the process of FIG. 2, in accordance with embodiments of the present invention. Measure phase 202 includes:

Defining and documenting the measurement criteria for all planned activities an organization will perform to achieve the organization's strategy.

Prioritizing the executable elements of an organization's strategy—that is, the tactical programs and projects—to ensure the appropriate level of focus is applied to the activities being executed.

Centrally managing the measurement criteria applied to all planned activities.

Input to Measure phase 202 includes:
1. Strategic plan (output from the organization's strategic planning process).
2. Current SBO 'Summary' modules in BOSS (output from Step 1.0).
3. Current DBO 'Summary' modules in BOSS (output from Step 1.0).
4. Current tactical program 'Summary' modules in BOSS (output from Step 1.0).
5. Current tactical project 'Summary' modules in BOSS (output from Step 1.0).

In step 401, measure owners 12 receive enter measure definition and characteristics in a Measure Definition module of the SMS. For each measure, the definition and characteristics entered in step 401 include: name of measure, source location, calculation method, output format and decimal places, frequency, alignment to KRAs and KRA elements, and owner(s). In step 402, RBO owner 13 selects RBO measures and targets in an RBO Definition module of SMS. Step 402 includes developing the RBO Definition module with the following data: name of RBO, target(s), tolerance, owner(s), and selected measure(s) to be applied to the RBO, where the selected measures have been aligned to the organization's KRAs and KRA elements in step 401. Step 402 is followed by step 601 of FIG. 6.

In step 403, which follows step 307 of FIG. 3, DBO owner 15 selects DBO measures and targets in a DBO Measurement module of SMS. Step 403 includes DBO owner 15 updating the DBO Measurement module with the following data relative to DBOs: selected measure(s) to be applied to the DBOs, target(s), tolerance, and owner(s). Step 403 is followed by step 501 of FIG. 5.

In step 404, which follows step 308 of FIG. 3, DBO owner 15 prioritizes tactical programs in a Tactical Program Alignment module. Step 404 includes DBO owner 15 updating the Tactical Program Alignment module with a relative priority of each tactical program within a DBO. Step 404 is followed by step 309 of FIG. 3.

In step 405, which follows step 310 of FIG. 3, tactical program owner 17 selects tactical program measures and targets in a Program Measurement module of SMS. Step 405 includes tactical program owner 17 updating the Program Measurement module with the following data relative to tactical programs: selected measure(s) to be applied to the tactical programs, target(s), tolerance and owner(s). Step 405 is followed by step 501 of FIG. 5. In step 406, which follows step 311 of FIG. 3, tactical program owner 17 prioritizes tactical projects in a Project Alignment module of SMS. Step 406 includes tactical program owner 17 updating the Project Alignment module with a relative priority of each tactical project within a tactical program portfolio. Step 406 is followed by step 312 of FIG. 3 and by step 501 of FIG. 5.

In step 407, which follows step 313 of FIG. 3, tactical project owner 18 selects tactical project measures and targets in a Project Measurement module. Step 407 includes tactical project owner 18 updating the Project Measurement module with the following data relative to tactical projects: selected measure(s) to be applied to the tactical projects, target(s), tolerance and owner(s). Step 407 is followed by step 501 of FIG. 5.

The output of the Measure phase 202 includes:
1. Current Measure Definition modules in SMS.
2. Current RBO Definition modules in SMS.
3. Current DBO Measurement modules in SMS.
4. Current tactical program Measurement modules in SMS.
5. Current tactical project Measurement modules in SMS.
6. Current tactical program Alignment modules in SMS.
7. Current tactical project Alignment modules in SMS.

3.3 Fund Phase

FIG. 5 is a flow diagram of the Fund phase 203 of the process of FIG. 2, in accordance with embodiments of the present invention. Fund phase 203 includes:
  Determining the appropriate source of funding and investment for each strategy element. Funding sources may include: (1) External investment committee; (2) External client; (3) External business area/organization; (4) Internal business area/organization; and (5) Internal business-as-usual.
  Centrally managing and monitoring the level of funding and investment allocated to and used by all strategy elements.

Input to the Fund phase 203 includes:
1. Strategic plan output from the organization's SEM.
2. Current DBO Summary modules in SMS output from Align to Strategy phase 201.
3. Current tactical program Summary modules in SMS output from Align to Strategy phase 201.
4. Current tactical project Summary modules in SMS output from Align to Strategy phase 201.
5. Funding decision criteria, which is typically provided in an organization's investment processes.

In step 501, DBO owner 15 determines a funding source for all required strategy elements. Step 501 follows each of steps 403, 405, 406 and 407 of FIG. 4. In inquiry step 502, DBO owner determines whether a DBO requires an external funding (i.e., investment) request. If the DBO does not require an external funding request, then step 503 includes DBO owner 15 entering DBO internal funding details into a DBO Summary module of SMS. The DBO internal funding details entered in step 503 include the funding source and the funding requirements relative to the DBO of step 502. In step 504, DBO owner 15 allocates internal funding to tactical programs.

In step 505, tactical program owner 17 enters tactical program internal funding details into a Program Summary module. The tactical program internal funding details entered in step 505 include the funding source and the funding requirements relative to the tactical programs of step 504. In step 506, tactical program owner 17 allocates internal funding to tactical projects.

In step 507, tactical project owner 18 enters tactical project internal funding details into a Project Summary module. The tactical project internal funding details entered in step 507 include the funding source and the funding requirements relative to the tactical projects of step 506. Step 507 is followed by step 610 of FIG. 6.

Returning to inquiry step 502, if the DBO requires an external funding request, then DBO owner 15 develops an external funding request in step 508. In step 509, an appropriate investment committee or funding area owner reviews the external funding request developed in step 508. Inquiry step 510 determines whether the investment committee or funding area owner approves the external funding request. If step 510 determines that the external funding request is approved, then in step 511, DBO owner 15 enters DBO investment funding details into a DBO Investment module of SMS. The DBO investment funding details entered in step 511 include the following data relative to a DBO: investment type, investment status, request date, approval or rejection date, currency type, labor cost, depreciation cost, capital cost, payback, current year return on investment (ROI), total ROI and investment notes and conditions.

In step 512, DBO owner 15 allocates investment funding to tactical programs. In step 513, tactical program owner 17 enters tactical program investment funding details into a Program Investment module. The tactical program investment funding details entered in step 513 include the following data relative to tactical programs: investment type, investment status, request date, approval or rejection date, currency type, labor cost, depreciation cost, capital cost, payback, current year return on investment (ROI), total ROI, and investment notes and conditions. Step 513 is followed by step 514 and by step 606 of FIG. 6.

In step 514, tactical program owner 17 allocates investment funding to tactical projects. In step 515, tactical project owner 18 enters tactical project investment funding details into a Project Investment module of SMS. The tactical project investment funding details entered in step 515 include the following data relative to tactical projects: investment type, investment status, request date, approval or rejection date, currency type, labor cost, depreciation cost, capital cost, payback, current year return on investment (ROI), total ROI, and investment notes and conditions. Step 515 is followed by step 610 of FIG. 6.

Returning to inquiry step 510, if the external funding request reviewed in step 509 is not approved, then the process of FIG. 5 repeats starting at step 501.

The output of the Fund phase 203 includes:
1. Updated DBO Summary modules in SMS.
2. Updated tactical program Summary modules in SMS.
3. Updated tactical project Summary modules in SMS.
4. Funding decision.
5. Allocated internal or external budget for execution of strategy.
6. Current DBO Investment modules in SMS.
7. Current tactical program Investment modules in SMS.
8. Current tactical project Investment modules in SMS.

3.4 Align to Business Management System Phase

FIG. 6 is a flow diagram of an Align to Business Management System phase 204 of the process of FIG. 2, in accordance with embodiments of the present invention. Align to Business Management System phase 204 includes:

Facilitating the alignment of an organization's strategy elements with its day-to-day business management system in order to make strategy operational.

Ensuring that the execution of strategy is embedded into the systems, processes and structures of the entire organization, such as performance measurement systems and processes, financial management systems and processes, reporting systems and processes, and organizational (i.e., administrative) structures.

Input to the Align to Business Management System phase 204 includes:
1. Strategic plan that is output from the organization's strategic planning process.
2. Current DBO Alignment modules in SMS (i.e., output from phase 202).
3. Current tactical program Alignment modules in SMS (i.e., output from phase 202).
4. Current tactical project Alignment modules in SMS (i.e., output from phase 202).
5. Funding decision (i.e., output from phase 203).

In step 601, which follows step 402 of FIG. 4, RBO owner 13 aligns an RBO to a performance measurement system in a Scorecard module. Step 601 includes the RBO owner developing RBO Scorecard modules in SMS with the following data: (1) selected measures to be applied to the RBO scorecard, where the measures have been aligned to the organization's KRAs and KRA elements in step 401 of FIG. 4; (2) ranking of measures within each KRA and KRA element; and (3) weighting of measures within each KRA and KRA element. Step 601 is followed by each of step 602, step 605 and business management processes 704 of FIG. 7.

In step 602, which follows step 601 and step 511 of FIG. 5, DBO owner 15 enters DBO financial alignment details into a DBO Alignment module of SMS. The DBO financial alignment details entered in step 602 update the DBO Alignment module with financial management system data that includes investment tracking identifiers and account tracking identifiers. In step 603, DBO owner 15 aligns a DBO to a reporting system. Step 603 includes the DBO owner updating the DBO Alignment module with reporting system data that includes reporting system alignment and report alignment. In step 604, DBO owner 15 aligns the DBO to other defined areas of the business management system and business management processes. Step 604 includes DBO owner 15 updating the DBO Alignment module with any other data required to align the DBOs to the organization's business management system and processes. Within the SMS tool, the fields into which data is entered in step 604 are fully customizable to the requirements of an organization. Step 604 is followed by step 701 of FIG. 7.

In step 605, which follows step 610, step 602 and step 302 of FIG. 3, business area owner 16 aligns business areas to RBOs in the Scorecard module. Step 605 includes business area owner 16 developing business area Scorecard modules in SMS with the following data: (1) selected measures to be applied to the business area scorecard, where the selected measures have been aligned to the organization's KRAs and KRA elements in step 401 of FIG. 4; (2) ranking of measures within each KRA and KRA element; and (3) weighting of measures within each KRA and KRA element.

In step 606, which follows step 605 and step 513 of FIG. 5, tactical program owner 17 enters tactical financial investment alignment details into a Program Alignment module of SMS. The tactical financial alignment details entered in step 606 update the Program Alignment module with financial management system data that includes investment tracking identifiers and account tracking identifiers. In step 607, tactical program owner 17 aligns a tactical program to the reporting system. Step 607 includes the tactical program owner updating the Program Alignment module with reporting system data that includes reporting system alignment and report alignment. In step 608, tactical program owner 17 aligns the tactical program to an organizational structure stored in organizational structure repository 112 (see FIG. 1). Step 608 includes tactical program owner 17 updating the Program Alignment module with organizational structure data that includes, for example: geographic unit, regional unit, organizational unit, business area, and sub-business area. In step 609, tactical program owner 17 aligns the tactical program to other defined areas of the business management system and business management processes. Step 609 includes tactical program owner 17 updating the Program Alignment module with any other data required to align the tactical programs to the organization's business management system and processes. Within the SMS tool, the fields into which data is entered in step 609 are fully customizable to the requirements of an organization. Step 609 is followed by step 702 of FIG. 7.

In step 610, which follows step 606 and steps 507 & 515 of FIG. 5, tactical project owner 18 enters tactical project financial alignment details into a Project Alignment module of SMS. The tactical project financial alignment details entered in step 610 update the Project Alignment module with financial management system data that includes investment tracking identifiers and account tracking identifiers. In step 611, tactical project owner 18 aligns a tactical project to the reporting system. Step 611 includes the tactical project owner updating the Project Alignment module with reporting system data that includes reporting system alignment and report alignment. In step 612, tactical project owner 18 aligns the tactical project to an organization structure from repository 112 (see FIG. 1). Step 612 includes tactical project owner 18 updating the Project Alignment module with organization structural data that includes, for example: geographic unit, regional unit, organizational unit, business area, and sub-business area. In step 613, tactical project owner 18 aligns the tactical project to other defined areas of the business management system and business management processes. Step 613 includes tactical project owner 18 updating the Project Alignment module with any other data required to align the tactical projects to the organization's business management system and processes. Within the SMS tool, the fields into which data is entered in step 613 are fully customizable to the requirements of an organization. Step 613 is followed by step 703 of FIG. 7. In step 614, which follows step 612, business area owner 16 confirms or amends alignment of tactical programs and tactical projects to business areas. Step 614 includes the business area owner reviewing the tactical program and tactical project Summary and Alignment modules of all tactical programs and tactical projects aligned to a business area to ensure that the business area has the capability to achieve the expected outcomes of all tactical programs and tactical projects aligned to the business area. Step 614 is followed by business management processes 704 of FIG. 7.

The output of the Align to Business Management System phase 204 includes:
1. Current RBO and Business Area RBO-Scorecard modules in SMS.
2. Updated DBO Alignment modules in SMS.
3. Updated tactical program Alignment modules in SMS.
4. Updated tactical project Alignment modules in SMS.

3.5 Execute Phase

FIG. 7 is a flow diagram of an Execute phase 205 of the process of FIG. 2, in accordance with embodiments of the present invention. Execute phase 205 includes executing the strategy using the organization's prescribed business, program and project management processes.

Input to execute phase 205 includes:
1. Strategic plan which is output from the organization's strategic planning process.
2. Current RBO Scorecard modules in SMS (i.e., output from phase 204).
3. Current DBO Summary, Alignment and Investment modules in SMS (i.e., output from phases 201-204 of FIGS. 3-6, respectively).
4. Current tactical program Summary, Alignment and Investment modules in SMS (i.e., output from phases 201-204 of FIGS. 3-6, respectively).
5. Current tactical project Summary, Alignment and Investment modules in SMS (i.e., output from phases 201-204 of FIGS. 3-6, respectively).

In step 701, which follows step 604 of FIG. 6 and step 908 of FIG. 9, DBO owner 15 manages a DBO. Step 701 includes the DBO owner utilizing program management process 705 for managing and controlling performance to achieve DBOs. Step 701 is followed by step 815 of FIG. 8. In step 702, which follows step 703 and step 609 of FIG. 6, tactical program owner 17 executes tactical programs. Step 702 includes the tactical program owner utilizing program management process 705 to manage performance and execute activities to achieve the tactical programs. Program management process 705 relative to the tactical program owner follows step 910 of FIG. 9 and is followed by step 809 of FIG. 8. Program management process 705 relative to the tactical project owner follows step 911 of FIG. 9 and is followed by step 804 of FIG. 8. In step 703, which follows step 613 of FIG. 6, tactical project owner 18 executes tactical projects. Step 703 includes tactical project owner 18 utilizing project management process 706 to manage performance and execute activities to achieve the tactical projects.

Business management processes 704 relative to RBO owner 13 follows step 908 of FIG. 9 and is followed by step 800 of FIG. 8. Business management processes 704 relative to business area owner 16 follows step 912 of FIG. 9 and is followed by step 822 of FIG. 8.

It should be noted that management and control of performance to achieve the organizational RBOs and business area RBOs, as selected on each business area scorecard, are executed as 'business-as-usual' activities.

The output of the Execute phase 205 includes:
1. Initiation and execution of DBO activities.
2. Initiation and execution of tactical program activities and tasks.
3. Initiation and execution of tactical project activities and tasks.

3.6 Monitor Phase—Monitor Execution

FIG. 8 is a flow diagram of a Monitor Execution step 216 of the Monitor phase of the process of FIG. 2, in accordance with embodiments of the present invention. Monitor Execution step 216 includes:

Assessing the current status of execution of an organization's strategy and 'business-as-usual' activities.

Monitoring the progress and achievement of outcomes (i.e., milestones) for each strategy element.

Centrally monitoring the level of funding and investment used by all strategy elements.

The input of Monitor Execution step 216 includes:
1. Strategic plan which is output from the organization's strategic planning process.
2. Current DBO Summary modules in SMS (i.e., output from phase 203 of FIG. 5).
3. Current tactical program Summary modules in SMS (i.e., output from phase 203 of FIG. 5).
4. Current tactical project Summary modules in SMS (i.e., output from phase 203 of FIG. 5).
5. Current tactical program Alignment modules in SMS (i.e., output from phase 204 of FIG. 6).
6. Current tactical project Alignment modules in SMS (i.e., output from phase 204 of FIG. 6).

In step 800, which follows step 704 of FIG. 7, RBO owner 13 monitors RBOs via a reporting system 801 that uses data from the Scorecard modules in SMS. Step 800 is followed by step 802. If inquiry step 802 determines that the RBO measurement (a.k.a. assessment) period has not ended, then in step 803, RBO owner 13 develops an RBO status report using data from the Scorecards modules in SMS. Step 803 is followed by step 901 of FIG. 9. If inquiry step 802 determines that the RBO measurement period has ended (i.e., allowing final measurement of the RBO to occur), then step 803 is followed by step 1000 of FIG. 10.

In step 804, which follows the project management process 706 of FIG. 7, tactical project owner 18 updates tactical project status in a Project Status module of SMS. Step 804 includes the tactical project owner developing the Project Status module with the following data: status period, overall status, overall assessment, schedule status, schedule assessment, deliverable status, deliverable assessment, financial status, and financial assessment. In step 805, tactical project owner 18 assesses the tactical project actual outcomes and updates the actual project outcomes and the status of actual project outcomes in a Project Summary module. If inquiry step 806 determines that the tactical project is receiving investment funding (i.e., determines whether the status of external investment funding is to be assessed for the tactical project), then in step 807, the tactical project owner updates tactical project investment tracking in a Project Financial Tracking module of SMS. The update in step 807 includes an update of the following data: forecast spend, actual spend, forecast gross benefit, actual gross benefit, savings (cost) percentage allocation, forecast net savings (cost) allocation, and roadmap spend management. Step 807 is followed by step 913 of FIG. 9. If inquiry step 806 determines that the tactical project is not receiving investment funding, then inquiry step 808 determines whether the tactical project has achieved its expected or desired outcomes. If the tactical project has not achieved its expected or desired outcomes in step 808, the monitor execution process continues with step 809; otherwise, step 808 is followed by step 1003 of FIG. 10.

In step 809, which follows the No branch of step 808 and the program management process 705 in the tactical program owner portion of FIG. 7, tactical program owner 17 reviews the status of tactical projects and assesses project priorities (i.e., reviews the relative priority of each tactical project). In step 810, tactical program owner 17 updates tactical program status in a Program Status module of SMS if such an update is required by the assessment in step 809. Step 810 includes the tactical program owner developing the Program Status module with the following data: status period, overall status, overall assessment, schedule status, schedule assessment, deliverable status, deliverable assessment, financial status, and financial assessment. In step 811, the tactical program owner assesses the tactical program actual outcomes and updates the actual program outcomes and status of actual program outcomes in a Program Summary module of SMS. If inquiry step 812 determines that the tactical program is receiving investment funding (i.e., determines whether the status of external investment funding is to be assessed for the tactical program), then in step 813, the tactical program owner updates the tactical program investment tracking in a Program Financial Tracking module of SMS. The update in step 813 includes an update of the following data: forecast spend, actual spend, forecast gross benefit, actual gross benefit, savings (cost) percentage allocation, forecast net savings (cost) allocation, and roadmap spend management. Step 813 is followed by step 913 of FIG. 9. If inquiry step 812 instead determines that the tactical program is not receiving investment funding, then inquiry step 814 determines if the tactical program has achieved its expected or desired outcomes.

If the tactical program has not achieved its expected or desired outcomes, as determined by step 814, then step 815 follows step 814; otherwise step 814 is followed by step 1010 of FIG. 10. In step 815, which follows the No branch of step 814 and step 701 of FIG. 7, DBO owner 15 reviews the status of tactical programs and assesses program priorities (i.e., reviews the relative priority of each tactical program). In step 816, DBO owner 15 updates DBO status in a DBO Status module of SMS as required by the assessment of step 815. Step 816 includes the DBO owner developing the DBO Status module with the following data: status period, overall status, overall assessment, schedule status, schedule assessment, deliverable status, deliverable assessment, financial status, and financial assessment. In step 817, DBO owner 15 assesses the DBO actual outcomes and updates the actual DBO outcomes and status of actual DBO outcomes in a DBO Summary module. If inquiry step 818 determines that the DBO is receiving investment funding (i.e., determines whether the status of external investment funding is to be assessed for the DBO), then in step 819, the DBO owner updates investment tracking in a DBO Financial Tracking module in SMS. The update in step 819 includes an update of the following data: forecast spend, actual spend, forecast gross benefit, actual gross benefit, savings (cost) percentage allocation, forecast net savings (cost) allocation, and roadmap spend management. Step 819 is followed by step 820, which is described below, and by step 913 of FIG. 9.

If inquiry step 818 determines that the DBO is not receiving investment funding, then inquiry step 820 determines whether the DBO has achieved its expected or desired outcomes. If step 820 determines that the DBO has not achieved its expected or desired outcomes, then step 820 is followed by step 821; otherwise step 820 is followed by step 1017 of FIG. 10. In step 821, the DBO owner develops a DBO status report. Step 821 includes the DBO owner monitoring DBOs and developing a status report using data from the DBO Status, Summary and Financial Tracking modules in SMS. Step 821 is followed by step 903 of FIG. 9.

In step 822, which follows the business management processes 704 in the business area owner portion of FIG. 7, business area owner 16 monitors the status of RBOs, tactical programs, and tactical projects aligned to the business area owned by the business area owner. If inquiry step 823 determines that the business area's RBO scorecard measurement (a.k.a. assessment) period has not ended, then the business area owner develops a business area RBO status report in step 824. Step 824 is followed by step 905 of FIG. 9. If inquiry step 823 determines that the business area's RBO scorecard measurement period has ended (i.e., allowing the final measurement of the business area's RBOs to occur), then step 823 is followed by step 1024 of FIG. 10.

The output of Monitor Execution step 216 includes:
1. RBO status report.
2. DBO status report.
3. Business Area RBO status report.
4. Updated DBO Status, Summary and Financial Tracking modules in SMS.
5. Updated tactical program Status, Summary, Alignment and Financial Tracking modules in SMS.
6. Updated tactical project Status, Summary, Alignment and Financial Tracking modules in SMS.

3.7 Monitor Phase—Strategy & Business Management Meeting

FIG. 9 is a flow diagram of the Strategy & Business Management Meeting step 217 of the Monitor phase of the process of FIG. 2, in accordance with embodiments of the present invention. Strategy & Business Management Meeting step 217 includes:

Reviewing the current status of execution of an organization's strategy.

Reviewing the progress and achievement of outcomes (i.e., milestones) for each RBO and DBO.

Reviewing the status of funding and investment used when executing an organization's strategy.

Encouraging cross-organizational decision-making, consensus and understanding of the execution status of an organization's end-to-end strategy.

The input of Strategy & Business Management Meeting step 217 includes:
1. Strategic plan, which is output from the organization's strategic planning process.
2. RBO status report (i.e., output from Monitor Execution step 216 of FIG. 8).
3. DBO status report (i.e., output from Monitor Execution step 216 of FIG. 8).
4. Current DBO Status, Summary and Financial Tracking modules in SMS (i.e., output from Monitor Execution step 216 of FIG. 8).
5. Current tactical program Status, Summary, Alignment and Financial Tracking modules in SMS (i.e., output from Monitor Execution step 216 of FIG. 8).
6. Current tactical project Status, Summary, Alignment and Financial Tracking modules in SMS (i.e., output from Monitor Execution step 216 of FIG. 8).

In step 901, which follows step 803 of FIG. 8, RBO owner 13 presents RBO status reports. In step 902, SBO owner 14 reviews the RBO status reports. Step 902 also includes the SBO owner reviewing the relative priority of each program and project and updating where required. Step 902 is followed by step 906. In step 903, which follows step 821 of FIG.

8, DBO owner 15 presents DBO status reports. Step 903 is followed by step 904 and by step 913. In step 904, the SBO owner reviews the DBO status reports. Step 904 also includes the SBO owner reviewing the relative priority of each program and project and updating where required. Step 904 is followed by step 906. In step 905, which follows step 824 of FIG. 8, business area owner 16 presents a business area RBO status report. In step 906, which follows steps 902, 904, and 905, SBO owner 14 reviews the business area RBO status report. Step 906 also includes the SBO owner reviewing the relative priority of each program and project and updating where required. In step 907, the SBO owner confirms or amends the strategy. Step 907 is followed by steps 908, 909, and 912.

In step 908, RBO owner 13 confirms or amends the RBOs, measures and targets in the RBO Status, Summary and Financial Tracking modules in SMS. Step 908 is followed by business management processes 704 in the RBO owner portion of FIG. 7. In step 909, which follows step 907, DBO owner 15 confirms or amends DBOs, measures and targets in the DBO Status, Summary and Financial Tracking modules in SMS. Step 909 is followed by step 910 and by step 701 of FIG. 7. In step 910, tactical program owner 17 confirms or amends tactical programs, measures and targets in the Program Status, Summary and Financial Tracking modules in SMS. Step 910 is followed by step 911 and by program management process 705 in the tactical program owner portion of FIG. 7. In step 911, tactical project owner 18 confirms or amends tactical projects, measures and targets in the Project Status, Summary and Financial Tracking modules in SMS. Step 911 is followed by project management process 706 of FIG. 7.

In step 912, which follows step 907, business area owner 16 confirms or amends business area RBOs, measures and targets in the business area RBO status report. Step 912 is followed by step business management processes 704 in the business area owner portion of FIG. 7. In step 913, which follows step 903 and steps 807, 813 & 819 of FIG. 8, investment committee or funding area owner 19 reviews the investment status (i.e., the status of DBOs, tactical programs and tactical projects receiving investment funding) using data from Financial Tracking modules via an investment management process 914.

The output of the Align to Strategy phase 201 includes:
1. Updated/confirmed RBOs, measures and targets.
2. Updated/confirmed DBOs, measures and targets.
3. Updated/confirmed tactical programs, measures and targets.
4. Updated/confirmed tactical projects, measures and targets.

3.8 Evaluate Phase

FIG. 10 is a flow diagram of the Evaluate phase 207 of the process of FIG. 2, in accordance with embodiments of the present invention. Evaluate phase 207 includes:
  Updating the final status and outcomes of a DBO, tactical program and tactical project in order to request closure.
  Reviewing and validating that the desired or expected outcomes of a DBO, tactical program or tactical project have been achieved, prior to closure.
  Determining and evaluating "lessons learned" during DBO, tactical program and/or tactical project execution.
  Assessing the overall success of execution of an organization's strategy and BAU activities for use as input into the organization's performance measurement and strategic planning processes.

The input to Evaluate phase 207 includes:
1. Strategic plan, which is output from the organization's strategic planning process.
2. Current DBO Status, Summary and Financial Tracking modules in SMS (i.e., output from Monitor Execution step 216 of FIG. 8).
3. Current tactical program Status, Summary and Financial Tracking modules in SMS (i.e., output from Monitor Execution step 216 of FIG. 8).
4. Current tactical project Status, Summary and Financial Tracking modules in SMS (i.e., output from Monitor Execution step 216 of FIG. 8).

In step 1000, which follows the Yes branch of step 802 of FIG. 8, RBO owner 13 reviews the scorecard performance of an RBO. The review of step 1000 uses data from the Scorecard modules in SMS. The RBO owner review portion of Evaluate phase 207 ends at step 1001. The output of step 1000 is input into performance measurement process 1002.

In step 1003, which follows the Yes branch of step 808 of FIG. 8, tactical project owner 18 updates tactical project actual outcomes in a Project Summary module of SMS. Step 1003 includes tactical project owner 18 assessing, updating and finalizing tactical project actual outcomes with actual outcome status and actual outcomes. In step 1004, tactical project owner 18 evaluates and enters tactical project learning outcomes in the Project Summary module. Step 1004 includes tactical project owner 18 evaluating, updating and finalizing tactical project learning outcomes and updating the Project Summary module. In step 1005, the tactical project owner requests tactical project closure via a Project Closure module of SMS. In step 1006, tactical program owner 17 reviews the final status and actual outcomes of the tactical program whose closure is requested in step 1005. The review in step 1006 uses data from the Status, Summary and Financial Tracking modules associated with the tactical project. In step 1007, tactical program owner 17 reviews tactical project learning outcomes entered in step 1004. The review in step 1007 uses learning outcomes data in the Project Summary module. In step 1008, the tactical program owner closes the tactical project whose closure was requested in step 1005. The closing of the tactical project in step 1008 is performed via the Project Closure module of SMS. The tactical project closure portion of Evaluate phase 207 ends at step 1009.

In step 1010, which follows the Yes branch of step 814 of FIG. 8, tactical program owner 17 updates actual outcomes of a tactical program in a Program Summary module of SMS. Step 1010 includes tactical program owner 17 assessing, updating and finalizing tactical program actual outcomes with actual outcome status and actual outcomes. In step 1011, tactical program owner 17 evaluates and enters learning outcomes of the tactical program of step 1010 in the Program Summary module. Step 1011 includes tactical program owner 17 evaluating, updating and finalizing tactical program learning outcomes and updating the Program Summary module. In step 1012, the tactical program owner requests closure of the tactical program of steps 1010 and 1011 via a Program Closure module of SMS. In step 1013, DBO owner 15 reviews the final status and actual outcomes of the tactical program whose closure is requested in step 1012. The review in step 1013 uses data from the Status, Summary and Financial Tracking modules associated with the tactical program. In step 1014, DBO owner 15 reviews the tactical program learning outcomes of step 1011. The review in step 1014 uses learning outcomes data in the Program Summary module. In step 1015, DBO owner 15 closes the tactical program whose closure is requested in step 1012. The closure of step 1015 is performed via the Program Closure module of SMS. The tactical program closure portion of Evaluate phase 207 ends at step 1016.

In step 1017, which follows the Yes branch of step 820 of FIG. 8, DBO owner 15 updates actual outcomes of a DBO in a DBO Summary module of SMS. Step 1017 includes DBO owner 15 assessing, updating and finalizing DBO actual outcomes with actual outcome status and actual outcomes. In step 1018, DBO owner 15 evaluates and enters learning outcomes of the DBO of step 1017 in the DBO Summary module. Step 1018 includes DBO owner 15 evaluating, updating and finalizing DBO learning outcomes and updating the DBO Summary module. In step 1019, DBO owner 15 requests a closure of the DBO of steps 1017 and 1018 via a DBO Closure module of SMS. In step 1020, SBO owner 14 reviews the DBO's final status and actual outcomes of step 1017. The review in step 1020 uses data from the Status, Summary and Financial Tracking modules associated with the DBO whose closure is requested in step 1019. In step 1021, SBO owner 14 reviews the DBO learning outcomes of step 1018. The review in step 1021 uses learning outcomes data in the DBO Summary module. In step 1022, SBO owner 14 closes the DBO whose closure is requested in step 1019. The closure in step 1022 is performed via the DBO Closure module of SMS. The DBO closure portion of the Evaluate phase 207 ends at step 1023.

In step 1024, which follows the Yes branch of step 823 of FIG. 8, business area owner 16 reviews the scorecard performance of a business area's RBOs using data from the Scorecard modules in SMS. The review of step 1024 ends at step 1025. The output of step 1024 is input into performance measurement process 1002.

The output of Evaluate phase 207 includes:
1. Updated tactical project 'Summary' module in BOSS.
2. Activated tactical project 'Closure' module in BOSS.
3. Updated tactical program 'Summary' modules in BOSS.
4. Activated tactical program 'Closure' module in BOSS.
5. Updated DBO 'Summary' modules in BOSS.
6. Activated DBO 'Closure' module in BOSS.
7. Activated RBO 'Closure' module in BOSS.

4 Strategic Enablement Method

The Strategic Enablement Method (SEM) is a step-by-step procedure for defining an organization's overall strategic plan and then translating the strategic plan into clearly defined executable elements—down to project definition. Further, SEM includes identifying and defining the executable elements of the strategic plan in a way that can be easily understood and actioned by all members of the organization. SEM provides clear insight into an organization by providing visibility to all the activities performed by the organization in support of its strategy. Because SEM is a single, inclusive and clear method for defining and describing the strategic plan and the strategic plan's executable elements, an organization can focus its energy and resources with shared goals and decision-making based upon organizational priorities, and plan for and be responsive to the changing internal and external circumstances of the organization's environment. SEM facilitates driving organizational and operational activities and behaviors by shared strategic objectives.

SEM can be applied to any organizational size, and is particularly applicable to large organizations where higher-level organizations and/or shareholders and other stakeholders develop strategic priorities and subordinate organization(s) are required to execute and manage the implementation of the strategy. SEM facilitates the alignment of such priorities, including goals and objectives, from regional, geographic and business line higher-level organizations to subordinate organizations.

SEM is used to translate broad strategy into an integrated set of executable elements within three key objective types:
1. Strategic business objectives (SBOs)
2. Required business outcomes (RBOs)
3. Desired business outcomes (DBOs).

SEM is executed by an organization using its defined RBOs, where BAU activities occur, and using its defined DBOs within which the following two deployment methods are used:
1. Tactical programs
2. Tactical projects Together, the aforementioned SBOs, RBOs, DBOs, tactical programs and tactical projects are the strategy elements that form the foundation of the Strategic Enablement Method.

Figure 11:
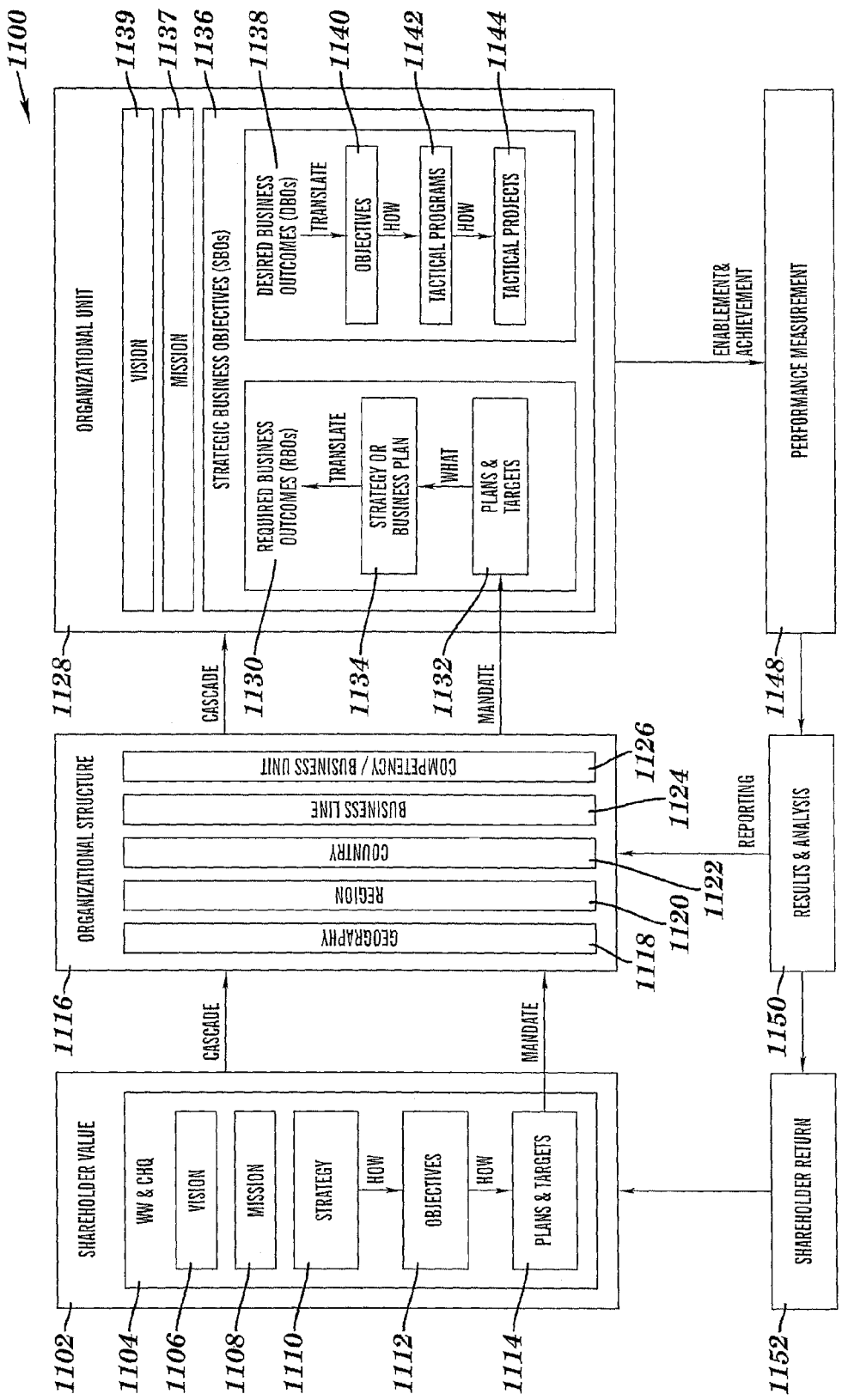
FIG. 11 is a block diagram of a system (i.e., Strategic Enablement Model) for translating strategic priorities of an organization into executable elements that are incorporated into the system of FIG. 1, in accordance with embodiments of the present invention.

FIG. 11 is a system (i.e., Strategic Enablement Model) 1100 for translating strategic priorities of an organization into executable elements that are incorporated into the system of FIG. 1, in accordance with embodiments of the present invention. Although system 1100 provides the Strategic Enablement Model in the context of a business organization, the present invention contemplates analogous models for any type of organization. System 1100 includes shareholder value 1102 that is communicated and delivered to the organization and its shareholders via the higher-level organization's strategic and business planning processes (e.g., yearly or quarterly planning process) at the higher-level organization's worldwide (WW) or corporate headquarters (CHQ) 1104. The strategic and business plans typically include vision statements 1106, mission statements 1108, broad corporate strategy 1110, objectives 1112, and plans and targets 1114 (e.g., financial, information technology, human resources, etc.). Plans and targets 1114 that must be achieved are typically quantitative and are mandated to subordinate organizations. Mandated plans and targets are directly stated by the higher-level organization and require no translation—or only minor variation or translation (where geographically, environmentally or operationally required)—of the higher-level plans and/or targets to enable achievement of said plans and targets. Broader strategies 1110 and objectives 1112 that influence the organization are typically qualitative and are cascaded to subordinate organizations. Cascaded plans and targets are those that a subordinate organization defines to deliver the outcomes of the higher-level organization and that require variation or translation of the higher-level plans and/or targets to enable achievement of said plans and targets.

Hereinafter in Section 4, the organization that mandated and cascaded the strategy 1110, objectives 1112, and plans and targets 1114 is referred to as the "higher-level organization" and the subordinate organization that receives the mandated and cascaded strategy, objectives, plans and targets is referred to simply as "the organization".

Strategy 1110, objectives 1112, and plans and targets 1114 are distributed across the organization via layers of an organizational structure 1116 that include, for example, geography 1118, region 1120, country 1122, business line 1124, and competency/business unit 1126. Mandated plans and targets 1114 are replicated, directly translated or modified (where geographically, environmentally or operationally required) into subordinate strategies. Cascaded strategies 1110 and objectives 1112 are translated into subordinate strategic priorities.

As strategy 1110, objectives 1112, and plans and targets 1114 are passed through each organizational layer, strategic plans become more focused and applicable to a subordinate organization (e.g., organizational unit 1128), while plans and targets become increasingly specific.

Required business outcomes (RBOs) 1130 are the operational and financial plans and targets that the organization is required to achieve. RBOs 1130 are delivered via execution of BAU operational tasks. RBOs 1130 are an important element of the organization's strategic plan, as this integration of BAU activities with the activities addressing the desired future state of the organization (see DBOs below) significantly increases the chance of success of the organization's strategic plan.

The organization's RBOs 1130 are established by any combination of the following:

a) Mandated by the higher-level organization in plans and targets 1132;

b) Translated from the strategy or business plan(s) 1134 of the higher-level organizational layers with some modification required for geographic, local marketplace or language differences, or other reasons; or c) Developed independently by the organization to ensure the continued or improved sustainability and viability of the organization.

RBOs 1130 are confirmed early in the Strategic Enablement Method to ensure that the required outcomes of the organization are considered when the strategic goals are being established. RBOs 1130 are then aligned to the organization's multi-year strategic business objectives (SBOs) (see the discussion of SBOs presented below) by the assignment of key result areas (KRAs) that align RBOs and SBOs to the performance measurement categories of the organization.

SBOs 1136 are the multi-year strategic goals that, when achieved, will enable the organization to fulfill its organizational mission 1137 and impact its long-range vision 1139. SBOs 1136 clearly and succinctly describe the priorities upon which executives and managers of the organizational unit 1128 must focus their decision-making activities. SBOs are typically limited to a maximum of five SBOs for any one organization, to help focus energy and resources on the priority areas of the organization.

In order to achieve the multi-year SBOs, short-term objectives are defined—typically for annual execution and measurement. These short-term objectives are the organization's RBOs and desired business outcomes (DBOs) 1138 (see the discussion of DBOs presented below).

SBOs 1136 are therefore achieved through the success of the DBOs 1138 and the fulfillment of the RBOs 1130 that have been categorized and aligned to SBO 1136 via the assignment of KRAs.

DBOs 1138 are an organization's yearly objectives established to transform the organization into its desired or expected future state. DBOs 1138 are also established to close identified performance gaps. DBOs 1138 align directly to multi-year SBOs 1136 and are established to achieve the short-term successes that ensure the viability and sustainability of the business as it works toward the achievement of the longer-term SBOs 1136. DBOs 1138 are delivered via a translation into objectives 1140 and the execution of tactical programs 1142 and tactical projects 1144.

DBOs 1138 describe the desired or expected results for the organization, as well as the actions needed to achieve them. DBOs 1138 are specific objective statements that are measurable, achievable, realistic, time-based and directly aligned to SBOs 1136. DBOs are typically limited to a maximum of seven DBOs for any one organization.

Where the organization's RBOs 1130 require a level of performance that the organization is not currently—nor on track—to achieving, a DBO 1138 is established to close the performance gap. The measures and targets for such a DBO 1138 are the same as those measures and targets established to evaluate the performance of the RBO 1130. In these cases, the organization has identified that significant change or improvement is required to a business process or system, and so the achievement of the DBO 1138 can only be the attainment of the RBO 1130. That is, achievement of the RBO 1130 is the minimum level of achievement for the DBO 1138.

Together, RBOs 1130 and DBOs 1138 are the year-to-year building blocks of measurement and achievement for the longer-term goals of the organization.

Tactical programs 1142 are established to achieve each DBO 1138. Tactical programs 1142 are a portfolio of projects of any number or size and are deployed using the organization's program management method. Each tactical program 1142 is directly aligned to a DBO 1138, and a tactical program owner or owners are assigned. Tactical program owners are responsible for not only achieving, but also tracking and reporting the progress and status of the program.

Tactical programs 1142 are also aligned to the responsible business area (or sub-business area) and integrated into BAU management processes.

Tactical projects 1144 are the end-goal of the Strategic Enablement Method. Tactical projects 1144 are the translation of the strategic plan into operational terms that can be actioned by the members of the organization.

Tactical projects 1144 are established to execute the required activities and tasks of the associated tactical program 1142, and are deployed using the organization's project management method. Each tactical project 1144 is directly aligned to a tactical program 1142, and a tactical project owner or owners are assigned. Tactical project owners are responsible for not only achieving, but also tracking and reporting the progress and status of the project.

Tactical projects 1144 are also aligned to the responsible business area (or sub-business area) and integrated into BAU management processes.

The management and execution (i.e., enablement and achievement shown in FIG. 11) of the organizational unit's strategic plan (including SBOs, RBOs, DBOs, tactical programs and tactical projects) is controlled by the organization's strategy management process(es) such as SMS described in Section 3. RBO, DBO, tactical program and tactical project status, deliverable status, financial status and overall achievement of organizational unit plans and targets 1132 is also controlled by the organization's strategy management process(es) such as SMS described in Section 3. Measurement of the success of the strategy elements managed in the SMS is performed in the organization's performance measurement system 1148, which is an element of an organization's business management system providing performance management data to all organizational units across the entire organization. The type of performance measurement system and the method employed by the organization for measuring performance do not affect the application of the Strategic Enablement Method.

Results, with appropriate analysis 1150, are reported back through the layers of the higher-level organizational structure 1116, creating a continuous cycle of management, execution, measurement and analysis of the organizational unit's performance against its strategic plan.

Within the results & analysis element 1150 of the Strategic Enablement Model, the organizational unit 1128 is also able to integrate strategic execution with its BAU reporting, through the application of KRAs. As KRAs are assigned to each strategy element within the Strategic Enablement Method, so too are KRAs assigned to the BAU reporting of the organizational unit 1128, using the SMS described in Section 3, via the DBO, Program and Project Alignment modules, as described in steps 603, 607 and 611 in the Align to Business Management System phase 204 in FIG. 6 (and described above in section 3.4), thus providing a holistic view of the organizational unit 1128 and its activities: strategic, tactical and day-to-day operational.

Reporting and analysis systems (e.g., results & analysis element 1150) are an element of an organization's business management system. The type of reporting systems employed by an organization does not affect the application of the Strategic Enablement Method.

Value is returned to an organization, its shareholders and other stakeholders 1152. Exceptions to expected results are reviewed. Required changes are incorporated into the broad corporate plans and targets that are subsequently communicated through the organizational structure 1116 (typically, as mandated targets) as the continuous cycle of refinement and improvement of the organization's strategy continues.

The technique to develop the aforementioned executable elements from a translation of the strategic priorities of the higher-level organization into the three aforementioned objective types (i.e., SBOs 1136, RBOs 1130 and DBOs 1138) and two deployment methods utilizing tactical programs 1142 and tactical projects 1144 is described below relative to FIG. 12.

Figure 12:
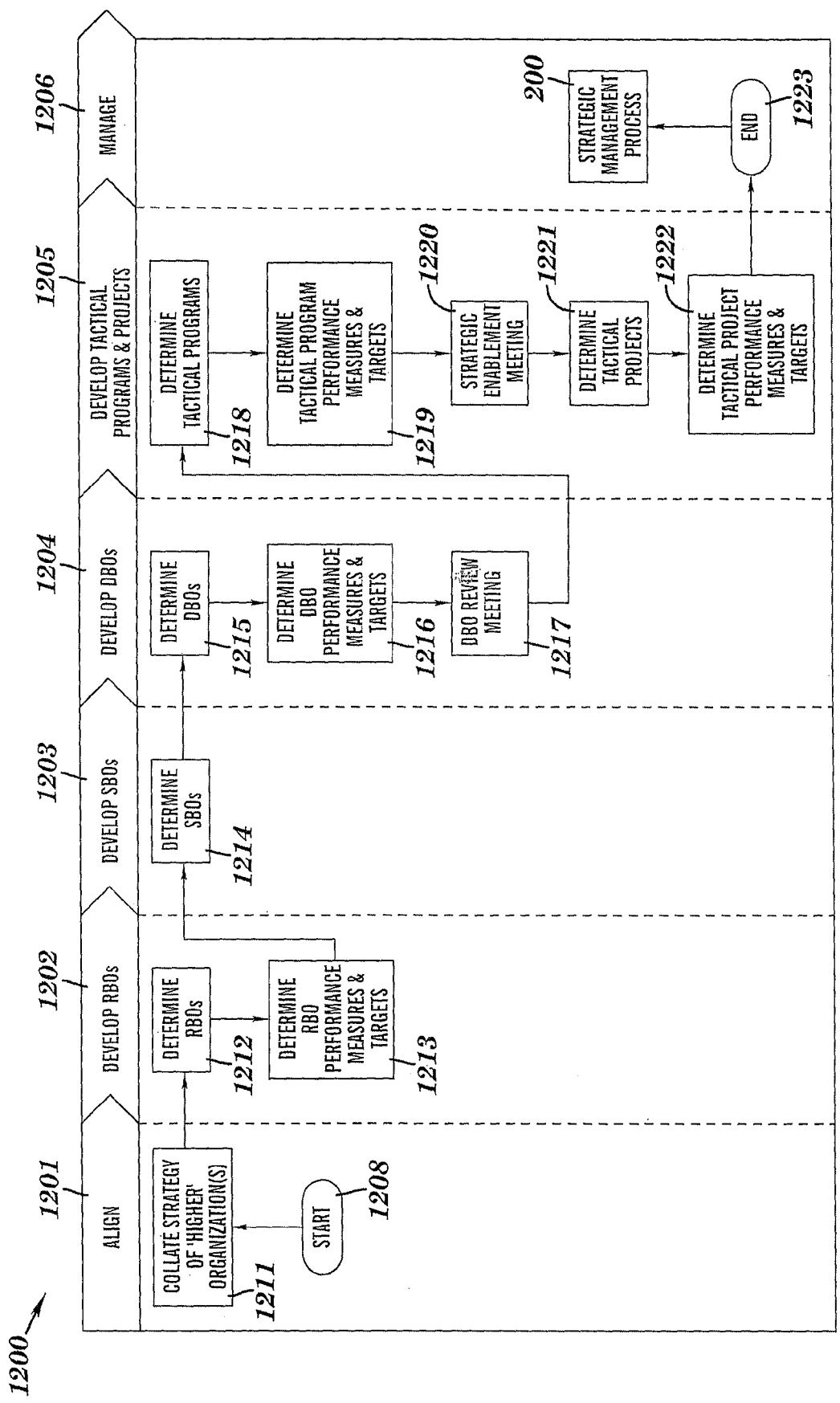
FIG. 12 is a flow diagram of a process for developing strategy elements in the system of FIG. 11, in accordance with embodiments of the present invention.

FIG. 12 is a flow diagram of a process 1200 (i.e., Strategic Enablement Method) for developing strategy elements in the system of FIG. 11, in accordance with embodiments of the present invention. The objective of the Strategic Enablement Method (SEM) 1200 is to develop a strategic plan with specific objectives that can be clearly understood—and actioned—by all members of an organization. The SEM collates all strategic and planning elements from any higher-level organizational layers 1116 (see FIG. 11), and guides the translation of strategy 1110 (see FIG. 11), objectives 1112 (see FIG. 11), and plans and targets 1114 (see FIG. 11) into five strategy elements:

1. Strategic business objectives (SBOs) 1136 (see FIG. 11)
2. Required business outcomes (RBOs) 1130 (see FIG. 11)
3. Desired business outcomes (DBOs) 1138 (see FIG. 1)
4. Tactical programs 1142 (see FIG. 11)
5. Tactical projects 1144 (see FIG. 1)

Strategy elements are assigned performance measurement criteria to align all executable elements of the strategy to the tactical programs 1142, tactical projects 1144 and activities of the organization, thereby making strategy operational.

To ensure cross-organizational alignment of all developed strategy elements, and to encourage consensus on the definition, intention and scope of each strategy element, two key meetings are included in SEM 1200:

1. DBO Review Meeting 1217
2. Strategic Enablement Meeting 1220

The development of the strategy elements, meeting conduct and other activities described in SEM 1200 occur during a six-phase cycle:

1. Align phase 1201
2. Develop RBOs phase 1202
3. Develop SBOs phase 1203
4. Develop DBOs phase 1204
5. Develop tactical programs and projects phase 1205
6. Manage phase 1206

The input to SEM 1200 includes:

1. Strategic planning process, as executed by the organization.
2. Higher-level organization strategic directives, priorities, objectives.
3. Higher-level organization financial, operational, managerial business plans and targets.

SEM 1200 starts at step 1208. In step 1211 of the Align phase 1201, the strategy of the higher-level organization(s) is collated. In step 1212, which begins phase 1202, RBOs 1130 (see FIG. 11) are determined. In step 1213, RBO performance measures and targets are determined. In step 1214, which begins phase 1203, SBOs 1136 (see FIG. 11) are determined. In step 1215, which begins phase 1204, DBOs 1138 (see FIG. 11) are determined. In step 1216, DBO performance measures and targets are determined. In step 1217, a DBO review meeting is conducted.

In step 1218, which begins phase 1205, tactical programs 1142 are determined. In step 1219, tactical program performance measures and targets are determined. In step 1220, a strategic enablement meeting is conducted. In step 1221, tactical projects 1144 are determined. In step 1222, tactical project performance measures and targets are determined. Following step 1222, Manage phase 1206 begins. SEM 1200 ends at step 1223. The output of the SEM is a strategic plan, incorporating SBOs 1136 (see FIG. 11), RBOs 1130 (see FIG. 11), DBOs 1138 (see FIG. 11), tactical programs 1142 (see FIG. 11), and tactical projects 1144 (see FIG. 11). The strategic plan output by the SEM is input into strategic management process 200 which is implemented by the SMS described above in Section 3.

4.1 Align Phase

Figure 13:
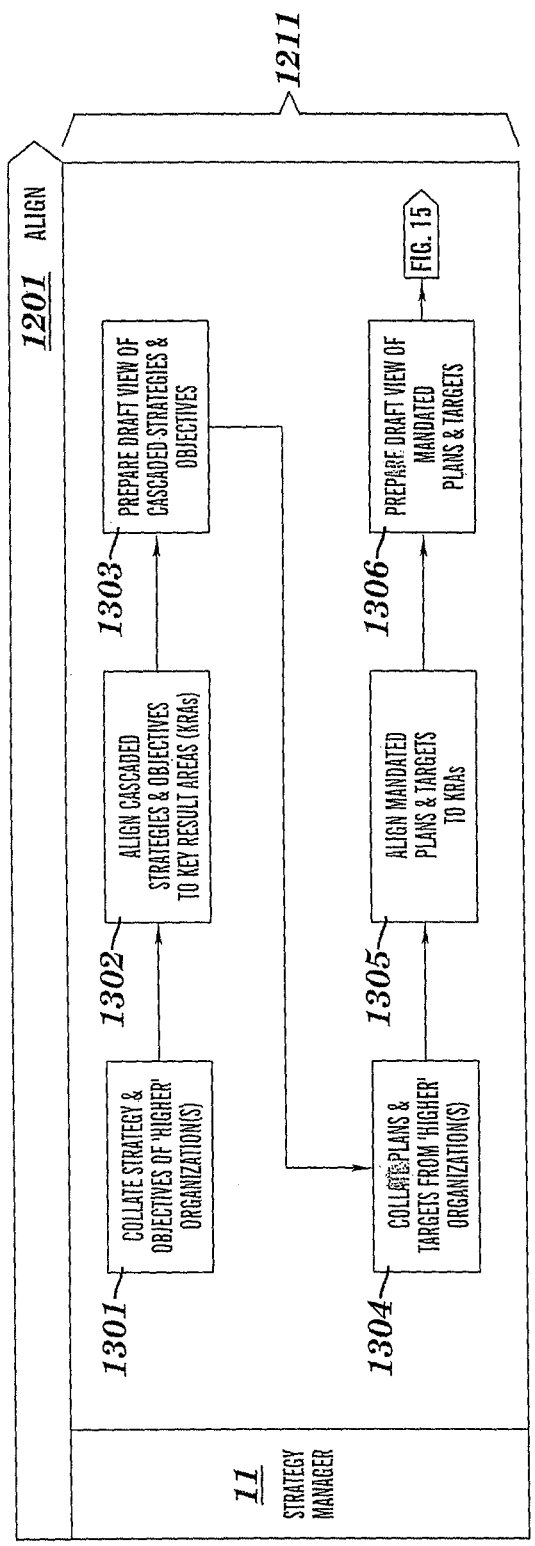
FIG. 13 is a flow diagram of a process of collating strategy of one or more higher-level organizations in step 1211 of the Align phase 1201 of the process of FIG. 12, in accordance with embodiments of the present invention.

FIG. 13 is a flow diagram of a process of collating strategy of one or more higher-level organizations in step 1211 of Align phase 1201 of the process of FIG. 12, in accordance with embodiments of the present invention. The process of collating and aligning strategy of one or more higher-level organizations in the process of FIG. 13 is the initiation point of the Strategic Enablement Method and describes Align phase 1201 of the SEM. The process of FIG. 13 typically occurs prior to an organization's annual strategic planning workshop or another form of collaborative activity performed to develop the organization's strategic plan, which is typically a key activity in the organization's strategic planning process. Step 1211 includes steps 1301-1306, which are described in this section.

Input to the process of FIG. 13 includes:

1. Higher-level organization strategic directives 1110 (see FIG. 11), priorities, and objectives 1112 (see FIG. 11).
2. Higher-level organization financial, operational, managerial business plans and targets 1114 (see FIG. 11).

Step 1211 of Align phase 1201 includes the sub-steps 1301-1306 (hereinafter also referred to as "steps"), all of which are performed by strategy manager 11. In step 1301, the strategy manager collates strategy 1110 (see FIG. 11) and objectives 1112 (see FIG. 11) of one or more higher-level organizations. The collation in step 1301 includes a collation of all strategic directives, priorities and objectives from one or more higher levels of an organization (i.e., one or more higher-level organizations). For example, these higher levels take the form of corporate headquarters, a parent company, owners or directors, worldwide or geographic or regional business units, shareholders and/or other stakeholders. Stakeholders may include customers, clients, governments and/or the wider community.

In step 1302, the strategy manager aligns cascaded strategies 1110 (see FIG. 11) and objectives 1112 (see FIG. 11) to KRAs. Step 1302 includes the alignment of all cascaded strategies and objectives from the higher-level organizations to the KRAs of the organization. KRAs are defined below.

In step 1303, the strategy manager prepares a draft view of the cascaded strategies 1110 (see FIG. 11) and objectives 1112 (see FIG. 11). Step 1303 includes a development of a draft view of all higher-level strategies 1110 (see FIG. 11) and objectives 1112 (see FIG. 11) that may influence the strategy and execution of activities by the organization and that should be cascaded to the organization. The higher-level strategies and objectives of step 1303 are typically qualitative.

In step 1304, plans and targets 1114 (see FIG. 11) from one or more higher-level organizations are collated. The collation in step 1304 includes a collation of all financial, operational and managerial business plans and performance targets from higher levels of the organization.

In step 1305, mandated plans and targets 1114 (see FIG. 11) are aligned to KRAs. Step 1305 includes the alignment of all mandated plans and/or targets from the one or more higher-level organizations to the KRAs of the organization.

In step 1306, a draft view of mandated plans and targets 1114 (see FIG. 11) is prepared. Step 1306 is followed by the RBO determination process of FIG. 15. Step 1306 includes a development of a draft view of all higher-level plans and targets 1114 (see FIG. 11) that the organization is required to achieve and that are mandated to the organization. The higher level plans and targets of step 1306 are typically quantitative.

Output of the process of FIG. 13 includes:
1. Draft view of strategies and objectives (typically qualitative) that may influence the organization, aligned to the KRAs of the organization.
2. Draft view of plans and targets that the organization is required to achieve (typically quantitative) aligned to the KRAs of the organization.

4.1.1 Key Result Area Definition

Figure 14:
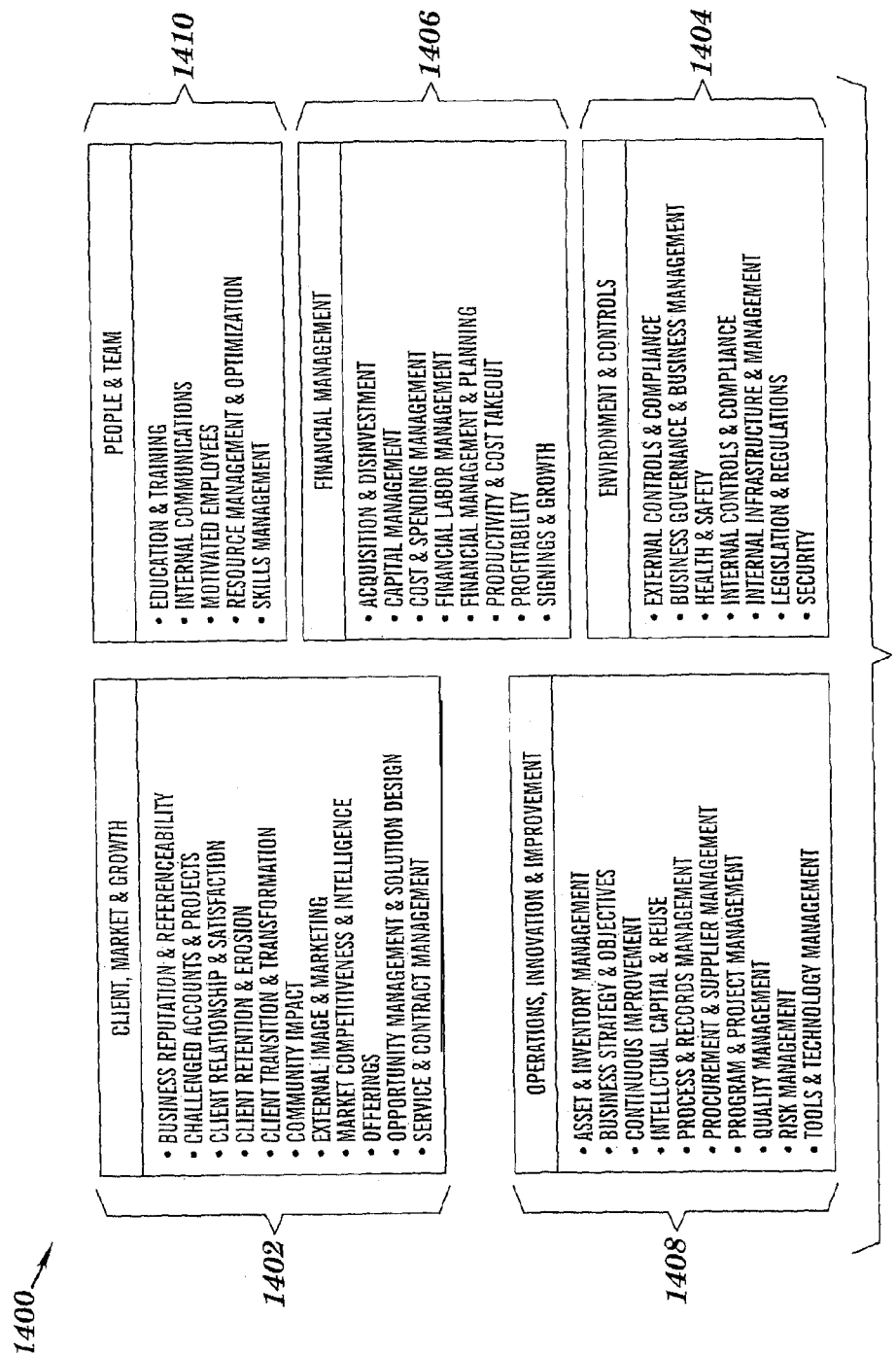
FIG. 14 is an example of key result areas identified by the process of FIG. 12, in accordance with embodiments of the present invention.

FIG. 14 is an example of key result areas (KRAs) identified by the process of FIG. 12, in accordance with embodiments of the present invention. The Strategic Enablement Method identifies a set of KRAs. The KRAs are designed to be used as the performance measurement categories on an organization's business performance scorecard. This section identifies the Strategic Enablement Method KRAs and a recommended structure for KRAs that could be applied to any organization. Some variation or customization of the KRAs of this section, however, may be required by an organization to ensure a complete view of the organization's activities. Whether directly used, or customized, it is important that all business areas (or sub-business areas) across the organization use an identical set of KRAs.

FIG. 14 depicts a set 1400 of five Strategic Enablement Method KRAs and the KRAs' elements. The five KRAs in set 1400 are:
1. Client, Market & Growth 1402
2. Environment & Controls 1404
3. Financial Management 1406
4. Operations, Innovation & Improvement 1408
5. People & Team 1410

For each KRA in set 1400, KRA elements associated with that KRA are listed below the name of the KRA. As an example, business reputation & referenceability and challenged accounts & projects are the first two listed KRA elements of Client, Market & Growth KRA 1402.

Assigning each element of the organization's evolving and final strategic plan to KRAs, facilitates the development of a strategy that is directly linked to the performance measurement categories of the organization's scorecard. This direct alignment of strategy to performance measurement provides the organization with: an ability to measure the success of the strategy and the strategic planning process; comparable historical data for future strategic planning; and a means to quickly identify areas of the business that may have too little, or too much, business focus.

During each major development phase of the Strategic Enablement Method (i.e., phases 1202-1205 of FIG. 12), each objective, outcome, program or project is assigned KRA(s). This assignment to KRAs facilitates the production of a strategic plan that is balanced across all key areas of the business.

In addition, the application of KRAs to an organization's strategy elements enables the organization to integrate its strategic execution with its BAU activities. As KRAs are assigned to each strategy element within the SEM, so too are KRAs assigned to the BAU activities of the organizational unit, using the SMS described in Section 3, via the DBO, Program and Project Alignment modules, as described in steps 603, 607 and 611 in the Align to Business Management System phase 204 in FIG. 6 (and described above in section 3.4), thus providing a holistic view of the organization and its activities: strategic, tactical and day-to-day operational.

It should be noted that it is beneficial for an executive leadership team to be familiar with the organization's KRAs and the KRA elements prior to, and during, the development of the strategic plan. This familiarity facilitates an inclusive, end-to-end business view when determining strategic priorities and developing SBOs, RBOs and DBOs.

4.2 Develop RBOs Phase—Determine RBOs

Figure 15:
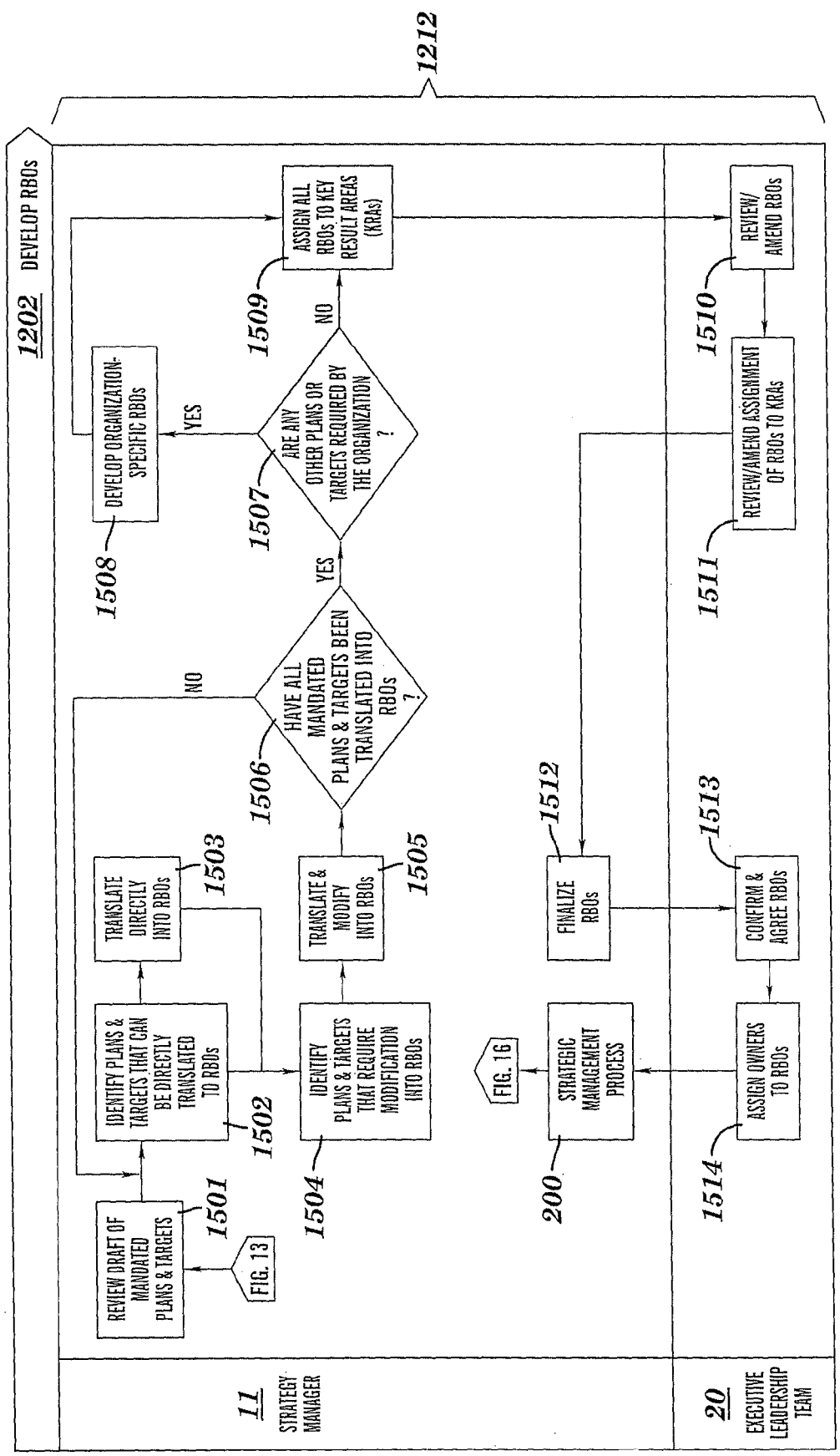
FIG. 15 is a flow diagram of a process of determining RBOs in step 1212 of the Develop RBOs phase of the process of FIG. 12, in accordance with embodiments of the present invention.

FIG. 15 is a flow diagram of a process of determining RBOs in step 1212 of the Develop RBOs phase 1202 of the process of FIG. 12, in accordance with embodiments of the present invention. The input to determine RBOs step 1212 includes the draft view of plans and targets that the organization is required to achieve (i.e., output from the process of FIG. 13).

During step 1212 of phase 1202, strategy manager 11 performs a number of activities in preparation for the strategic planning workshop or another form of collaborative activity performed to develop the organization's strategic plan. Step 1212 includes steps 1501-1514, which are described in this section.

In step 1501, which follows step 1306 of FIG. 13, strategy manager 11 reviews the draft view of the mandated plans and targets 1114 (see FIG. 11). In step 1502, strategy manager 11 identifies higher-level organizational plans and targets 1114 (see FIG. 11) that can be directly translated to RBOs 1130 (see FIG. 11). The plans and targets identified in step 1502 are translated directly into RBOs 1130 (see FIG. 11) by the strategy manager in step 1503. In step 1504, which follows steps 1502 and 1503, strategy manager 11 identifies higher-level organizational plans and targets 1114 (see FIG. 11) that require modification into RBOs. In step 1505, the plans and targets identified in step 1504 are translated and modified by the strategy manager into RBOs 1130 (see FIG. 11).

If strategy manager 11 determines in inquiry step 1506 that all mandated plans and targets have been translated into RBOs 1130 (see FIG. 11), then the process of FIG. 15 continues with step 1507; otherwise the process repeats starting at step 1502. If strategy manager 11 determines in inquiry step 1507 that any other plans or targets are required by the organization (i.e., required to ensure the continued or improved sustainability and viability of the organization), then the strategy manager develops organization-specific RBOs 1130 (see FIG. 11) in step 1508. Step 1509 follows step 1508 and also follows a determination by inquiry step 1507 that no other plans or targets are required by the organization. In step 1509, strategy manager 11 assigns to KRAs all RBOs 1130 (see FIG. 11) that were developed in steps 1503, 1505 and 1508.

Starting at step 1510, responsibility for execution of the SEM passes to an executive leadership team 20. In step 1510, executive leadership team 20 reviews and amends the RBOs created in steps 1503, 1505 and 1508. In step 1511, executive leadership team 20 reviews and amends the step 1509 assignments of RBOs to KRAs. In step 1512, strategy manager 11 finalizes the RBOs created and reviewed in the previous steps of FIG. 15. In step 1513, executive leadership team 20 confirms and agrees the RBOs finalized in step 1512. In step 1514, executive leadership team 20 assigns owners to the RBOs of step 1513. Owners assigned in step 1513 are responsible for the achievement, management and monitoring of each RBO created in steps 1503, 1505 and 1508.

In one embodiment, steps 1510-1514 occur during the organization's strategic planning workshop as, for example, whiteboard activities, thereby facilitating the development of shared RBOs and encouraging consensus on the definition, intention and scope of each RBO developed for the organization. The output of the process of FIG. 15 (i.e., RBOs aligned to KRAs and identified RBO owners) are utilized by strategic management process 200. For example, the strategy manager populates the SMS with the RBOs finalized in steps 1512 and 1513 and the ownership details assigned in step 1514. Step 1514 is followed by step 1601 in the process of determining RBO performance measures and targets in FIG. 16.

4.3 Develop RBOs Phase—Determine RBO Performance Measures & Targets

Figure 16:
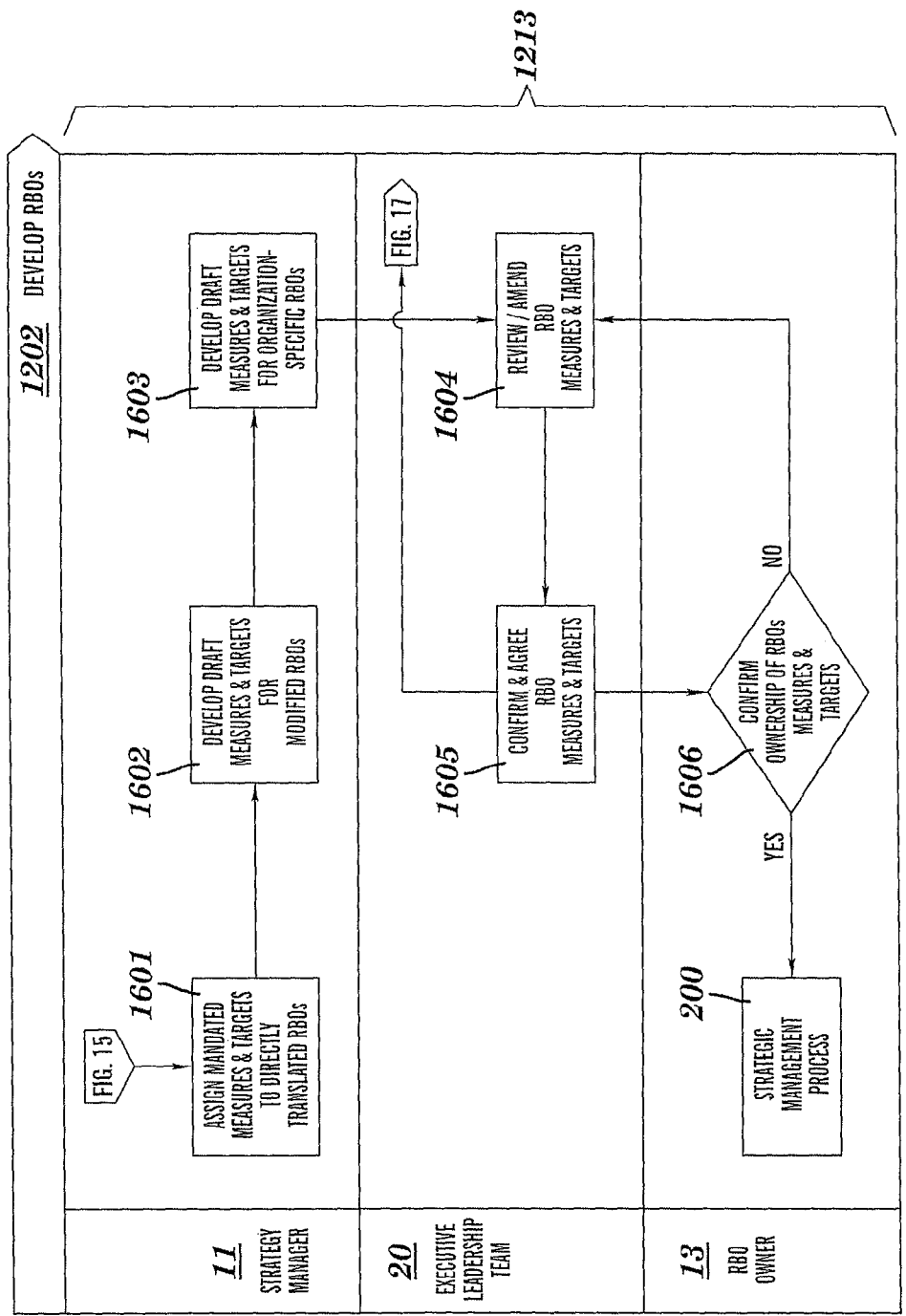
FIG. 16 is a flow diagram of a process of determining RBO performance measures and targets in step 1213 of the Develop RBOs phase of the process of FIG. 12, in accordance with embodiments of the present invention.

FIG. 16 is a flow diagram of a process of determining RBO performance measures and targets in step 1213 of the Develop RBOs phase 1202 of the process of FIG. 12, in accordance with embodiments of the present invention. Input to the process of FIG. 16 includes the RBOs aligned to the KRAs of the organization (i.e., output from the process of FIG. 15). During step 1213, strategy manager 11 gathers performance measurement data from across the organization to develop draft performance measurement criteria for each RBO input into the process of FIG. 16. Step 1213 includes steps 1601-1606, which are described in this section.

In step 1601, which follows step 1514 and strategic management process 200 of FIG. 15, strategy manager 11 assigns mandated measures and targets to RBOs that were developed by direct translation in step 1503 of FIG. 15. In step 1602, strategy manager 11 develops draft measures and targets for modified RBOs (i.e., RBOs developed in step 1505 of FIG. 15). In step 1603, strategy manager 1603 develops draft measures and targets for organization-specific RBOs (i.e., RBOs developed in step 1508 of FIG. 15). In one embodiment, steps 1601-1603 occur prior to the strategy planning workshop or other form of collaborative activity performed to develop the organization's strategic plan. The measures and targets of steps 1601-1603 are measurement criteria associated with RBOs that include measure definitions, source data location, output formats, measure frequency, targets and tolerance criteria for each RBO.

In step 1604, executive leadership team 20 reviews and, if necessary, amends the RBO measures and targets of steps 1601-1603. In step 1605, the measures and targets reviewed in step 1604 are confirmed and approved by executive leadership team 20. Steps 1604-1605 finalize the characteristics of each RBO and the criteria for achieving each RBO. Step 1605 is followed by step 1606 and by step 1701 of the SBO determination process of FIG. 17.

In inquiry step 1606, RBO owner 13 reviews the ownership of each RBO to ensure that the appropriate member of the organization is assigned ownership. If step 1606 does not confirm the ownership of an RBO, the process of FIG. 16 continues with the review and amending of RBO measures and targets by the executive leadership team at step 1604. Otherwise, if step 1606 confirms the ownership of the RBOs, then the process of FIG. 16 outputs the confirmed RBO performance measurement criteria of measures, targets and owners to strategic management process 200. In one embodiment, RBO owner 13 populates SMS with the output of the process of FIG. 16.

4.4 Develop SBOs

Figure 17:
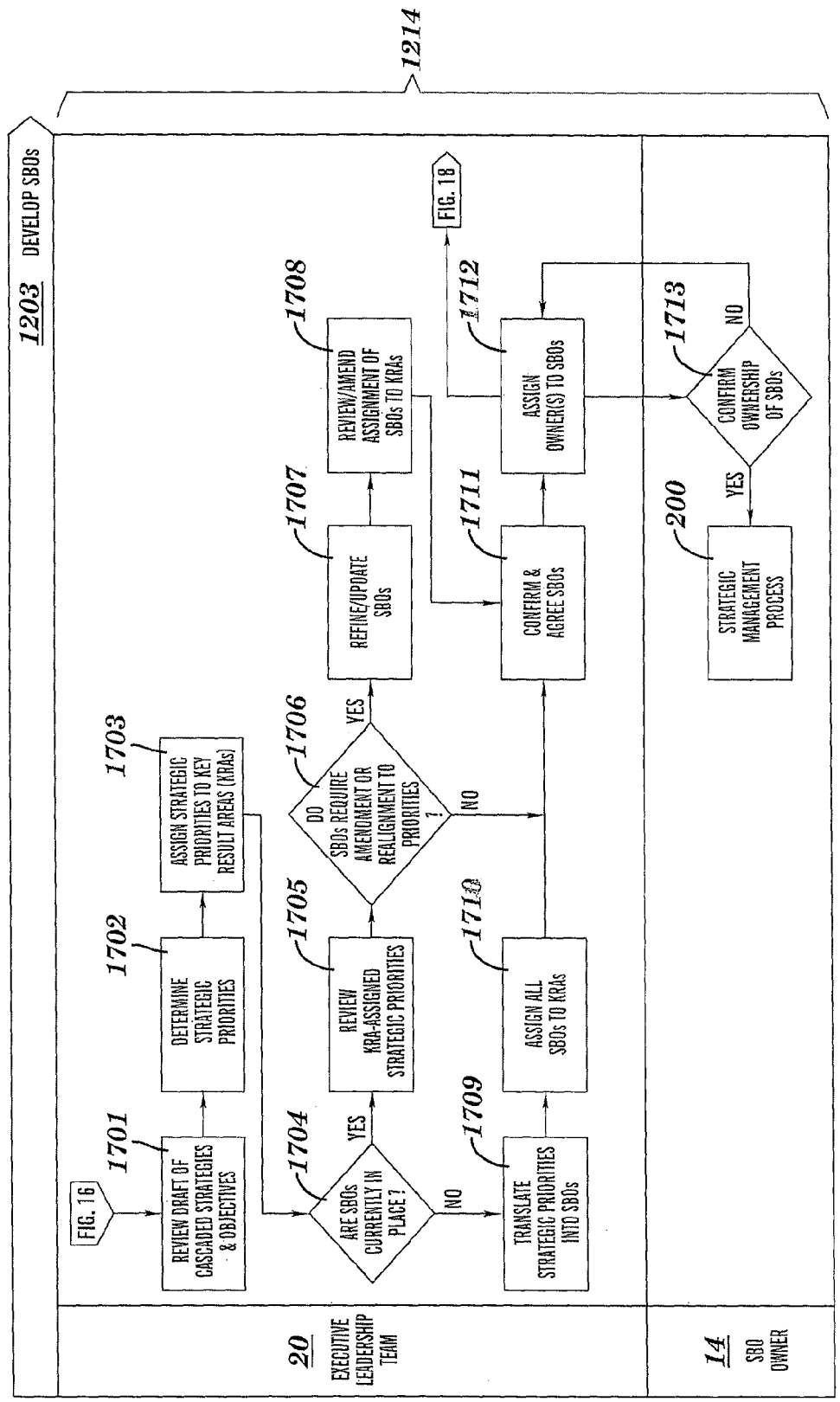
FIG. 17 is a flow diagram of a process of determining SBOs in step 1214 of the Develop SBOs phase of the process of FIG. 12, in accordance with embodiments of the present invention.

FIG. 17 is a flow diagram of a process of determining SBOs in the Develop SBOs phase 1203 of the process of FIG. 12, in accordance with embodiments of the present invention. Determining SBOs is step 1214 of phase 1203, and includes steps 1701-1713, which are described below. Input to the process of FIG. 17 includes:
1. Draft view of strategies and objectives that influence the organization (i.e., output from the process of FIG. 13).
2. Draft view of plans and targets that the organization is required to achieve (i.e., output from the process of FIG. 13).
3. RBOs (i.e., output from the process of FIG. 15).
4. RBO performance measurement criteria (i.e., output from the process of FIG. 16).

The process of determining SBOs in step 1214 of phase 1203 typically occurs within an organization's strategic planning process, during the annual strategic planning workshop or other form of collaborative activity performed to develop the organization's strategic plan.

In step 1701, which follows step 1605 of FIG. 16, executive leadership team 20 reviews the draft view of cascaded strategies and objectives prepared in step 1303 of FIG. 13. In step 1702, executive leadership team 20 uses the collated and aligned strategies and objectives of the higher-level organizations, as developed by the strategy manager in FIG. 13, to develop strategic priority statements for the organization. In step 1703, executive leadership team 20 assigns the strategic priorities determined in step 1702 to KRAs. If executive leadership team 20 determines in step 1704 that SBOs 1136 (see FIG. 11) are currently in place, then the executive leadership team reviews KRA-assigned strategic priorities. If the executive leadership team determines in step 1706 that the SBOs determined in step 1704 require amendment or realignment to priorities then in step 1707, the executive leadership team refines and/or updates the SBOs determined in step 1704. In step 1708, executive leadership team 20 reviews the assignment of the SBOs determined in step 1704 and amends the assignment of the SBOs if necessary. In step 1711, executive leadership team 20 confirms and approves the SBOs that were determined in step 1704. Step 1711 also follows a determination in step 1706 that none of the SBOs determined in step 1704 require amendment or realignment to priorities.

Returning to inquiry step 1704, if no SBOs are currently in place, executive leadership team 20 translates the strategic priorities into SBOs 1136 (see FIG. 11) in step 1709. In step 1710, the executive leadership team assigns all SBOs of step 1709 to KRAs. Step 1710 is followed by the confirming and approving of step 1711 as described above, except that the SBOs of step 1711 in this case are the SBOs developed in step 1709. In step 1712, which follows step 1711, executive leadership team 20 assigns one or more owners to the SBOs 1136 (see FIG. 11). Step 1712 is followed by step 1713 and by step 1801 of the DBO determination process of FIG. 18.

If SBO owner 14 in inquiry step 1713 does not confirm the ownership of the SBOs, then the process of FIG. 17 repeats starting at step 1712; otherwise, ownership of the SBOs is confirmed and the SBO owner is then required to enter the details of the finalized SBOs into the organization's strategic management tool (e.g., SMS), per the organization's strategic management process 200.

The output of the process of FIG. 17 includes:
1. Strategic priority statements, aligned to the KRAs of the organization.

2. SBOs aligned to the strategy of the higher-level organization, and to the KRAs of the organization.
3. Identified SBO owners.

In one embodiment, during the strategy planning workshop, the executive leadership team 20 analyzes the breadth of the organization, using their chosen strategic planning method and/or tools, including such activities as:
- SWOT (strengths, weaknesses, opportunities & threats) analyses
- Situation analyses
- Client case studies
- Competitive market analyses
- Identification of key market trends
- Identification of opportunities for growth
- Review and assessment of strategies, priorities and/or objectives (i.e., goals) from other areas of the organization—both vertically ("higher" and "lower") and horizontally aligned.

The typical output of the above-listed activities is a significant number of statements—both broad and specific—that identify the strategic focus areas of the business. Using these statements, executive leadership team 20 then proceed to either: (a) develop new SBOs if required by the organization (see step 1709); or (b) review and refine the organization's current SBOs (see step 1707).

In one embodiment, a maximum of five SBOs are defined—one for each KRA or, where synergies exist, an amalgamation from no more than two KRAs.

As one example, ownership of the agreed SBOs is assigned to the organization's Chief Executive Office (CEO) or General Manager.

The agreed SBOs (see step 1711), aligned to KRAs (see step 1710), set the tone for the next steps in the SEM where the executive leadership team works to analyze, refine and define the executable elements of the organization's strategy. It should be noted that performance measures and targets are not assigned to SBOs, as organizational performance is measured at the DBO, tactical program and tactical project levels.

4.5 Develop DBOs Phase—Determine DBOs

Figure 18:
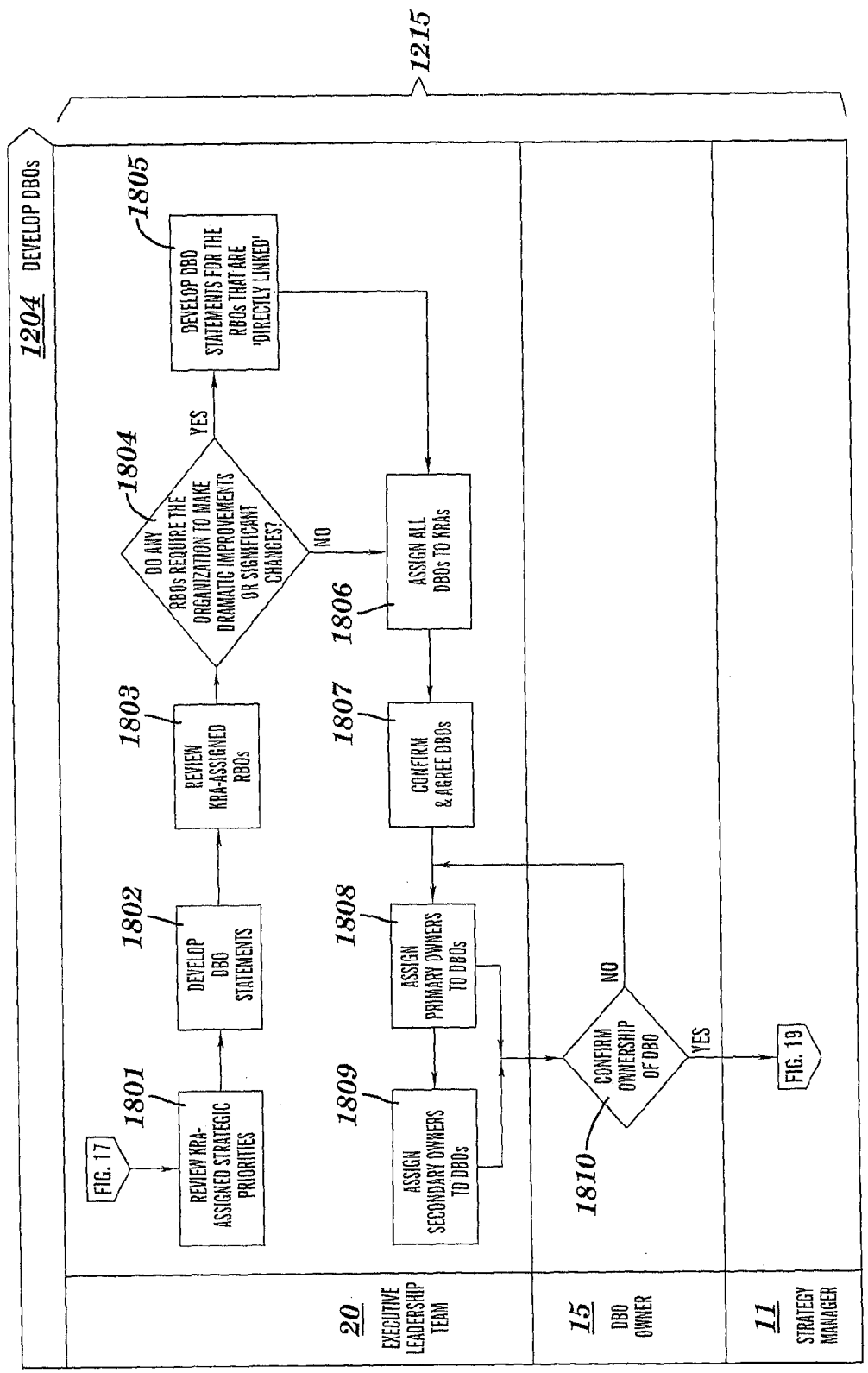
FIG. 18 is a flow diagram of a process of determining DBOs in step 1215 of the Develop DBOs phase of the process of FIG. 12, in accordance with embodiments of the present invention.

FIG. 18 is a flow diagram of a process of determining DBOs in the Develop DBOs phase 1204 of the process of FIG. 12, in accordance with embodiments of the present invention. In one embodiment, the process of determining DBOs in step 1215 of phase 1204 occurs within an organization's strategic planning process, during the annual strategic planning workshop or other form of collaborative activity performed to develop the organization's strategic plan. In one embodiment, the process of FIG. 18 is typically facilitated by strategy manager 11, even though the strategy manager is not responsible for any specific activities. Step 1215 includes steps 1801-1810, which are described in this section.

Input to the process of FIG. 18 includes:
1. Strategic priority statements (i.e., output from the process of FIG. 17).
2. SBOs (i.e., output from the process of FIG. 17).
3. RBOs (i.e., output from the process of FIG. 15).
4. RBO performance measurement criteria (i.e., output from the process of FIG. 16).

In step 1801, which follows step 1712 of FIG. 17, executive leadership team 20 reviews strategic priorities developed in step 1703 of FIG. 17, SBOs developed in step 1711 of FIG. 17 and RBOs developed in step 1513 of FIG. 15 to provide input into the development of DBOs 1138 (see FIG. 11) for the organization. In step 1802, executive leadership team 20 develops DBOs (a.k.a. DBO statements) as a result of the review in step 1801. The DBO statements developed in step 1802 describe the desired or expected results for the organization, as well as the actions needed to achieve them. In one embodiment, step 1802 results in a set of up to seven DBO statements constructed during the strategy planning workshop using the SMARTA method that provides simple criteria for objective development, stating that objectives should be written in the imperative and be:
1. Specific
2. Measurable
3. Achievable
4. Realistic
5. Time based
6. Aligned The DBOs developed in step 1802 translate the SBOs reviewed in step 1801 into operational terms that can be understood by all members of the organization. The aforementioned translation of the SBOs provides an alignment of the DBOs developed in step 1802 to the strategic priorities of the organization. In one embodiment, one or more of the DBOs developed in step 1802 encourage cross-organizational communication and collaboration to develop a sense of shared goals and decision-making based upon shared organizational priorities.

In step 1803, executive leadership team 20 reviews KRA-assigned RBOs. If executive leadership team 20 determines in step 1804 that, in order to achieve an RBO, the organization is required to make dramatic improvements or significant changes to the organization's current level of performance, then the executive leadership develops a DBO statement to close the performance gap(s) in step 1805. In the case of moving from step 1804 to step 1805, the DBO developed in step 1805 is directly linked to the RBO by the DBO's performance measurement criteria and by the DBO's KRA assignment. See Section 4.6 for more details about this direct linking of the DBO to the RBO via the DBO's performance measurement criteria. In step 1806, which follows both step 1805 and the No branch of inquiry step 1804, executive leadership team 20 assigns all DBOs to KRAs. In the case of step 1806 following step 1805, a DBO directly linked to an RBO is assigned KRAs that are identical to the KRAs assigned to the RBO in step 1509 of FIG. 15, thereby providing an alignment between the DBO and the RBO. In step 1807, executive leadership team 20 confirms and approves (i.e., agrees) the DBOs developed in step 1802.

In step 1808, primary owners of the agreed DBOs of step 1807 is assigned. In step 1809, secondary owners of the agreed DBOs are assigned. Assignment to both primary and secondary owners ensures continued focus and continual management and control of the DBOs. In one embodiment, ownership of the agreed DBOs is assigned to members of the organization's executive leadership team 20. Following steps 1808 and 1809, DBO owner 15 determines whether to confirm the assigned ownership of the DBOs. If DBO owner 15 does not confirm the assigned ownership of the DBOs in step 1810, then the process of FIG. 18 repeats starting at step 1808. If DBO owner 15 confirms the assigned ownership of the DBOs in step 1810, then the process of FIG. 18 ends and the SEM process continues with step 1901 of FIG. 19.

The output of the process of FIG. 18 includes:
1. DBOs aligned to the KRAs and SBOs (and RBOs, where required) of the organization.
2. DBO owners identified.

4.6 Develop DBOs Phase—Determine DBO Performance Measures & Targets

Figure 19:
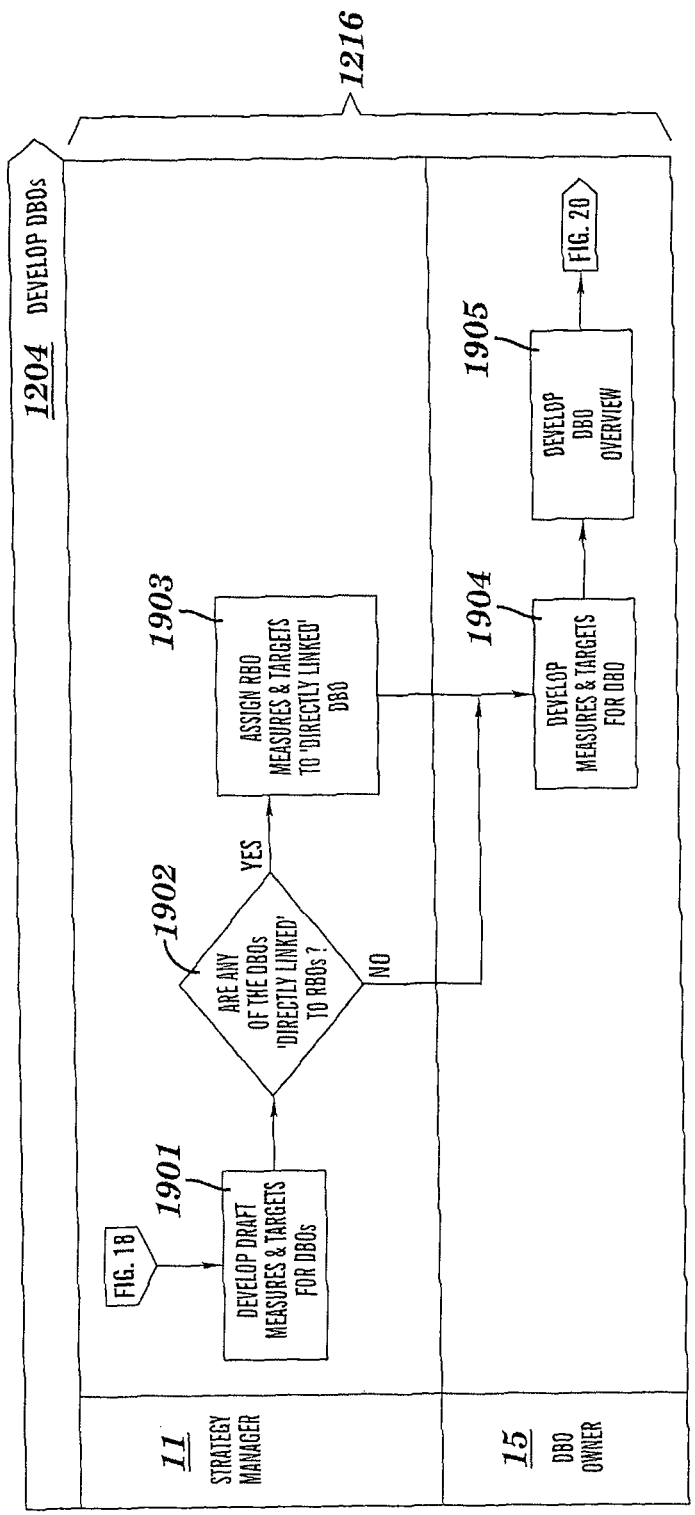
FIG. 19 is a flow diagram of a process of determining DBO performance measures and targets in step 1216 of the Develop DBOs phase of the process of FIG. 12, in accordance with embodiments of the present invention.

FIG. 19 is a flow diagram of a process of determining DBO performance measures and targets in the Develop DBOs phase 1204 of the process of FIG. 12, in accordance with embodiments of the present invention. In the determining of DBO performance measures and targets in step 1216 of phase 1204, strategy manager 11 collates the performance measurement data gathered for the RBOs in the process of FIG. 16 and gathers any additional data required to facilitate the development of performance measurement criteria for the DBOs developed in the process of FIG. 18. Each DBO owner establishes measurement criteria in step 1216, including measure definitions, source data location, output formats, measure frequency, targets and tolerance criteria for each DBO. Step 1216 includes steps 1901-1905, which are described below.

Input to the process of FIG. 19 includes:
1. DBOs (i.e., output from the process of FIG. 18).
2. SBOs (i.e., output from the process of FIG. 17).
3. RBOs (i.e., output from the process of FIG. 15).
4. RBO performance measurement criteria (i.e., output from the process of FIG. 16).

In step 1901, which follows the Yes branch of step 1810 of FIG. 18, strategy manager 11 develops draft measures and targets for the DBOs developed in the process of FIG. 18. If strategy manger 11 determines in step 1902 that any of the DBOs are directly linked to RBOs, then the strategy manager assigns RBO measures and targets to the directly linked DBO in step 1903; otherwise, DBO owner 15 performs step 1904. Where a DBO is directly linked to an RBO (see Section 4.5 presented above), the performance measurement criteria for the DBO is the same as the performance measurement criteria established to evaluate the performance of the RBO. In these cases, executive leadership team 20 (see FIG. 18) has identified that significant change or improvement to a business process or system is required, and so the DBO can be achieved only via the attainment of the RBO. That is, achievement of the RBO is the minimum level of achievement for the DBO.

In step 1904, which follows step 1903 and the No branch of step 1902, DBO owner 15 develops measures and targets for all other DBOs (i.e., DBOs not assigned RBO measures in step 1903).

In step 1905, DBO owner 15 develops a DBO Overview for review by executive leadership team 20 (see FIG. 18) at a DBO Review Meeting (see Section 4.7 presented below). The purpose of the activity in step 1905 is to document the definition, interpretation, scope and performance measurement criteria of the DBO for presentation to—and consideration and final approval by—the executive leadership team (see FIG. 20). Step 1905 is followed by step 2001 in the process of conducting a DBO review meeting in FIG. 20.

The output of the process of FIG. 19 includes:
1. DBO performance measurement criteria that includes a review-ready version of measures and targets for DBOs.
2. DBO Overview.

4.7 Develop DBOs Phase—DBO Review Meeting

Figure 20:
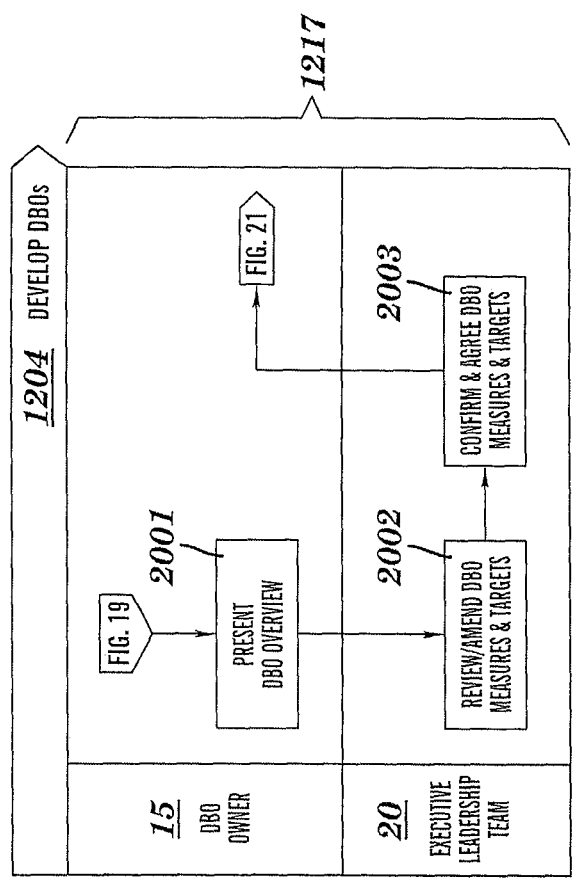
FIG. 20 is a flow diagram of a process of conducting a DBO review meeting in step 1217 of the Develop DBOs phase of the process of FIG. 12, in accordance with embodiments of the present invention.

FIG. 20 is a flow diagram of a process of conducting a DBO review meeting in the Develop DBOs phase 1204 of the process of FIG. 12, in accordance with embodiments of the present invention. Conducting a DBO review meeting is the third and final step (i.e., step 1217) of Develop DBOs phase 1204 of the Strategic Enablement Method. The key objective of step 1217 is to convene a review and consensus meeting attended by executive leadership team 20. Step 1217 includes steps 2001-2003, which are described in this section.

Input to the process of FIG. 20 includes:
1. DBO Overviews (i.e., output from the process of FIG. 19).
2. SBOs (i.e., output from the process of FIG. 17).
3. RBOs (i.e., output from the process of FIG. 15).
4. RBO performance measurement criteria (i.e., output from the process of FIG. 16).

In step 2001, which follows step 1905 of FIG. 19, each DBO owner assigned in the process of FIG. 18 is required to present her or his DBO Overview at a DBO review meeting. The purpose of the DBO review meeting is to achieve consensus on the description, intention, scope and measurement criteria for each DBO developed in the process of FIG. 18. In step 2002, executive leadership team 20 reviews the DBO Overviews presented in step 2001 and, if necessary, amends the measures and targets of the DBOs associated with the reviewed DBO Overviews. In step 2003, executive leadership team 20 confirms and approves (i.e. agrees) the measures and targets of every DBO that is reviewed by the executive leadership team. Final approval for each DBO must be achieved by the end of the DBO review meeting. The output of the process of FIG. 20 includes approved DBO Overviews, which includes approved DBO definitions and performance measurement criteria for the DBOs developed in the process of FIG. 18. Step 2003 is followed by step 2101 of the tactical program determination process of FIG. 21.

4.8 Develop Tactical Programs & Projects—Determine Tactical Programs

Figure 21:
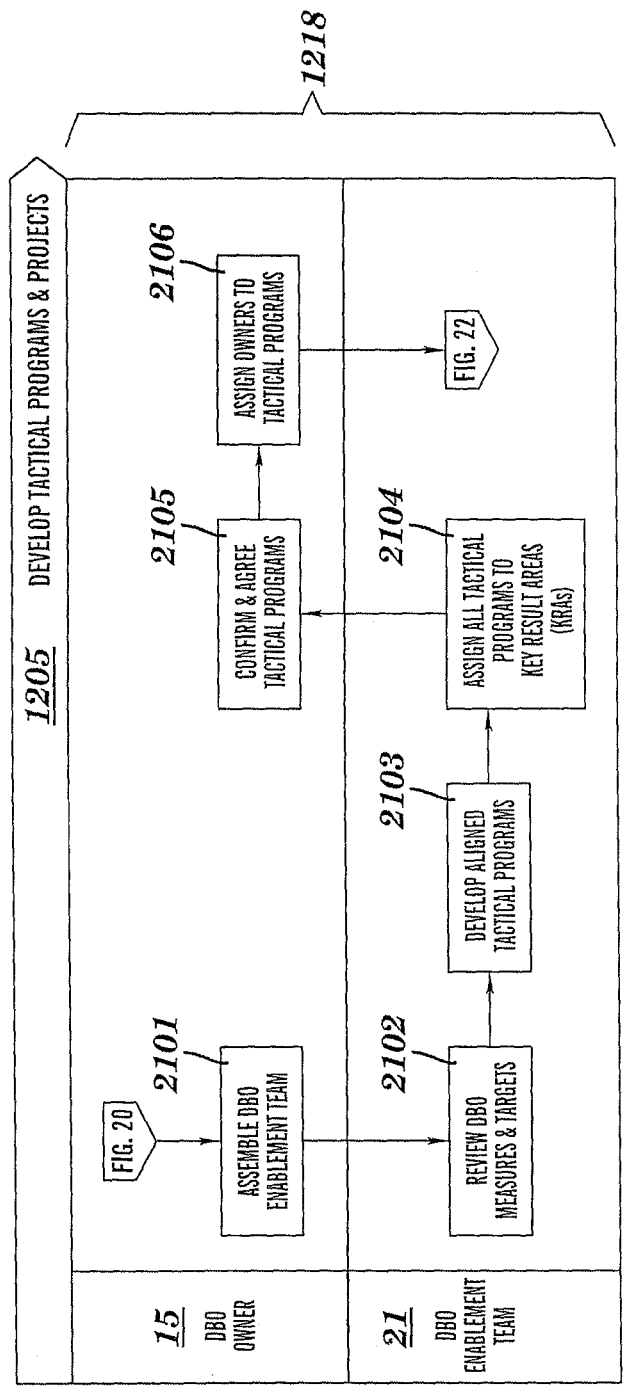
FIG. 21 is a flow diagram of a process of determining tactical programs in step 1218 of the Develop tactical programs and projects phase of the process of FIG. 12, in accordance with embodiments of the present invention.

FIG. 21 is a flow diagram of a process of determining tactical programs in the Develop tactical programs and projects phase 1205 of the process of FIG. 12, in accordance with embodiments of the present invention. During the Develop tactical programs and projects phase 1205, the executable elements of an organization's strategy become increasingly clear and more easily understood by all members of the organization. The process of determining tactical programs occurs in step 1218 of phase 1205. Step 1218 includes steps 2101-2106, which are described in this section.

The input to the process of FIG. 21 includes:
1. DBO Overview, which includes DBO definitions and performance measurement criteria (i.e., output from the process of FIG. 20).
2. SBOs (i.e., output from the process of FIG. 17).
3. RBOs (i.e., output from the process of FIG. 15).
4. RBO performance measurement criteria (i.e., output from the process of FIG. 16).

In step 2101, which follows step 2003 of FIG. 20, DBO owner 15 assembles a DBO enablement team 21 whose purpose is to develop a set of tactical programs to facilitate the achievement of each DBO developed in the process of FIG. 18; Tactical programs are a portfolio of projects of any number or size and are deployed using the organization's program management method.

In step 2102, DBO enablement team 21 reviews the DBO measures and targets that are confirmed and approved via the process of FIG. 20. In step 2103, DBO enablement team 21 develops tactical programs which are aligned to DBOs. In step 2104, DBO enablement team 21 assigns all tactical programs developed in step 2103 to KRAs. The association between strategy and BAU is further strengthened by the alignment of each tactical program to the organization's KRAs in step 2104.

In step 2105, DBO owner 15 confirms and approves (i.e., agrees) the tactical programs developed in step 2103. In step 2106, DBO owner 15 assigns owners (i.e., tactical program owners) to the tactical programs developed in step 2103. Step 2106 is followed by step 2201 of the process of determining tactical program performance measures and targets in FIG. 22.

In one embodiment, one or more members of DBO enablement team 21 become assigned tactical program owners in step 2106. The assigned tactical program owners are typically drawn from the business area or sub-business area that will execute the majority of tactical projects within the tactical program portfolio. This association of a business area or sub-business area with the tactical programs facilitates an integration of an organization's tactical programs with the organization's BAU activities (i.e., facilitates an association between the organization's strategy and its BAU activities).

While DBO owner 15 is responsible for overall control of a DBO, and for achievement of the measures and targets associated with the DBO, it is the tactical program owners assigned in step 2106 who are responsible for managing the portfolio of tactical projects established in step 2103 to execute the tasks and activities required to make the strategy operational. Each tactical program owner assigned in step 2106 is responsible for not only achieving, but also tracking and reporting the progress and status of any tactical programs assigned to the tactical program owner. Typically, DBOs are monitored fortnightly or monthly, while tactical programs are monitored weekly.

The output of the process of FIG. 21 includes:
1. Tactical programs aligned to the KRAs and DBOs of the organization; and to the executing business area of the organization.
2. Identified tactical program owners.

Figure 22:
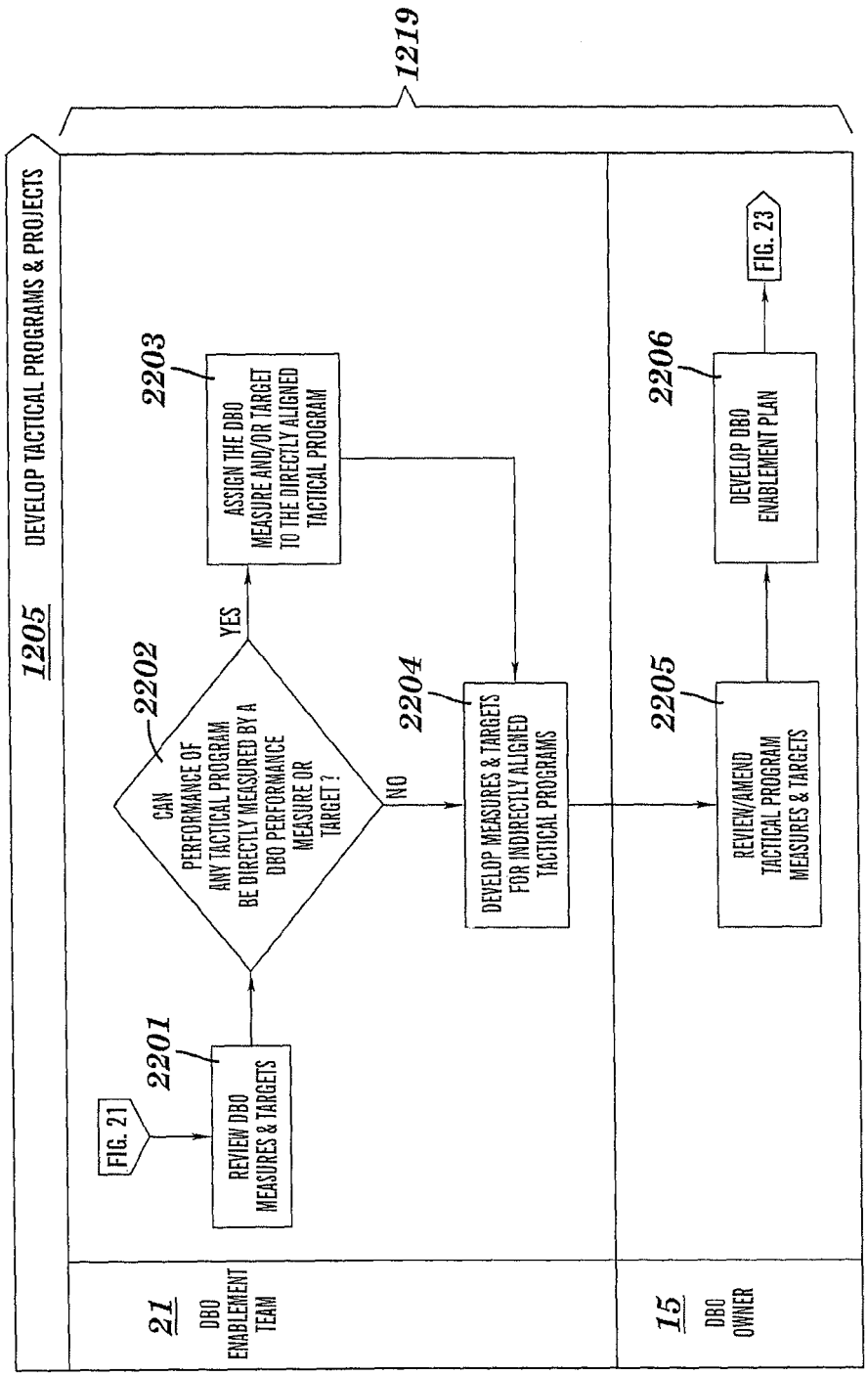
FIG. 22 is a flow diagram of a process of determining tactical program performance measures and targets in step 1219 of the Develop tactical programs & projects phase of the process of FIG. 12, in accordance with embodiments of the present invention.

4.9 Develop Tactical Programs & Projects—Determine Tactical Program Performance Measures & Targets FIG. 22 is a flow diagram of a process of determining tactical program performance measures and targets in the Develop tactical programs & projects phase 1205 of the process of FIG. 12, in accordance with embodiments of the present invention. The process of determining tactical program performance measures and targets occurs in the second step (i.e., step 1219) of phase 1205 and includes steps 2201-2206, which are described below.

Input to the process of FIG. 22 includes:
1. Tactical programs (i.e., output from the process of FIG. 21).
2. DBO Overview, which includes DBO definitions and performance measurement criteria (i.e., output from the process of FIG. 20).
3. SBOs (i.e., output from the process of FIG. 17).
4. RBOs (i.e., output from the process of FIG. 15).
5. RBO performance measurement criteria (i.e., output from the process of FIG. 16).

In step 2201, which follows step 2106 of FIG. 21, DBO enablement team 21 reviews the performance measurement criteria that were developed for a DBO in the process of FIG. 19.

As used herein, a directly aligned tactical program is defined as a tactical program that can be directly measured by a DBO measure or target. Measurement criteria for a tactical program include measure definitions, source data location, output formats, measure frequency, targets and tolerance criteria. Measurement criteria for a directly aligned tactical program are directly aligned to one or more DBO measures and targets. Further, as used herein, an indirectly aligned tactical program is defined as a tactical program that cannot be directly measured by a DBO measure or target.

If DBO enablement team 21 determines in step 2202 that the performance of any tactical program developed in step 2103 of FIG. 21 can be directly measured by a DBO performance measure or target (i.e., step 2202 identifies a directly aligned tactical program), then in step 2203, the DBO enablement team assigns the DBO performance measure and/or target to the identified directly aligned tactical program. Step 2203 is repeated for all directly aligned tactical programs identified in step 2202.

If DBO enablement team 21 determines in step 2202 that no tactical programs can be directly measured by a DBO performance measure or target (i.e., step 2202 identifies only indirectly aligned tactical programs), then in step 2204, the DBO enablement team develops performance measures and targets for the indirectly aligned tactical programs identified by step 2202. Step 2204 also follows step 2203 to develop measures and targets for any tactical programs that were not identified as being directly aligned by step 2202.

In step 2205, DBO owner 15 reviews and amends, if amending is necessary the new tactical program measures and targets developed in step 2204. The review and refinement of measures and targets in step 2205 is then finalized and documented in step 2206 in a DBO Enablement Plan. Typically developed in presentation format, the DBO Enablement Plan is presented by DBO owner 15 to the executive leadership team at a strategic enablement meeting (a.k.a. strategic enablement meeting 1220 of FIG. 12; see Section 4.10 presented below). The purpose of the DBO Enablement Plan is to provide a clear definition of the intention, expectations, requirements (i.e., resources, assets, etc), risks, dependencies and extent of any investment funding required to enable execution of a DBO and the DBO's tactical programs. Step 2206 is followed by step 2301 of the process of conducting a strategic enablement meeting in FIG. 23.

Output of the process of FIG. 22 includes:
1. Tactical program performance measurement criteria including a review-ready version of tactical program measures and targets.
2. DBO Enablement Plan.

4.10 Develop Tactical Programs & Projects—Strategic Enablement Meeting

Figure 23:
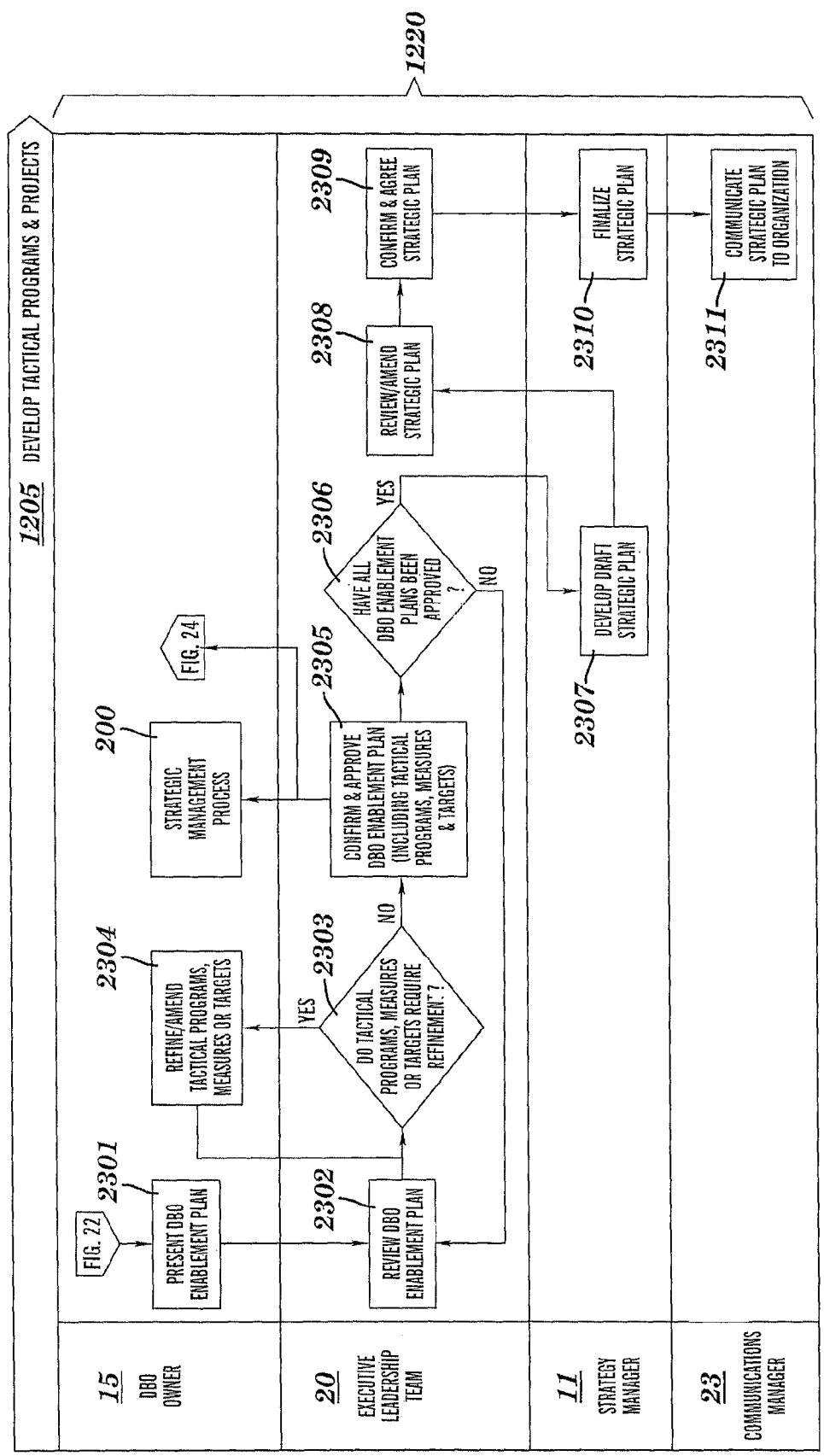
FIG. 23 is a flow diagram of a process of conducting a strategic enablement meeting in step 1220 of the Develop tactical programs & projects phase of the process of FIG. 12, in accordance with embodiments of the present invention.

FIG. 23 is a flow diagram of a process of conducting a strategic enablement meeting in the Develop tactical programs & projects phase 1205 of the process of FIG. 12, in accordance with embodiments of the present invention. The strategic enablement meeting is a review and consensus meeting attended by executive leadership team 20 and all DBO owners 15. Attendance by strategy manager 11 and a communications manager 23 is also recommended. During the strategic enablement meeting, relative importance of each DBO and tactical program is agreed by executive leadership team 20, with DBOs and tactical programs weighted or prioritized using a method dictated by the organization's performance measurement system.

The key objectives of the process of FIG. 23 are to:
Provide an absolute, objective understanding of the strategic objectives, outcomes and priorities of the organization;
Identify and eliminate any potential duplication of tactical programs;
Identify cross-organizational dependencies; and
Encourage consensus, cross-organizational agreement and understanding of the end-to-end strategy.

The strategic enablement meeting is step 1220 of phase 1205, and includes steps 2301-2311, which are described below.

Input to the process of FIG. 23 includes:
1. DBO Enablement Plans (i.e., output from the process of FIG. 22).
2. SBOs (i.e., output from the process of FIG. 17).
3. RBOs (i.e., output from the process of FIG. 15).
4. RBO performance measurement criteria (i.e., output from the process of FIG. 16).

In step 2301, which follows step 2206 of FIG. 22, each DBO owner 15 is required to present his or her DBO Enablement Plan to executive leadership team 20 in the strategic enablement meeting. Each DBO Enablement Plan presented in step 2301 was developed in step 2206 of FIG. 22. The DBO Enablement Plans must include proposal(s) for investment funding for review and endorsement by the leadership team before submission to the investment committee and funding area owner to formally request a DBO budget, per the organization's strategic management process.

In step 2302, executive leadership team 20 reviews one of the DBO Enablement Plans presented in step 2301. If executive leadership team 20 determines in step 2303 that tactical programs, measures and/or targets require refinement, then in step 2304, the DBO owner 15 who presented the DBO Enablement Plan reviewed in step 2302 refines or amends the tactical programs, measures or targets. Subsequent to step 2304, the inquiry step 2303 is repeated.

If executive leadership team 20 determines in step 2303 that no tactical programs, measures or targets require refinement, then the executive leadership team 20 in step 2305 confirms and approves the DBO Enablement Plan reviewed in step 2302, including the tactical programs, measures and targets. Following step 2305, DBO owner 15 provides strategic management process 200 (i.e., populates SMS) with the finalized DBOs, tactical programs and performance measurement criteria associated with an approved DBO Enablement Plan. Step 2305 is also followed by step 2401 in the process of determining tactical projects in FIG. 24.

If executive leadership team 20 determines in step 2306 that not all DBO Enablement Plans have been approved in step 2305, then the process of FIG. 23 repeats starting at step 2302 at which point another DBO Enablement Plan is reviewed by the executive leadership team.

Figure 26:
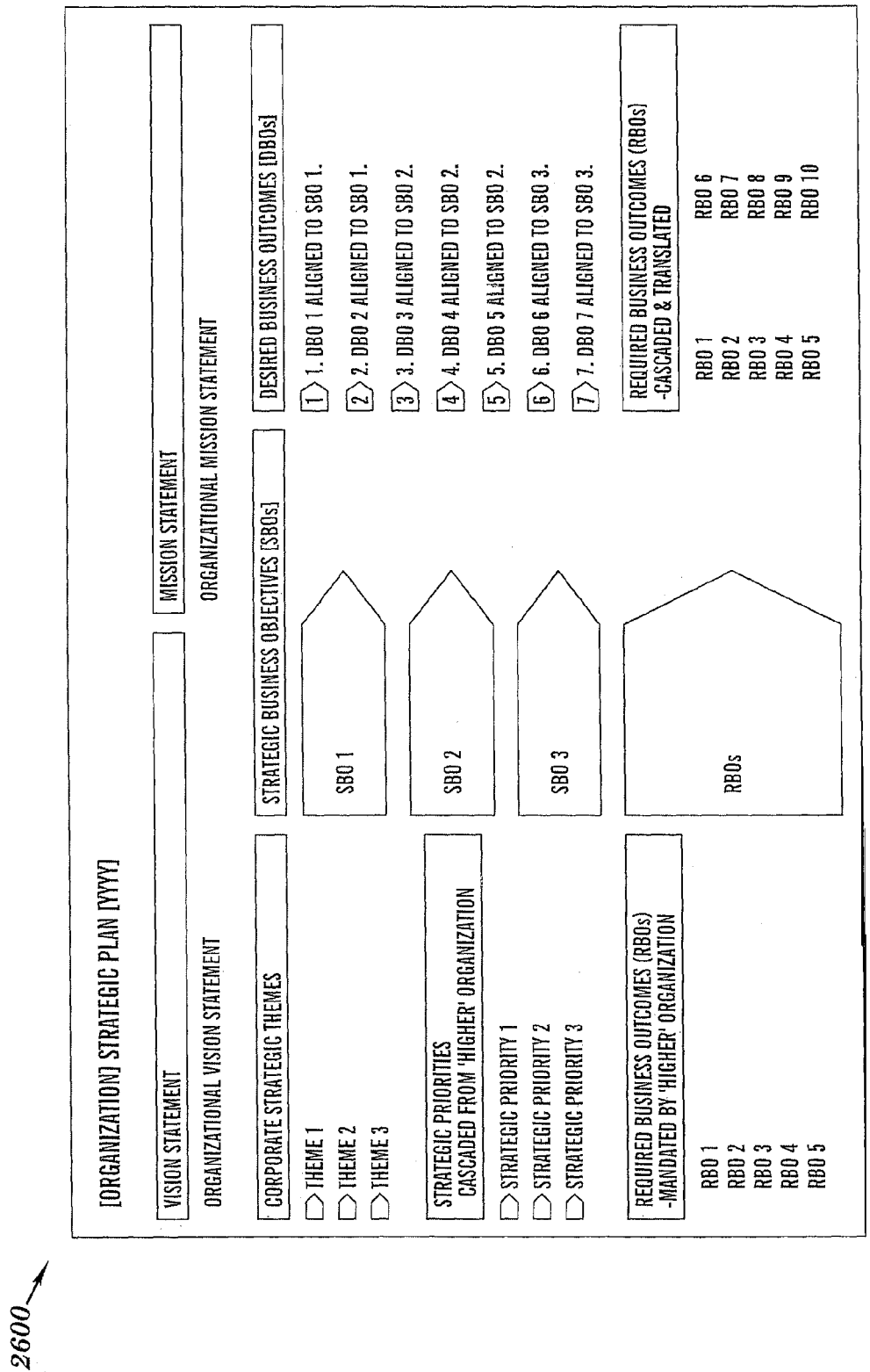
FIG. 26 is an example of a strategic plan output by the process of FIG. 12, in accordance with embodiments of the present invention.

If executive leadership team 20 determines in step 2306 that all DBO Enablement Plans have been approved in step 2305, then strategy manager 11 develops a draft strategic plan in step 2307. In step 2308, executive leadership team 20 reviews the draft strategic plan developed in step 2307 and amends the strategic plan if necessary. In step 2309, executive leadership team 20 confirms and approves (i.e., agrees) the strategic plan reviewed in step 2308. In step 2310, strategy manager 11 finalizes the strategic plan confirmed in step 2309. In step 2311, communications manager 23 receives all the necessary detail required to develop a "public" view of the finalized strategic plan (i.e., a view of the strategic plan for all members of the organization). Step 2311 also includes communications manager 23 performing steps guided by the organization's strategic planning process to articulate and communicate the strategic plan across the organization. A boilerplate format of a strategic plan output by the process of FIG. 23 is depicted in FIG. 26.

The output of the process of FIG. 23 includes:
1. Approved DBO Enablement Plans, including approved tactical programs and performance measures and targets for tactical programs.
2. Approved Strategic Plan.

4.11 Develop Tactical Programs & Projects—Determine Tactical Projects

Figure 24:
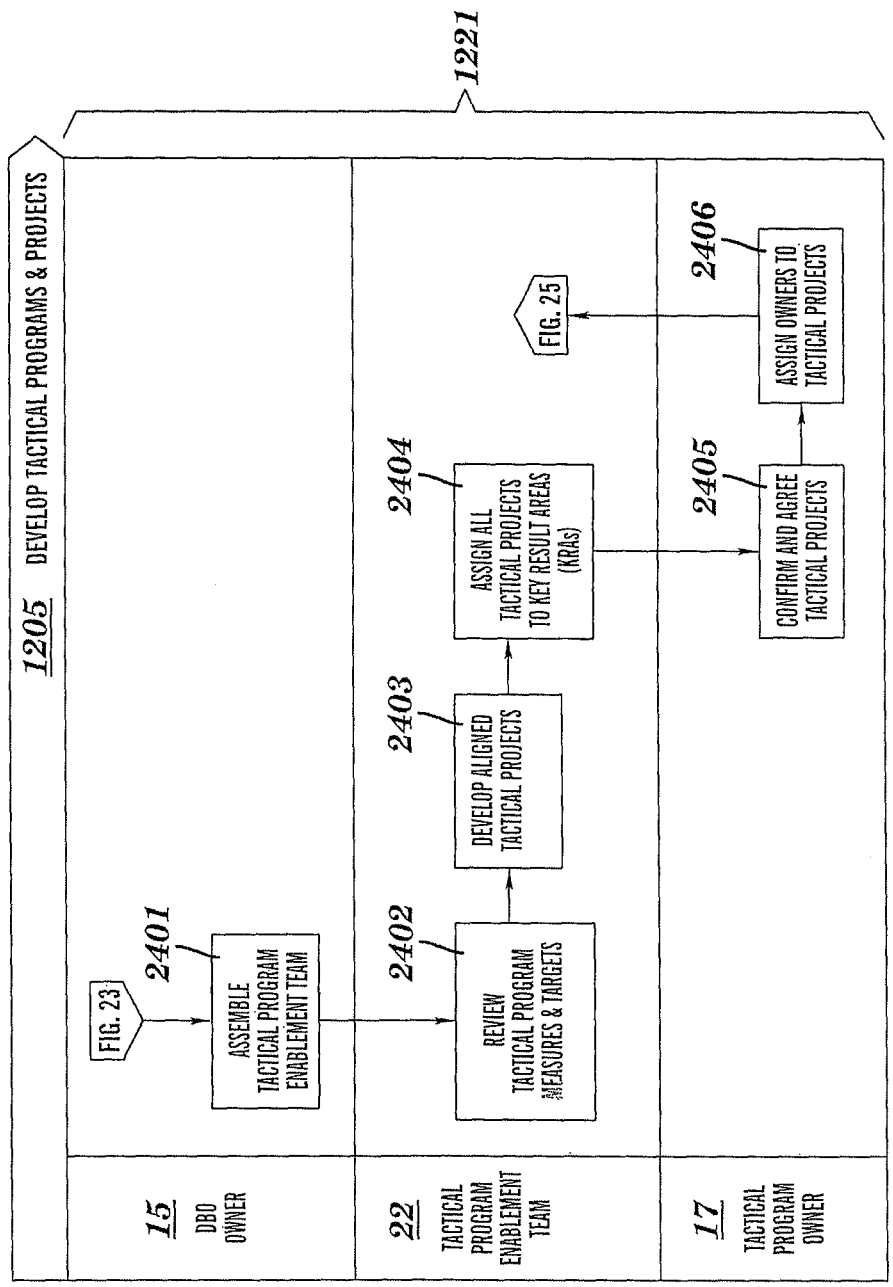
FIG. 24 is a flow diagram of a process of determining tactical projects in step 1221 of the Develop tactical programs & projects phase of the process of FIG. 12, in accordance with embodiments of the present invention.

FIG. 24 is a flow diagram of a process of determining tactical projects in the Develop tactical programs & projects phase 1205 of the process of FIG. 12, in accordance with embodiments of the present invention. The determining of tactical projects is the fourth step (i.e., step 1221) of phase 1205. Step 1221 includes steps 2401-2406, which are described below.

Input into the process of FIG. 24 includes:
1. Approved DBO Enablement Plans, including tactical program definitions and performance measurement criteria (i.e., output from the process of FIG. 23).
2. DBO Overview, including DBO definitions and performance measurement criteria (i.e., output from the process of FIG. 20).
3. SBOs (i.e., output from the process of FIG. 17).
4. RBOs (i.e., output from the process of FIG. 15).
5. RBO performance measurement criteria (i.e., output from the process of FIG. 16).

In step 2401, which follows step 2305 of FIG. 23, DBO owner 15 assembles a tactical program enablement team 22 whose purpose is to define and develop the tactical projects that will facilitate the achievement of each tactical program that was developed in the process of FIG. 21. A tactical program enablement team 22 is assembled for each tactical program within the DBO. In step 2402, tactical program enablement team 22 reviews tactical program measures and targets. In step 2403, tactical program enablement team 22 develops tactical projects. The tactical projects developed in step 2403 are established to execute the required activities and tasks of an associated tactical program, and are deployed using the organization's project management method. Each tactical project is directly aligned to a tactical program. In step 2404, tactical program enablement team 22 assigns all tactical projects of step 2403 to KRAs. In step 2405, tactical program owner 17 confirms and approves (i.e., agrees) the tactical projects developed in step 2403. In step 2406, tactical program owner 17 assigns tactical project owners to the tactical projects developed in step 2403. Each tactical project owner is responsible for not only achieving, but also tracking and reporting the progress and status of the tactical project assigned to the tactical project owner. In one embodiment, tactical projects are monitored by their owners weekly. Step 2406 is followed by step 2501 in the process of determining tactical project performance measures and targets in FIG. 25.

In one embodiment, members of tactical program enablement team 22 become tactical project owners who are assigned to tactical projects in step 2406. In one embodiment, the assigned owners are drawn from the business area or sub-business area that will execute the majority of the tactical project's activities. This alignment of a tactical project to a business area or sub-business area facilitates an integration of an organization's tactical projects with the organization's BAU activities. This association between the organization's strategy and BAU is further strengthened by the alignment of each tactical project to the organization's key result areas (KRAs), as provided by step 2404.

Output of the process of FIG. 24 includes:
1. Tactical projects aligned to the KRAs and tactical programs of the organization, and to the executing business area of the organization.
2. Identified tactical project owners.

Figure 25:
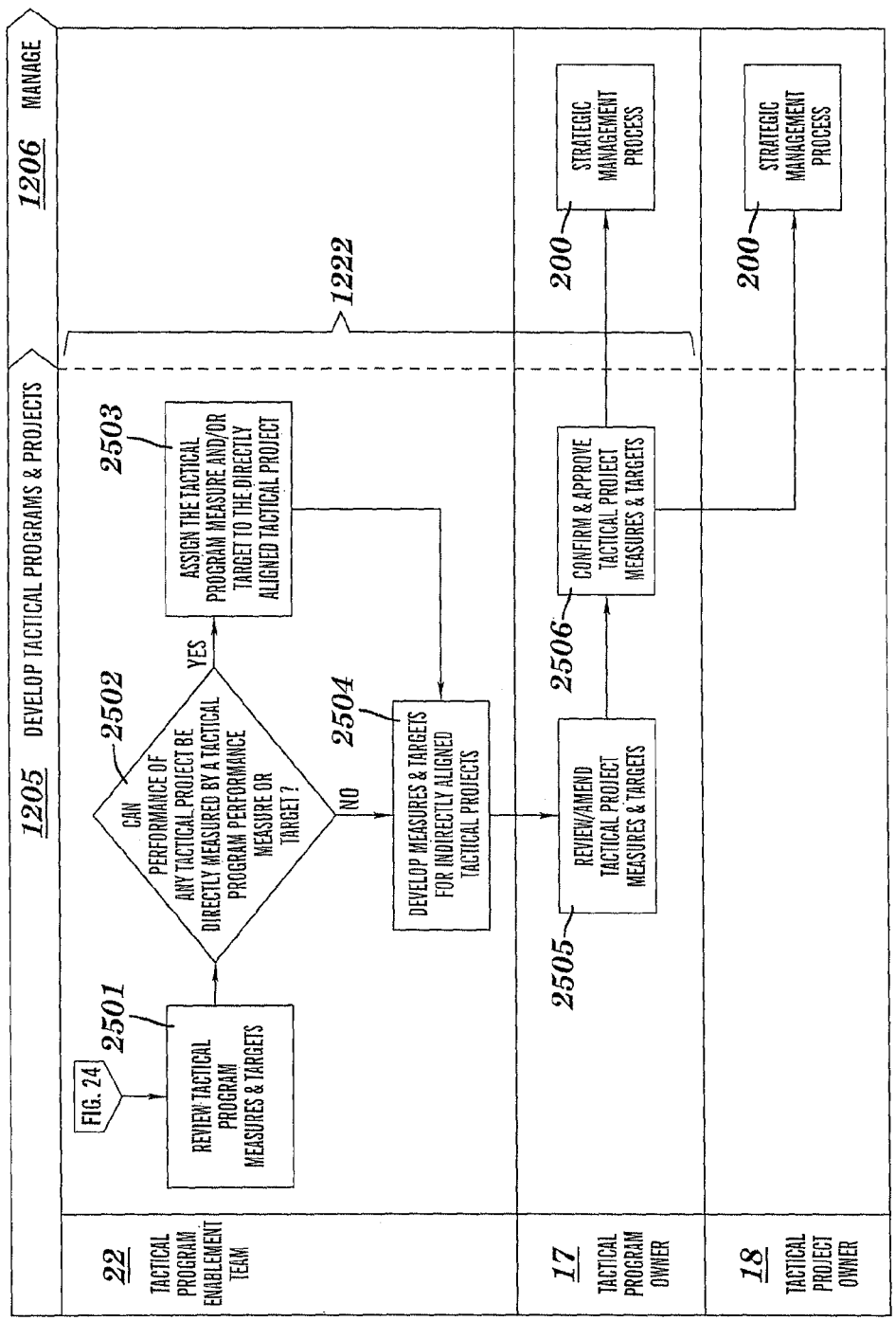
FIG. 25 is a flow diagram of a process that includes determining tactical project performance measures and targets in step 1222 of the Develop tactical programs & projects phase and managing the execution of a strategic plan in step 200 of the Manage phase of the process of FIG. 12, in accordance with embodiments of the present invention.

4.12 Develop Tactical Programs & Projects—Determine Tactical Project Performance Measures & Targets FIG. 25 is a flow diagram of a process that includes determining tactical project performance measures and targets in the Develop tactical programs & projects phase 1205 and the Manage phase 1206 of the process of FIG. 12, in accordance with embodiments of the present invention. Determining tactical project performance measures and targets is the final step (i.e., step 1222) of phase 1205 and includes steps 2501-2506, which are described below. Furthermore, FIG. 25 depicts the external activities involved in the final phase (i.e., Manage phase 1206) of the SEM.

Input to the process of FIG. 25 includes:
1. Tactical projects (i.e., output from the process of FIG. 24).
2. Tactical programs (i.e., output from the process of FIG. 21).

3. DBO Overview, which includes DBO definitions and performance measurement criteria (i.e., output from the process of FIG. 20).
4. SBOs (i.e. output from the process of FIG. 17).
5. RBOs (i.e., output from the process of FIG. 15).
6. RBO performance measurement criteria (i.e., output from the process of FIG. 16).

In step 2501, which follows step 2406 of FIG. 24, tactical program enablement team 22 reviews tactical program measures and targets assigned or developed in the process of FIG. 22. The review in step 2501 includes the tactical program enablement team, which is typically composed of tactical project owners, reviewing the performance measurement criteria developed for the DBO and the tactical program.

As used herein, a directly aligned tactical project is defined as a tactical project that can be directly measured by a tactical program performance measure or target Measurement criteria for a tactical project include measure definitions, source data location, output formats, measure frequency, targets and tolerance criteria. Measurement criteria for a directly aligned tactical project are directly aligned to tactical program measures. Further, as used herein, an indirectly aligned tactical project is defined as a tactical project that cannot be directly measured by a tactical program performance measure or target.

If tactical program enablement team 22 determines in step 2502 that the performance of any tactical project can be directly measured by a tactical program performance measure or target (i.e., step 2502 identifies a directly aligned tactical project), then in step 2503 the tactical program enablement team assigns the tactical program measure and/or target to the identified directly aligned tactical project.

If tactical program enablement team 22 determines in step 2502 that the performance of no tactical projects can be directly measured by a tactical program performance measure or target (i.e., step 2502 identifies only indirectly aligned tactical projects), then in step 2504 the tactical program enablement team develops measures and targets for the identified indirectly aligned tactical projects. Step 2504 also follows step 2503 to develop measures and targets for any tactical projects that were not identified as being directly aligned by step 2502.

In step 2505, tactical program owner 17 reviews the tactical project measures and targets of steps 2503 and 2504 and amends the tactical project measures and targets, if necessary. In step 2506, tactical program owner 17 confirms and approves the tactical project measures and targets reviewed in step 2505. Step 2506 is followed by Manage phase 1206, which concludes the Strategic Enablement Method. In one embodiment, tactical program owner 17 provides strategic management process 200 (i.e., populates SMS) with the finalized (i.e., approved) tactical programs, including program definitions and related performance measurement criteria. Further, tactical project owner 18 provides strategic management process 200 (i.e., populates SMS) with the finalized (i.e., approved) tactical projects, including tactical project definitions and related performance measurement criteria.

FIG. 26 is an example of a strategic plan 2600 output by the process of FIG. 12, in accordance with embodiments of the present invention. An organization may use the format presented by plan 2600, or a variation that satisfies the needs of the organization for articulating and communicating the organization's strategic plan (i.e., the output of the Strategic Enablement Method).

5 Computing System

Figure 27:
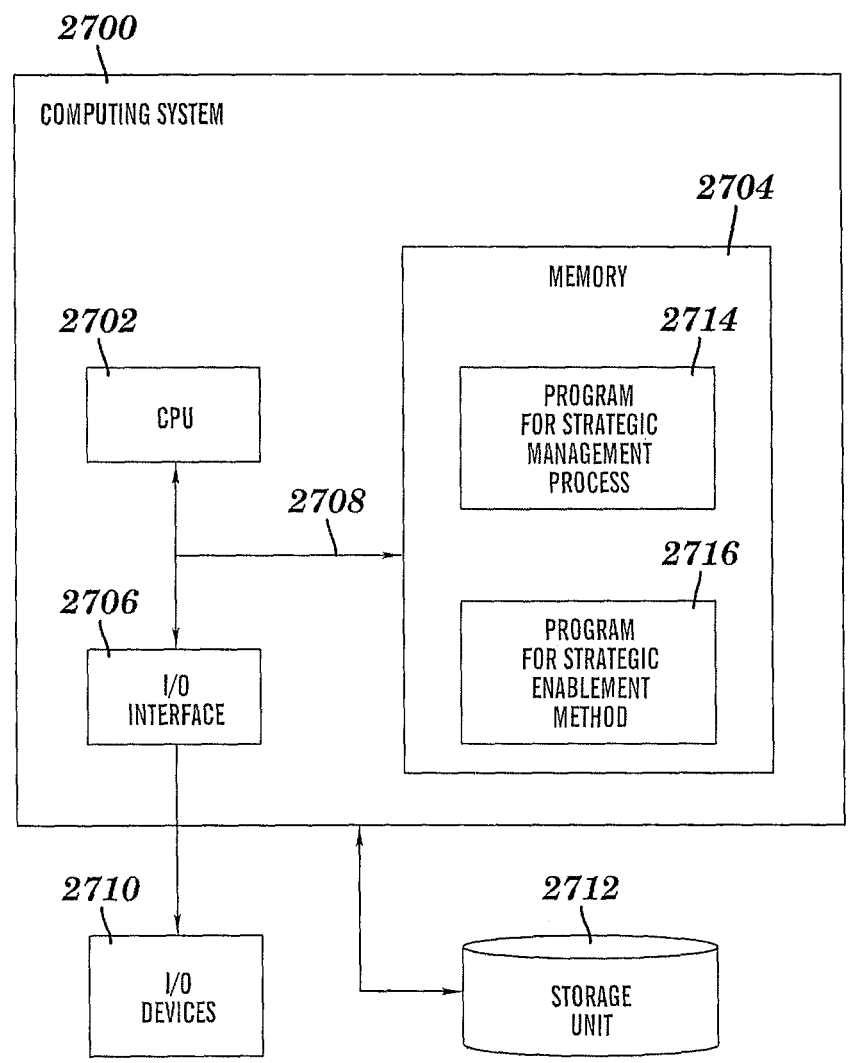
FIG. 27 is a block diagram of a computing system that is included in the system of FIG. 1 and that implements the processes of FIGS. 2 and 12, in accordance with embodiments of the present invention.

FIG. 27 is a block diagram of a computing system that is included in the system of FIG. 1 and that implements the processes of FIGS. 2 and 12, in accordance with embodiments of the present invention. Computing system 2700 generally comprises a central processing unit (CPU) 2702, a memory 2704, an input/output (I/O) interface 2706, a bus 2708, I/O devices 2710 and a storage unit 2712. CPU 2702 performs computation and control functions of computing system 2700. CPU 2702 may comprise a single processing unit, or be distributed across one or more processing units in one or more locations (e.g., on a client and server).

Memory 2704 may comprise any known type of data storage and/or transmission media, including bulk storage, magnetic media, optical media, random access memory (RAM), read-only memory (ROM), a data cache, a data object, etc. Cache memory elements of memory 2704 provide temporary storage of at least some program code in order to reduce the number of times code must be retrieved from bulk storage during execution. Storage unit 2712 is, for example, a magnetic disk drive or an optical disk drive that stores data. Moreover, similar to CPU 2702, memory 2704 may reside at a single physical location, comprising one or more types of data storage, or be distributed across a plurality of physical systems in various forms. Further, memory 2704 can include data distributed across, for example, a LAN, WAN or storage area network (SAN) (not shown).

I/O interface 2706 comprises any system for exchanging information to or from an external source. I/O devices 2710 comprise any known type of external device, including a display monitor, keyboard, mouse, printer, speakers, handheld device, printer, facsimile, etc. Bus 2708 provides a communication link between each of the components in computing system 2700, and may comprise any type of transmission link, including electrical, optical, wireless, etc.

I/O interface 2706 also allows computing system 2700 to store and retrieve information (e.g., program instructions or data) from an auxiliary storage device (e.g., storage unit 2712). The auxiliary storage device may be a non-volatile storage device (e.g., a CD-ROM drive which receives a CD-ROM disk). Computing system 2700 can store and retrieve information from other auxiliary storage devices (not shown), which can include a direct access storage device (DASD) (e.g., hard disk or floppy diskette), a magneto-optical disk drive, a tape drive, or a wireless communication device.

Memory 2704 includes computer program code 2714 for the strategic management process implemented by the Strategic Management System disclosed herein. Further, memory 2701 includes computer program code 2716 for the Strategic Enablement Method disclosed herein. Still farther, memory 2704 may include other systems not shown in FIG. 27, such as an operating system (e.g., Linux) that runs on CPU 2702 and provides control of various components within and/or connected to computing system 2700. The present invention contemplates program code 2714 and program code 2716 residing on or coupled to the same or different computing units within computing system 2700.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 2714 and/or program code 2716 for use by or in connection with a computing system 2700 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 2704, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the method of defining a strategic plan via developing a plurality of strategy elements of the present invention. Thus, the present invention discloses a process for supporting computer infrastructure, comprising integrating, hosting, maintaining and deploying computer-readable code into a computing system (e.g., computing system 2700), wherein the code in combination with the computing system is capable of performing a method of defining a strategic plan via developing a plurality of strategy elements of the strategic plan.

In another embodiment, the invention provides a business method that performs the process steps of the invention on a subscription, advertising and/or fee basis. That is, a service provider, such as a Solution Integrator, can offer to create, maintain, support, etc. a method of defining a strategic plan via developing a plurality of strategy elements of the strategic plan. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention. For example, an organization may implement the Strategic Enablement Method with a spreadsheet workbook without using a dedicated strategy management tool such as SMS. As another example, the disclosed activities performed by owners of strategy elements may be performed by pre-defined delegates of the owners.

What is claimed is:

1. A method of defining a strategic plan via developing a plurality of strategy elements of said strategic plan, said method comprising:

a computer receiving a plurality of required business outcomes (RBOs), said plurality of RBOs being a plurality of operational goals required by a first organization or a second organization and deliverable via an execution of one or more operational activities of a plurality of operational activities of said first organization, wherein said first organization is subordinate to said second organization, and wherein said second organization is authorized to direct said plurality of operational activities via a plurality of strategic goals provided by said second organization;

said computer assigning, in a many-to-one correspondence, said plurality of RBOs to a first set of key result areas (KRAs) of a plurality of KRAs that are performance measurement categories included on a performance scorecard that provides a measurement of performance of said first organization, wherein said assigning said plurality of RBOs includes assigning an RBO of said plurality of RBOs to a KRA of said plurality of KRAs;

said computer receiving a plurality of strategic business objectives (SBOs) based on said plurality of strategic goals, each SBO being a strategic objective of said first organization, wherein said strategic objective is specified as being achieved in a first time period of multiple years;

said computer assigning each SBO to one or more KRAs of said plurality of KRAs, wherein an effect of said assigning said plurality of RBOs and said assigning each SBO includes a first alignment of said plurality of RBOs with said plurality of SBOs, and wherein said assigning each SBO includes assigning an SBO of said plurality of SBOs to said KRA;

said computer receiving a plurality of desired business outcomes (DBOs) based on said plurality of RBOs and said plurality of SBOs, each DBO being a description of an expected or desired result of said first organization, wherein said expected or desired result of said first organization is specified as being achieved within a second time period that is less than said first time period of multiple years;

said computer assigning, in a many-to-one correspondence, said plurality of DBOs to a second set of KRAs of said plurality of KRAs, wherein an effect of said assigning said plurality of DBOs and said assigning each SBO includes a second alignment of said plurality of DBOs with said plurality of SBOs, and wherein said assigning said plurality of DBOs includes assigning a DBO of said plurality of DBOs to said KRA;

said computer receiving and updating a first status of said plurality of RBOs by receiving and updating a status of said one or more operational activities, wherein said receiving and updating said first status of said plurality of RBOs includes determining an achievement of said RBO;

said computer receiving and updating a second status of said plurality of DBOs by receiving and updating a status of a plurality of tactical programs and a plurality of tactical projects associated with an achievement of said plurality of DBOs, wherein said receiving and updating said second status of said plurality of DBOs includes determining an achievement of said DBO;

said computer completing said execution of said one or more operational activities; and based on said achievement of said RBO and said achievement of said DBO, said computer determining an achievement of said SBO;

said computer determining a strategic goal included in said plurality of strategic goals is assigned to said KRA; and based on said strategic goal being determined to be assigned to said KRA, said RBO being assigned to said KRA, said SBO being assigned to said KRA, said DBO being assigned to said KRA, and said achievements of said RBO, said DBO and said SBO, said computer determining an achievement of said strategic goal.

2. The method of claim 1, further comprising:

said computer receiving said plurality of tactical programs for achieving said plurality of DBOs, each tactical program directly aligned to a respective DBO included in said plurality of DBOs;

said computer assigning, in a many-to-one correspondence, said plurality of tactical programs to said second set of KRAs;

said computer receiving said plurality of tactical projects for achieving said plurality of tactical programs, wherein said receiving said plurality of tactical projects includes aligning, in a many-to-one correspondence, said plurality of tactical projects with said plurality of tactical programs; and said computer assigning, in a many-to-one correspondence, said plurality of tactical projects to said second set of KRAs.

3. The method of claim 2, wherein said assigning each SBO comprises mapping a first coding structure for said SBO to said KRA, said first coding structure including a first code identifying said SBO, wherein said assigning said plurality of DBOs comprises mapping a second coding structure for said DBO to said KRA, said second coding structure including said first code identifying said SBO and a second code identifying said DBO, wherein said assigning said plurality of tactical programs comprises mapping a third coding structure for a tactical program of said plurality of tactical programs to said KRA, said third coding structure including said first code identifying said SBO, said second code identifying said DBO and a third code identifying said tactical program, and wherein said assigning said plurality of tactical projects comprises mapping a fourth coding structure for a tactical project of said plurality of tactical projects to said KRA, said fourth coding structure including said first code identifying said SBO, said second code identifying said DBO, said third code identifying said tactical program, and a fourth code identifying said tactical project.

4. The method of claim 3, wherein said first coding structure, said second coding structure, said third coding structure and said fourth coding structure each further includes a set of codes identifying a time period, an organization and a geographical region, said set of codes associated with a strategy element selected from the group consisting of said SBO, said DBO, said tactical program and said tactical project.

5. The method of claim 1, further comprising:

said computer directly linking said plurality of DBOs, said plurality of tactical programs and said plurality of tactical projects to a reporting system associated with said first organization; and said computer selecting, in response to said directly linking, one or more reports provided by said reporting system that directly reference outcomes associated with said plurality of DBOs, said plurality of tactical programs and said plurality of tactical projects.

6. The method of claim 1, further comprising:

said computer prioritizing said plurality of tactical programs by assigning weights to said plurality of tactical programs;

said computer prioritizing said plurality of tactical projects by assigning weights to said plurality of tactical projects; and said computer amending said plurality of strategic goals based on said prioritized plurality of tactical programs and said prioritized plurality of tactical projects.

7. The method of claim 1, further comprising said computer receiving a status of a strategy element of said plurality of strategy elements in real time as said strategy element is being executed, wherein said plurality of strategy elements includes said plurality of SBOs, said plurality of RBOs, said plurality of DBOs, said plurality of tactical programs, and said plurality of tactical projects.

8. The method of claim 1, further comprising said computer monitoring a level of funding and investment used by a strategy element of said plurality of strategy elements, wherein said plurality of strategy elements includes said plurality of SBOs, said plurality of RBOs, said plurality of DBOs, said plurality of tactical programs, and said plurality of tactical projects.

9. A computer program product, comprising a computer-readable, tangible storage device having a computer-readable program code stored therein, said computer-readable program code containing instructions that when executed by a processor of a computer system implement a method for defining a strategic plan via developing a plurality of strategy elements of said strategic plan, said method comprising:

said computer system receiving a plurality of required business outcomes (RBOs), said plurality of RBOs being a plurality of operational goals required by a first organization or a second organization and deliverable via an execution of one or more operational activities of a plurality of operational activities of said first organization, wherein said first organization is subordinate to said second organization, and wherein said second organization is authorized to direct said plurality of operational activities via a plurality of strategic goals provided by said second organization;

said computer system assigning, in a many-to-one correspondence, said plurality of RBOs to a first set of key result areas (KRAs) of a plurality of KRAs that are performance measurement categories included on a performance scorecard that provides a measurement of performance of said first organization, wherein said assigning said plurality of RBOs includes assigning an RBO of said plurality of RBOs to a KRA of said plurality of KRAs;

said computer system receiving a plurality of strategic business objectives (SBOs) based on said plurality of strategic goals, each SBO being a strategic objective of said first organization, wherein said strategic objective is specified as being achieved in a first time period of multiple years;

said computer system assigning each SBO to one or more KRAs of said plurality of KRAs, wherein an effect of said assigning said plurality of RBOs and said assigning each SBO includes a first alignment of said plurality of RBOs with said plurality of SBOs, and wherein said assigning each SBO includes assigning an SBO of said plurality of SBOs to said KRA;

said computer system receiving a plurality of desired business outcomes (DBOs) based on said plurality of RBOs and said plurality of SBOs, each DBO being a description of an expected or desired result of said first organization, wherein said expected or desired result of said first organization is specified as being achieved within a second time period that is less than said first time period of multiple years;

said computer system assigning, in a many-to-one correspondence, said plurality of DBOs to a second set of KRAs of said plurality of KRAs, wherein an effect of said assigning said plurality of DBOs and said assigning each SBO includes a second alignment of said plurality of DBOs with said plurality of SBOs, and wherein said assigning said plurality of DBOs includes assigning a DBO of said plurality of DBOs to said KRA;

said computer system receiving and updating a first status of said plurality of RBOs by receiving and updating a status of said one or more operational activities, wherein said receiving and updating said first status of said plurality of RBOs includes determining an achievement of said RBO;

said computer system receiving and updating a second status of said plurality of DBOs by receiving and updating a status of a plurality of tactical programs and a plurality of tactical projects associated with an achievement of said plurality of DBOs, wherein said receiving and updating said second status of said plurality of DBOs includes determining an achievement of said DBO;

said computer system completing said execution of said one or more operational activities;

based on said achievement of said RBO and said achievement of said DBO, said computer system determining an achievement of said SBO;

said computer system determining a strategic goal included in said plurality of strategic goals is assigned to said KRA; and based on said strategic goal being determined to be assigned to said KRA, said RBO being assigned to said KRA, said SBO being assigned to said KRA, said DBO being assigned to said KRA, and said achievements of said RBO, said DBO and said SBO, said computer system determining an achievement of said strategic goal.

10. The program product of claim 9, wherein said method further comprises:

said computer system receiving said plurality of tactical programs for achieving said plurality of DBOs, each tactical program directly aligned to a respective DBO included in said plurality of DBOs;

said computer system assigning, in a many-to-one correspondence, said plurality of tactical programs to said second set of KRAs;

said computer system receiving said plurality of tactical projects for achieving said plurality of tactical programs, wherein said receiving said plurality of tactical projects includes aligning, in a many-to-one correspondence, said plurality of tactical projects with said plurality of tactical programs; and said computer system assigning, in a many-to-one correspondence, said plurality of tactical projects to said second set of KRAs.

11. The program product of claim 9, wherein said method further comprises:

said computer system directly linking said plurality of DBOs, said plurality of tactical programs and said plurality of tactical projects to a reporting system associated with said first organization; and said computer system selecting, in response to said directly linking, one or more reports provided by said reporting system that directly reference outcomes associated with said plurality of DBOs, said plurality of tactical programs and said plurality of tactical projects.

12. A process for supporting computing infrastructure, said process comprising providing at least one support service for at least one of creating, integrating, hosting, maintaining, and deploying computer-readable code in a computer, wherein the code in combination with the computer is capable of performing a method of defining a strategic plan via developing a plurality of strategy elements of said strategic plan, said method comprising:

said computer receiving a plurality of required business outcomes (RBOs), said plurality of RBOs being a plurality of operational goals required by a first organization or a second organization and deliverable via an execution of one or more operational activities of a plurality of operational activities of said first organization, wherein said first organization is subordinate to said second organization, and wherein said second organization is authorized to direct said plurality of operational activities via a plurality of strategic goals provided by said second organization;

said computer assigning, in a many-to-one correspondence, said plurality of RBOs to a first set of key result areas (KRAs) of a plurality of KRAs that are performance measurement categories included on a performance scorecard that provides a measurement of performance of said first organization, wherein said assigning said plurality of RBOs includes assigning an RBO of said plurality of RBOs to a KRA of said plurality of KRAs;

said computer receiving a plurality of strategic business objectives (SBOs) based on said plurality of strategic goals, each SBO being a strategic objective of said first organization, wherein said strategic objective is specified as being achieved in a first time period of multiple years;

said computer assigning each SBO to one or more KRAs of said plurality of KRAs, wherein an effect of said assigning said plurality of RBOs and said assigning each SBO includes a first alignment of said plurality of RBOs with said plurality of SBOs, wherein said assigning each SBO includes assigning an SBO of said plurality of SBOs to said KRA;

said computer receiving a plurality of desired business outcomes (DBOs) based on said plurality of RBOs and said plurality of SBOs, each DBO being a description of an expected or desired result of said first organization, wherein said expected or desired result of said first organization is specified as being achieved within a second time period that is less than said first time period of multiple years;

said computer assigning, in a many-to-one correspondence, said plurality of DBOs to a second set of KRAs of said plurality of KRAs, wherein an effect of said assigning said plurality of DBOs and said assigning each SBO includes a second alignment of said plurality of DBOs with said plurality of SBOs, wherein said assigning said plurality of DBOs includes assigning a DBO of said plurality of DBOs to said KRA;

said computer receiving and updating a first status of said plurality of RBOs by receiving and updating a status of said one or more operational activities, wherein said receiving and updating said first status of said plurality of RBOs includes determining an achievement of said RBO;

said computer receiving and updating a second status of said plurality of DBOs by receiving and updating a status of a plurality of tactical programs and a plurality of tactical projects associated with an achievement of said plurality of DBOs, wherein said receiving and updating said second status of said plurality of RBOs includes determining an achievement of said RBO;

said computer completing said execution of said one or more operational activities;

based on said achievement of said RBO and said achievement of said DBO, said computer determining an achievement of said SBO;

said computer determining a strategic goal included in said plurality of strategic goals is assigned to said KRA; and based on said strategic goal being determined to be assigned to said KRA, said RBO being assigned to said KRA, said SBO being assigned to said KRA, said DBO being assigned to said KRA, and said achievements of said RBO, said DBO and said SBO, said computer determining an achievement of said strategic goal.

13. The process of claim 12, wherein said method further comprises:

said computer receiving said plurality of tactical programs for achieving said plurality of DBOs, each tactical program directly aligned to a respective DBO included in said plurality of DBOs;

assigning, in a many-to-one correspondence, said plurality of tactical programs to said second set of KRAs;

receiving said plurality of tactical projects for achieving said plurality of tactical programs, wherein said receiving said plurality of tactical projects includes aligning, in a many-to-one correspondence, said plurality of tactical projects with said plurality of tactical programs; and assigning, in a many-to-one correspondence, said plurality of tactical projects to said second set of KRAs.

* * * * *